United States Patent
Cormican et al.

(10) Patent No.: US 9,516,374 B2
(45) Date of Patent: Dec. 6, 2016

(54) COORDINATED SECOND-SCREEN ADVERTISEMENT

(71) Applicant: Cisco Technology, Inc., San Jose, CA (US)

(72) Inventors: Neil Cormican, London (GB); Ronnie Dan, Modiin (IL); Patricia Patitucci, Guildford (GB); Peter Rogers, Toronto (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 96 days.

(21) Appl. No.: 14/324,175

(22) Filed: Jul. 5, 2014

(65) Prior Publication Data
US 2015/0128163 A1    May 7, 2015

Related U.S. Application Data

(60) Provisional application No. 61/901,383, filed on Nov. 7, 2013.

(51) Int. Cl.
*H04N 7/16* (2011.01)
*H04N 21/431* (2011.01)
(Continued)

(52) U.S. Cl.
CPC ........ *H04N 21/4316* (2013.01); *G06F 3/0412* (2013.01); *G06F 3/0484* (2013.01); *G06F 3/0488* (2013.01); *G06F 3/04817* (2013.01); *G06F 3/04883* (2013.01); *G06F 3/1454* (2013.01); *H04L 41/22* (2013.01); *H04L 65/00* (2013.01); *H04N 21/23424* (2013.01); *H04N 21/4122* (2013.01); *H04N 21/4126* (2013.01); *H04N 21/4143* (2013.01); *H04N 21/4222* (2013.01); *H04N 21/4227* (2013.01); *H04N 21/42209* (2013.01); *H04N 21/42224* (2013.01); *H04N 21/4307* (2013.01);
(Continued)

(58) Field of Classification Search
CPC .... H04N 21/84; H04N 21/23; H04N 21/4355; H04N 21/4312; H04N 21/2221; H04N 21/8173; H04N 21/4781; H04N 21/4722; H04N 21/433; H04N 21/2343; H04N 21/482; H04N 21/81; H04N 21/4884; H04N 21/2347; H04N 21/25841; H04N 21/812; H04N 21/262; H04N 21/442; H04N 21/266; H04N 21/435; H04N 21/23608
USPC ............ 725/23, 14, 36, 32, 38, 46, 112, 87, 118,725/146, 47, 110, 91, 142, 135, 45, 25, 88; 345/633
See application file for complete search history.

(56) References Cited

U.S. PATENT DOCUMENTS

2002/0087976 A1\*   7/2002   Kaplan ............. H04N 7/17336
                                                                    725/34
2011/0202270 A1\*   8/2011   Sharma .................. G06Q 30/02
                                                                    701/533
(Continued)

*Primary Examiner* — Nasser Goodarzi
*Assistant Examiner* — An Nguyen
(74) *Attorney, Agent, or Firm* — Polsinelli PC

(57) ABSTRACT

An application on a second-screen device can receive an advertisement stream and an interactive component. The application can display at least a partial display of the advertisement stream and the interactive component in a video display area on the second-screen device. The displayed advertisement stream can be associated with an advertisement stream being displayed by a primary display with the two advertisement streams being associated with the same content and substantially synchronized.

11 Claims, 39 Drawing Sheets

(51) Int. Cl.
  *G06F 3/0481* (2013.01)
  *G06F 3/0484* (2013.01)
  *H04L 12/24* (2006.01)
  *G06F 3/041* (2006.01)
  *H04N 21/234* (2011.01)
  *H04N 21/41* (2011.01)
  *H04N 21/4143* (2011.01)
  *H04N 21/422* (2011.01)
  *H04N 21/4227* (2011.01)
  *H04N 21/442* (2011.01)
  *H04N 21/472* (2011.01)
  *H04N 21/4784* (2011.01)
  *H04N 21/43* (2011.01)
  *H04N 21/482* (2011.01)
  *H04L 29/06* (2006.01)
  *H04N 21/4788* (2011.01)
  *G06F 3/0488* (2013.01)
  *G06F 3/14* (2006.01)
  *H04N 21/81* (2011.01)

(52) U.S. Cl.
  CPC ... *H04N 21/44222* (2013.01); *H04N 21/4784* (2013.01); *H04N 21/4788* (2013.01); *H04N 21/47205* (2013.01); *H04N 21/47217* (2013.01); *H04N 21/482* (2013.01); *G06F 2203/04803* (2013.01); *H04N 21/812* (2013.01)

(56) References Cited

U.S. PATENT DOCUMENTS

2013/0174191 A1\* 7/2013 Thompson, Jr. ... G06Q 30/0207
　　　　　　　　　　　　　　　　　　725/23
2013/0201215 A1\* 8/2013 Martellaro ............... G09G 5/00
　　　　　　　　　　　　　　　　　　345/633
2013/0326583 A1\* 12/2013 Freihold ............. G06F 3/04815
　　　　　　　　　　　　　　　　　　726/3

\* cited by examiner

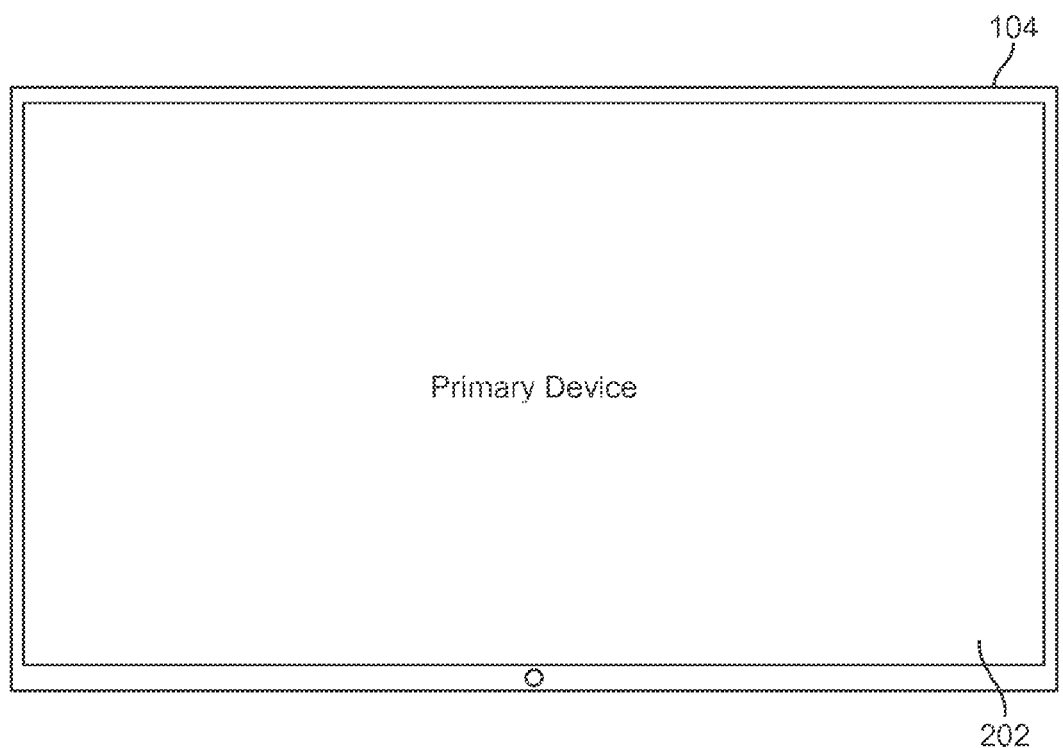
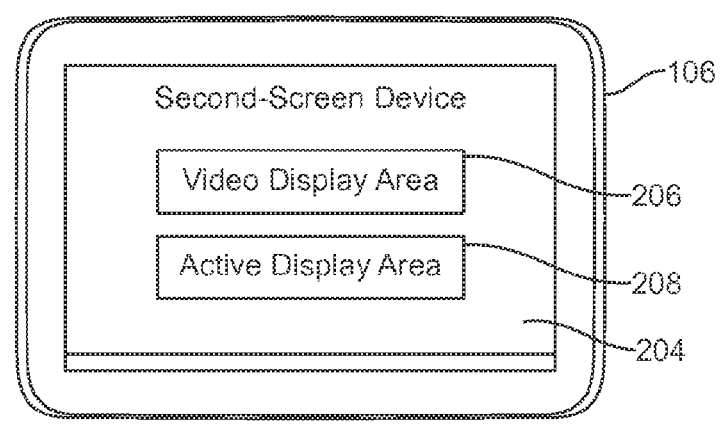
FIG. 2A

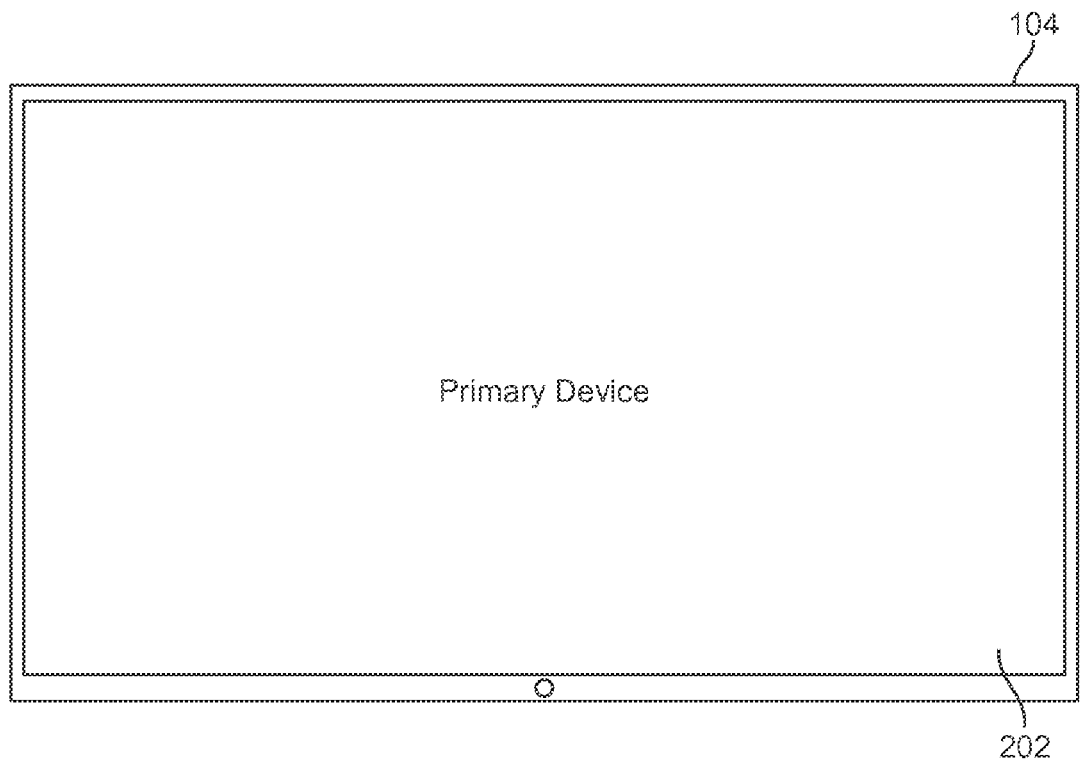
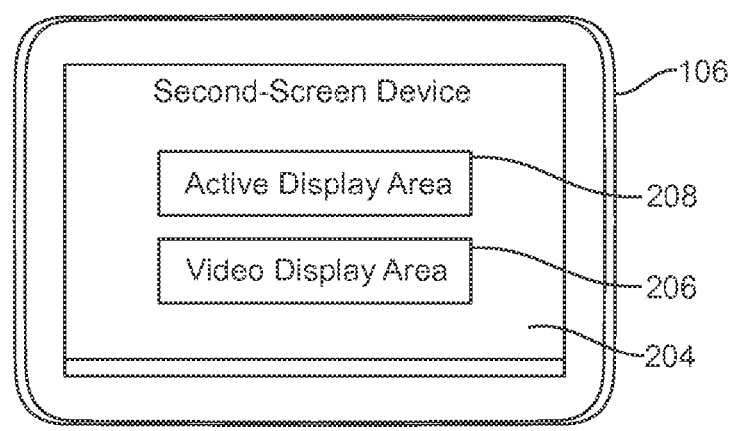
FIG. 2B

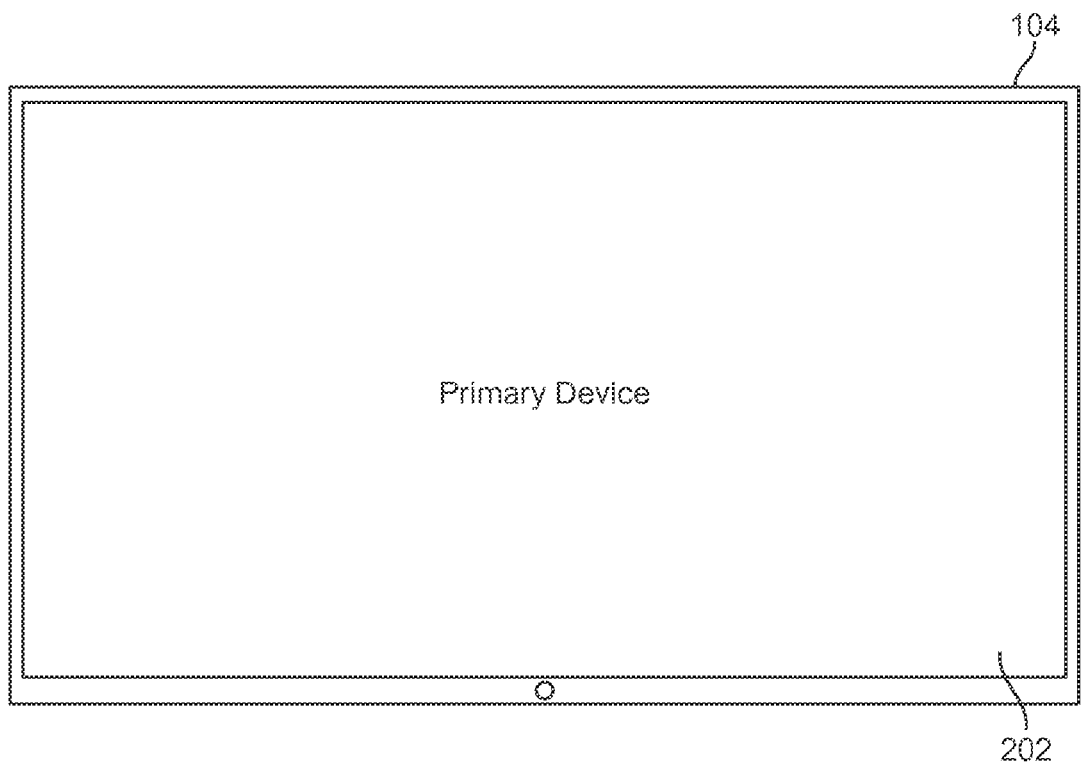
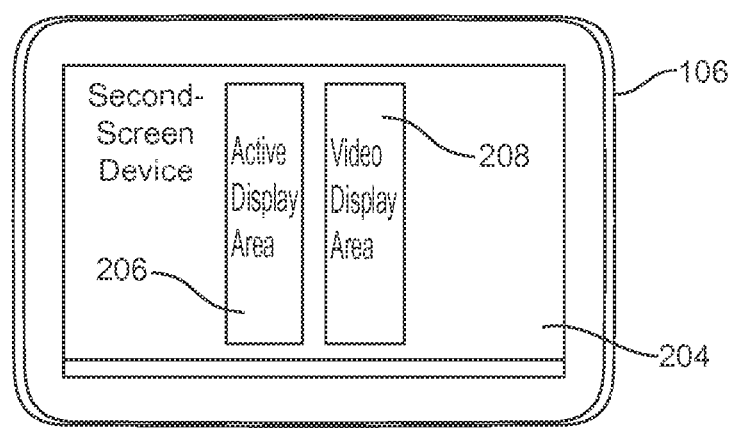
FIG. 2C

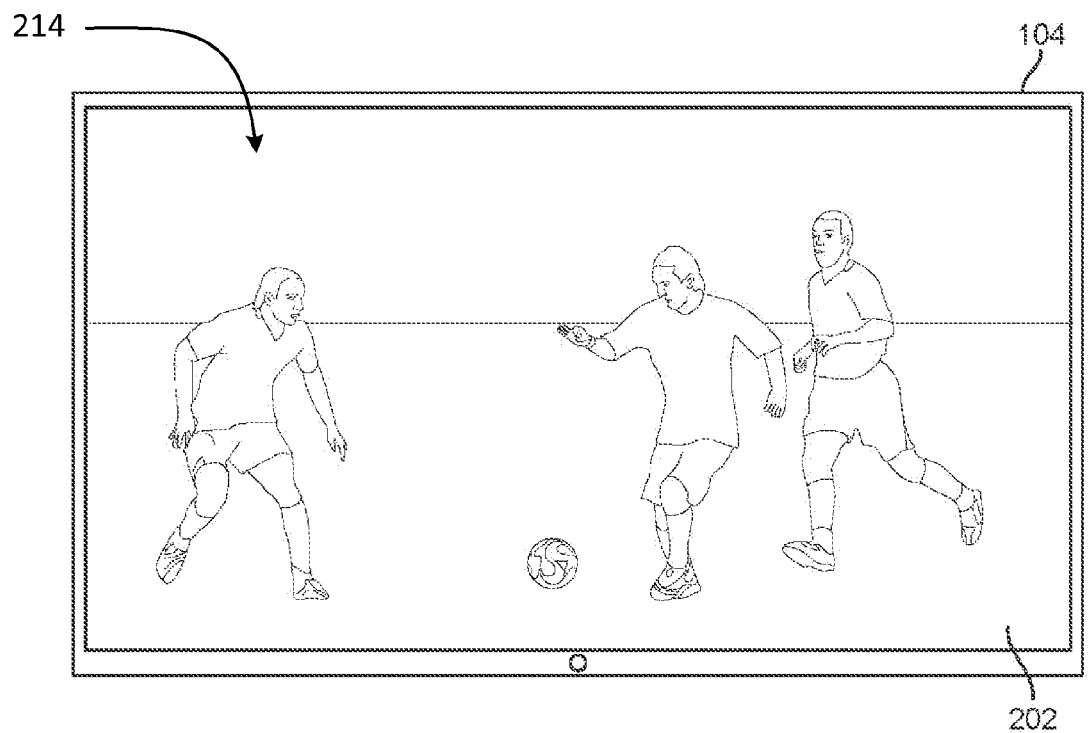
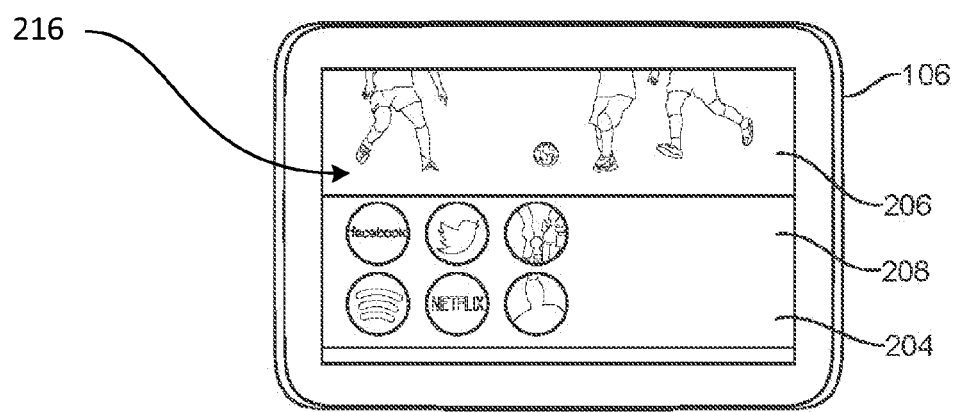
FIG. 4

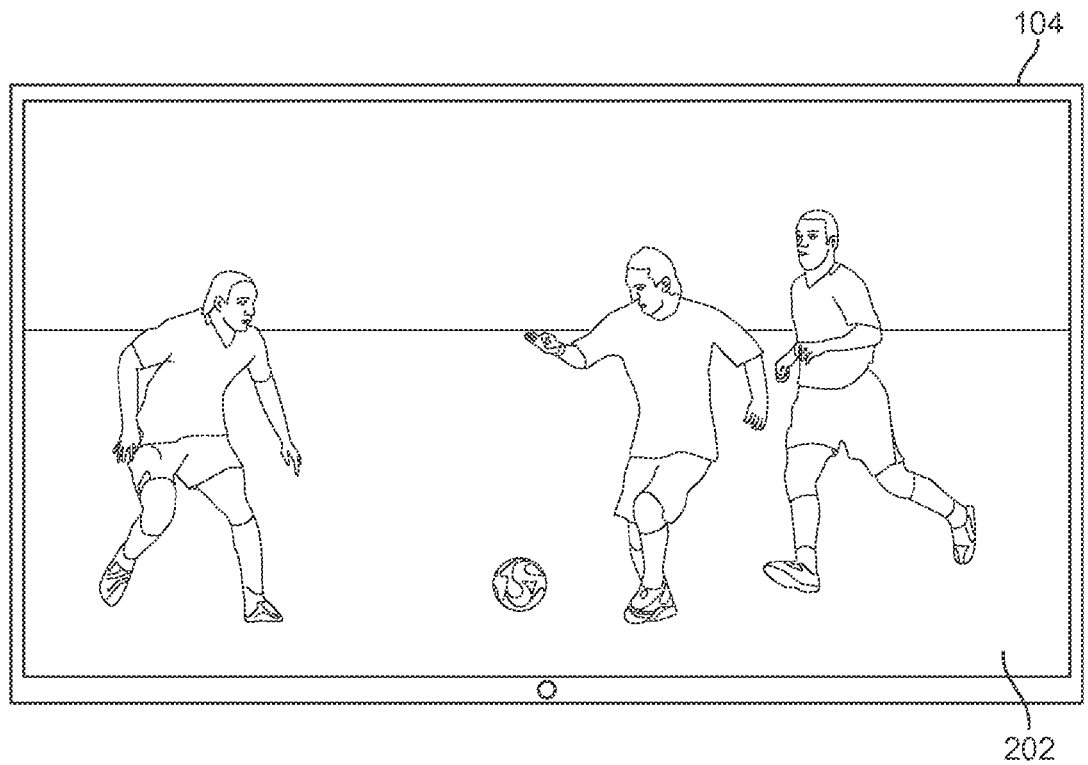
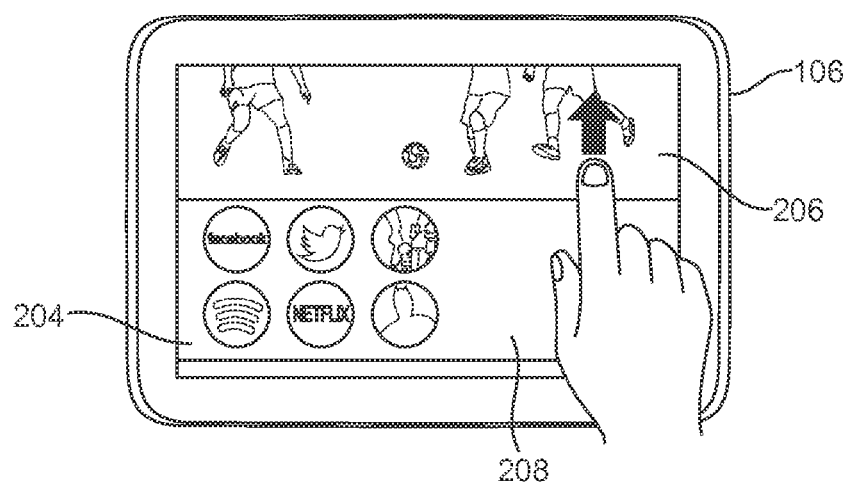
FIG. 5

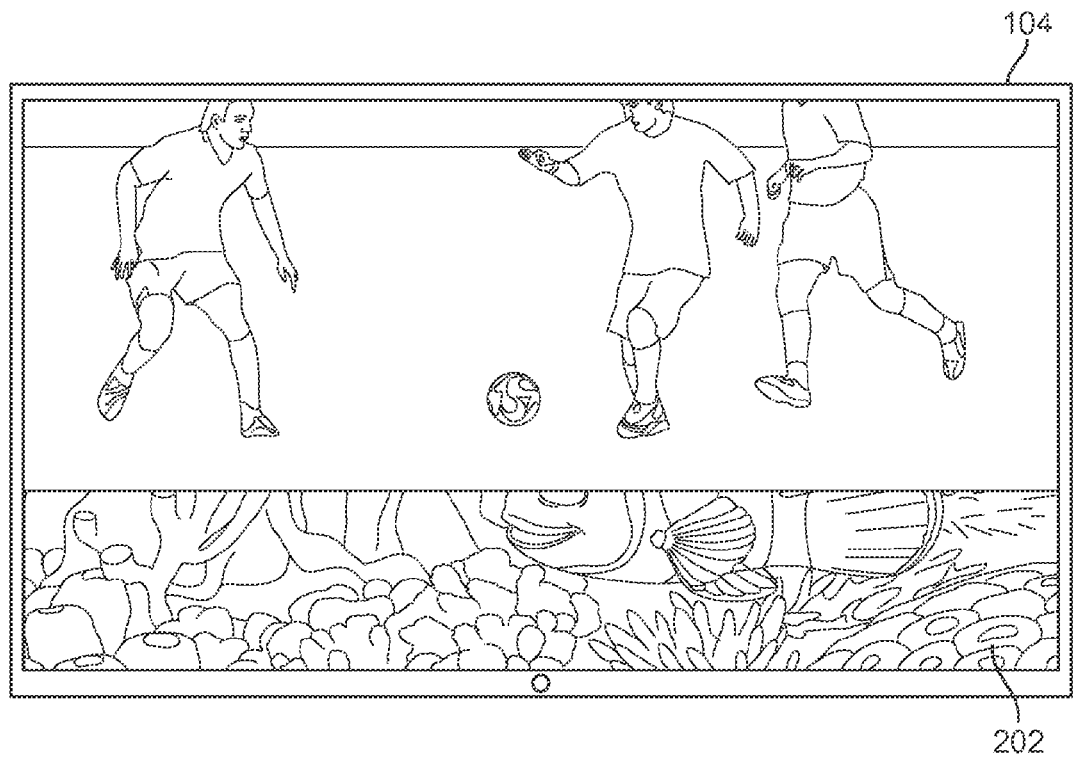
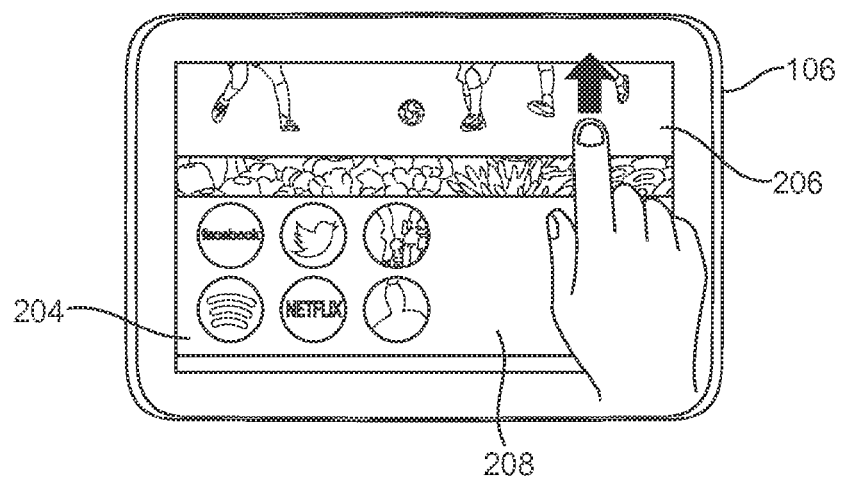
FIG. 6

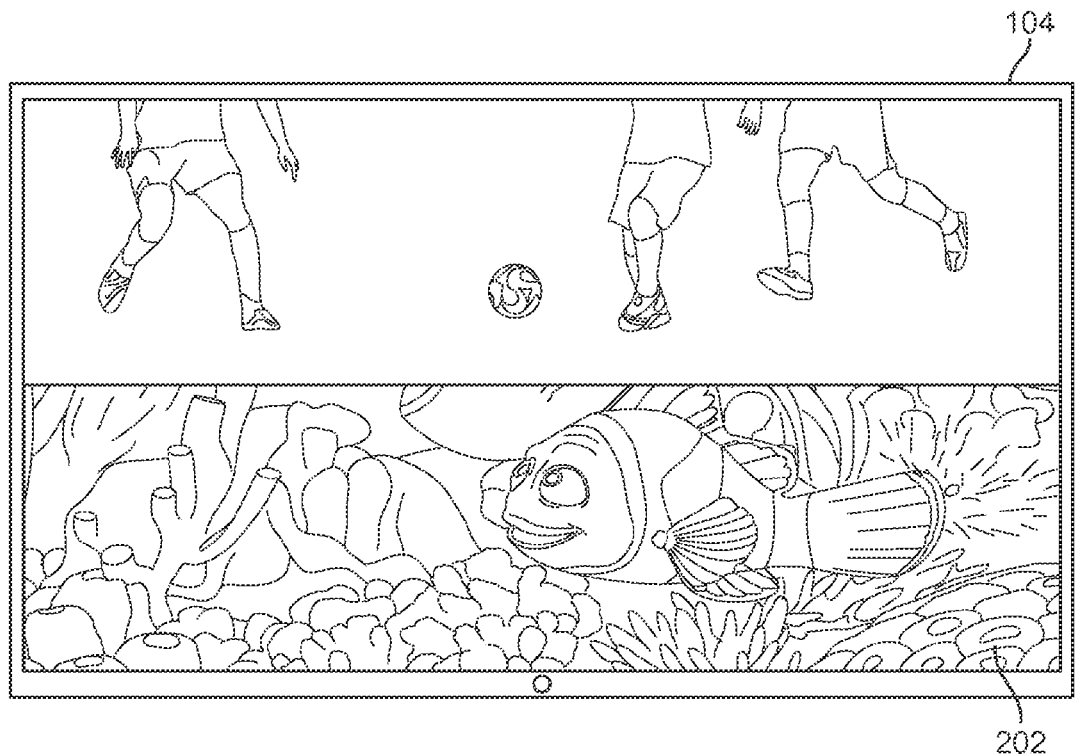
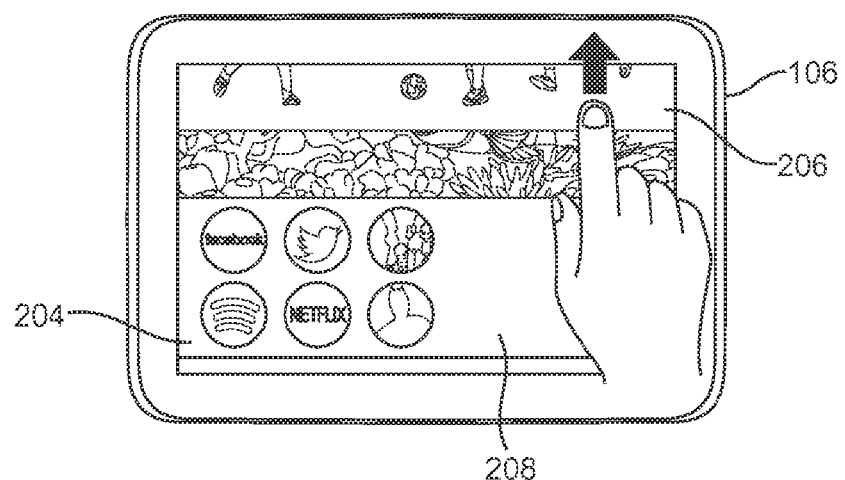
FIG. 7

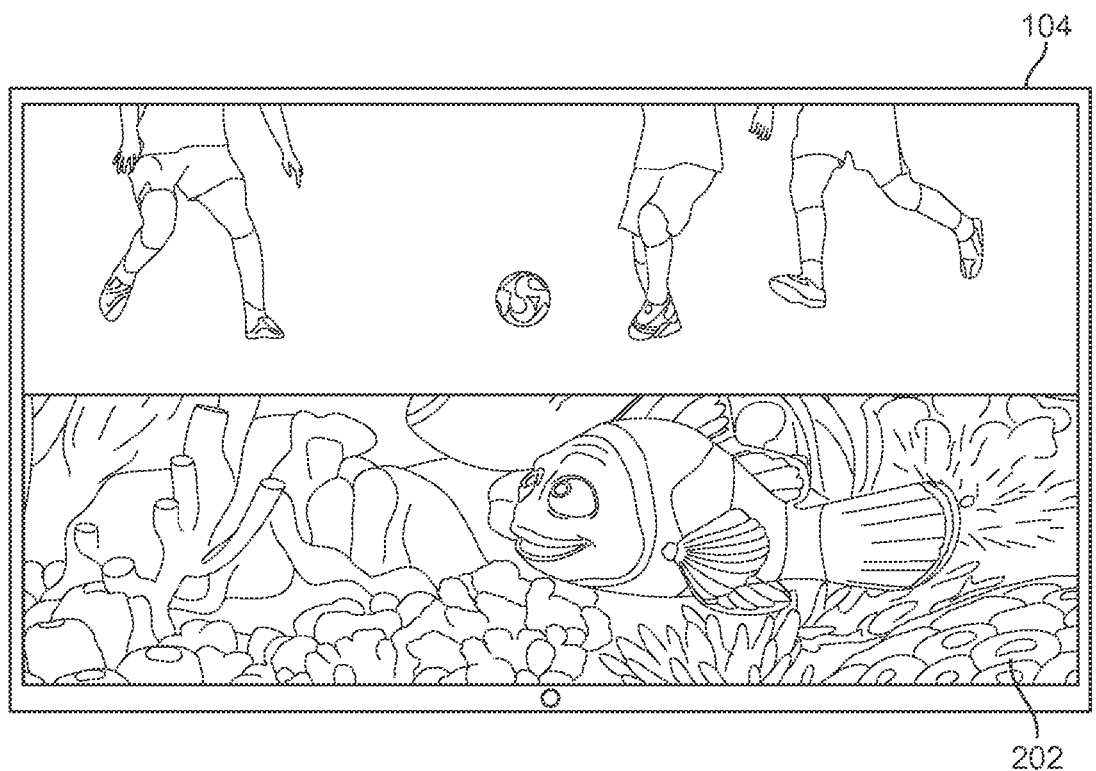
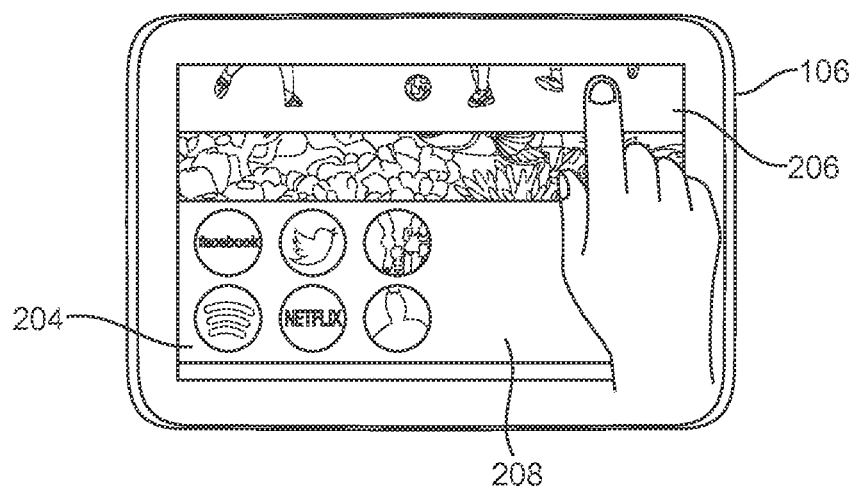
FIG. 8

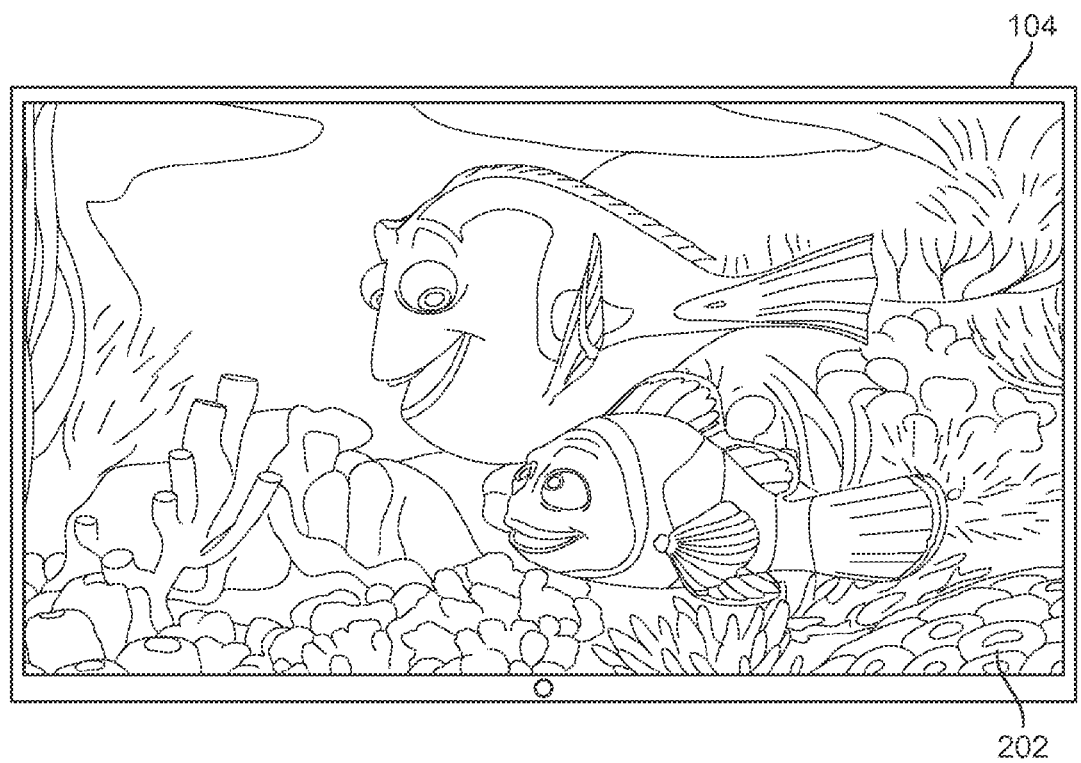
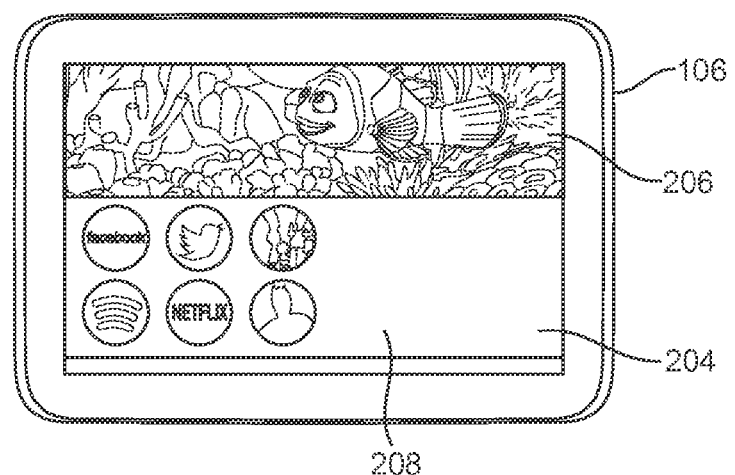
FIG. 9

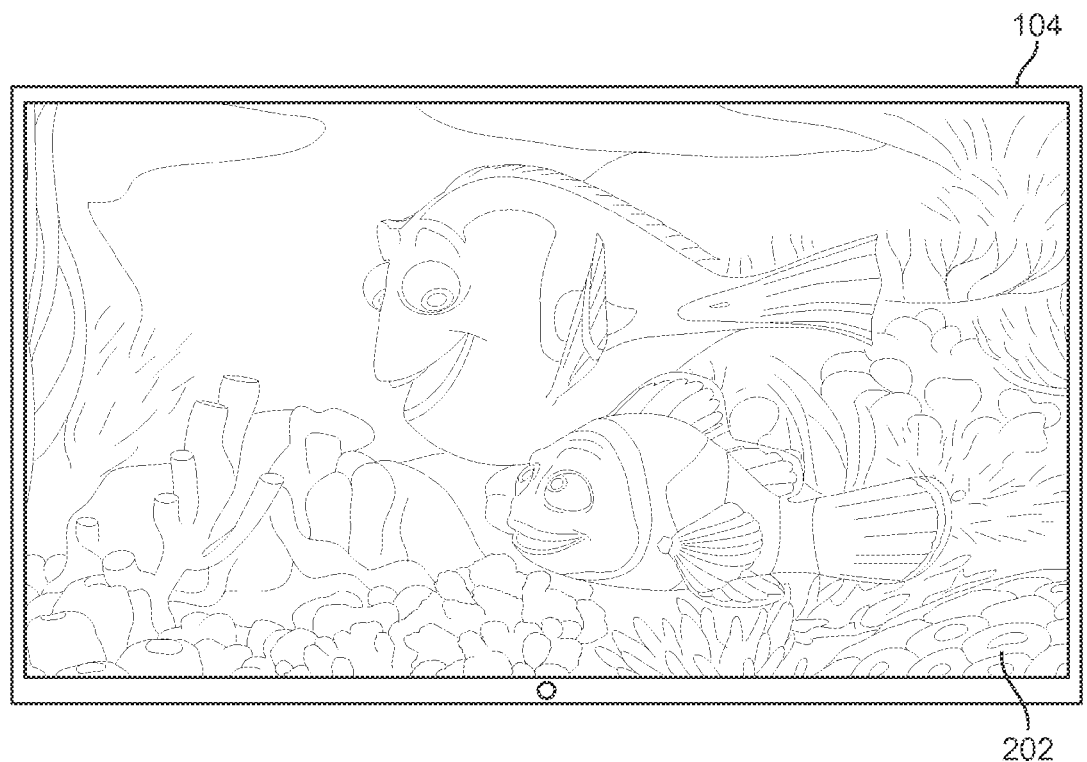
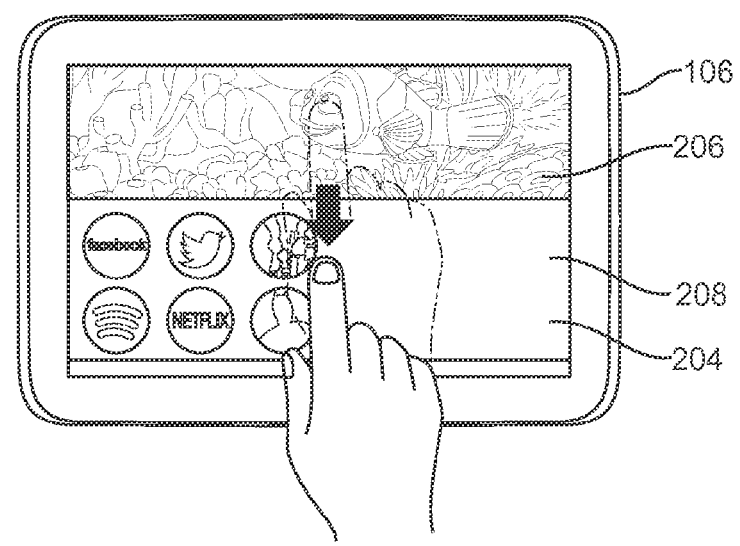
FIG. 14

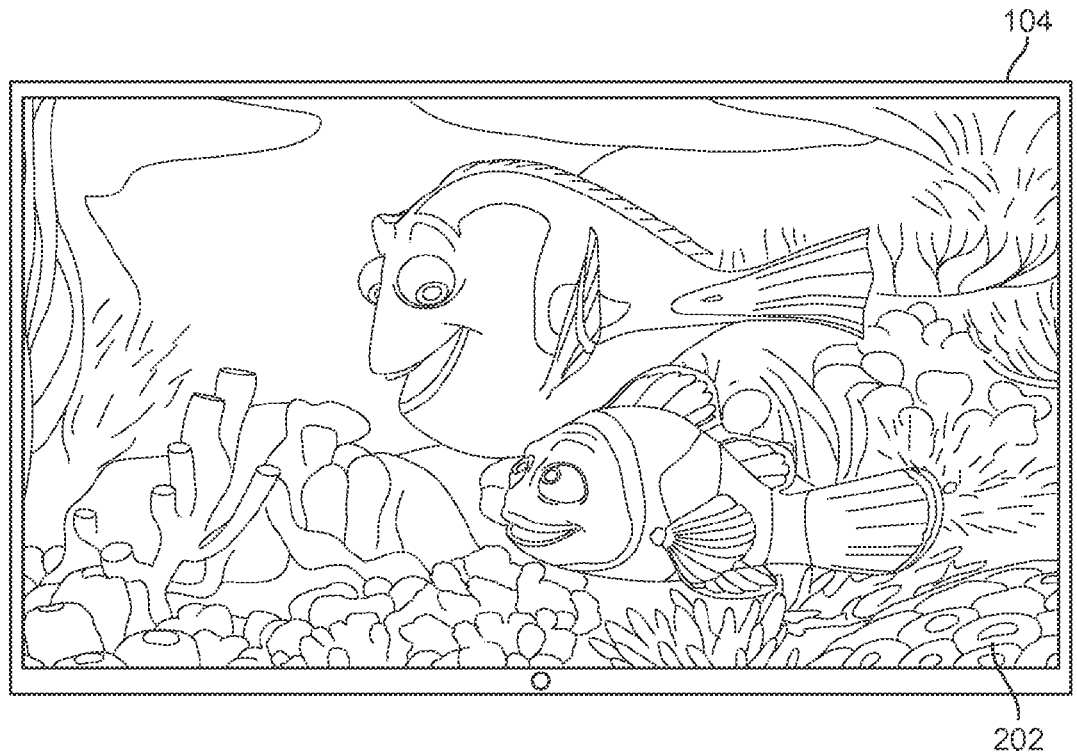
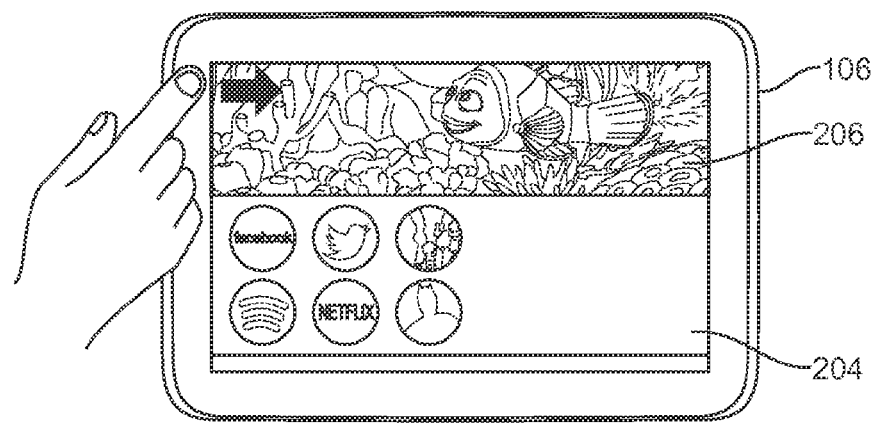
FIG. 16

COORDINATED SECOND-SCREEN ADVERTISEMENT

RELATED APPLICATIONS

This application claims priority to U.S. Provisional Patent Application No. 61/901,383, filed on Nov. 7, 2013, the content of which is incorporated herein by reference in its entirety.

TECHNICAL FIELD

The present technology pertains to outputting video content on a primary display, and more specifically pertains to navigation on a second-screen device with the effects of the navigation being shown on the primary display.

BACKGROUND

Current technology is allowing a user to watch a primary display, such as a television, while using a second-screen device, such as a tablet or a smart phone, to interact with the primary display. As such interactions are becoming more popular, television viewers are using the second-screen devices to find out what is on television and/or using the second-screen devices for searches, queries, sharing media content related to the content on the television and other interactions on the second-screen devices. However, the primary displays and second-screen devices typically do not interact and more specifically do not share a visual connection between the two devices. For example, a user sits in front of the television with the tablet on his or her lap and uses an application to find information related to a channel or program. If the application is related to what is on the television, the user has to make the connection between the two devices. For example, the user has to watch and/or listen to the television and interact with the second-screen device.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings.

FIG. 2A illustrates a block diagram of a primary display and a second-screen device of a TV bridge system in accordance with an exemplary embodiment;

FIG. 2B illustrates a block diagram of a primary display and a second-screen device of a TV bridge system in accordance with an alternative exemplary embodiment;

FIG. 2C illustrates a block diagram of a primary display and a second-screen device of a TV bridge system in accordance with another alternative exemplary embodiment;

FIG. 4 illustrates screenshots of the primary display and the second-screen device displaying video streams from a currently tuned channel in accordance with an exemplary embodiment;

FIG. 5 illustrates screenshots of the primary display and the second-screen device for a peek command gesture in accordance with an exemplary embodiment;

FIG. 6 illustrates screenshots of the primary display and the second-screen device for a peek command that is less than 50%/50% in accordance with an exemplary embodiment;

FIG. 7 illustrates screenshots of the primary display and the second-screen device for a peek command that is 50%/50% in accordance with an exemplary embodiment are illustrated;

FIG. 8 illustrates screenshots of the primary display and the second-screen device for an up channel command gesture in accordance with an exemplary embodiment;

FIG. 9 illustrates screenshots of the primary display displaying a video stream and the second-screen device displaying video streams for a newly tuned channel in accordance with an exemplary embodiment;

FIG. 14 illustrates screenshots of the primary display and the second-screen device for a full screen command gesture in accordance with an exemplary embodiment;

FIG. 16 illustrates screenshots of the primary display and the second-screen device for a tear to unlock command gesture in accordance with an exemplary embodiment;

DESCRIPTION

Figure 1:
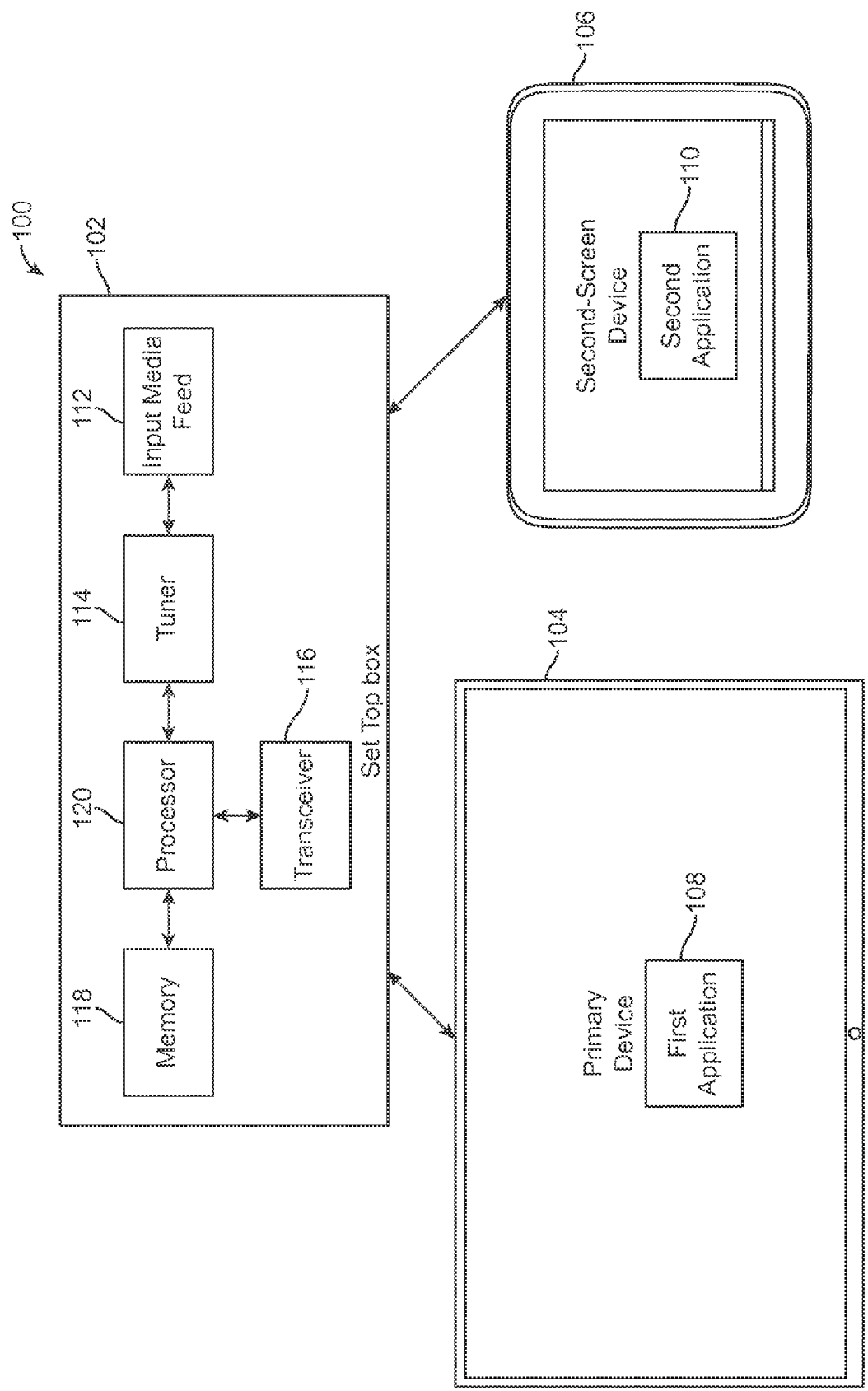
FIG. 1 illustrates a block diagram of a TV bridge system in accordance with an exemplary embodiment.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview: Disclosed are systems, methods, and non-transitory computer-readable storage media for providing coordinated graphical user interfaces on a plurality of devices. A set top box can output first media content to a primary display, such as a television. A first application on the primary display can display a video stream associated with the first media content. The set top box can output second media content to a second-screen device, such as a tablet. A second application on the second-screen device can display a video stream associated with the second media content. The video stream of the second media content can be displayed in a video display area on the second-screen device. The video stream of the first media content and the video stream of the second media content can be associated with the same content and can be substantially synchronized. The second application can receive user gestures on a touchscreen of the second-screen device to control the video stream displayed on the primary display. For example, the gestures can include next channel up, next channel down, up peek, down peek, pause, play, fast forward and rewind. More specifically, gestures on the second-screen device can alter the displayed video stream on the primary display and/or can alter the displayed video stream on the second-screen device. As a result, the second-screen device acts as a bridge to affect the displayed video stream on the primary display.

The disclosed technology addresses the need in the art for a user to interact with a second-screen device that is coordinated with the content displayed on a primary display to control a video stream on a primary display and/or a video stream on a second-screen device. More specifically, a user is able to enter commands on a touchscreen of the second-screen device to control the video stream being displayed on the primary display. In addition, the second-screen device displays at least a partial video stream that is associated with the same content and can be substantially synchronized with the video stream that is displayed on the primary display. As a result, there is a visual connection between the primary display and the second-screen device with the entered gestures on the second-screen device being reflected on the primary display and/or the second-screen device. By having the results of the entered command on the second-screen device, the user can look at the second-screen device and know that the entered command was executed without having to go back and forth between the primary display and the second-screen device.

An application on the second-screen device can receive an advertisement stream and an interactive component. The application can display at least a partial display of the advertisement stream and the interactive component in a video display area on the second-screen device. The displayed advertisement stream can be associated with an advertisement stream being displayed by a primary display with the two advertisement streams being associated with the same content and substantially synchronized. In some embodiments, the displayed interactive component can be a downloadable coupon or electronic coupon that can be downloaded to a coupon wallet associated with the second-screen device. In some embodiments, the displayed interactive component can be part of a first advertisement and when launched another advertisement such as a video can be displayed with the two advertisements being related to the same content. In some embodiments, when the displayed interactive component on the second screen device is activated, the advertisement can extend onto both screens with the interactive component moving on the display in response to movements by a viewer on the second-screen device. In some embodiments, the interactive component can be used to tailor an advertisement towards the viewer.

The disclosed technology addresses the need in the art for a user to interact with a second-screen device to view advertisements and have a more memorable experience compared to traditional advertisements. In addition, the viewer can build a stronger relationship with an advertiser, can learn more about an advertised product or service and/or have a more suitable advertisement to the viewer's needs. The advantages can assist advertisers in gaining a bigger benefit for the interactive advertisements compared to traditional advertisements.

An application can display at least a partial display of a video stream in a video display area on a touchscreen of the second-screen device, with the displayed video stream being associated with a video stream being displayed by a primary display with the two displayed video streams being associated with the same content and substantially synchronized. The application can receive touch data associated with a recording gesture on the touchscreen and can generate a recording of the displayed video stream on the touchscreen for a duration of the recording gesture. The application can display an image for the recording on the touchscreen. The application can supplement the recording with additional recordings, can allow for editing, previewing and posting of the recording.

The disclosed technology addresses the need in the art for a user to record screenshots and/or video clips of one or more video streams to form a recording and to post such a recording. The disclosed technology allows a user to modify the recording using one or more tools and to share the recording with others by posting the recording on one or more social media platforms.

An application for displaying at least a partial display of a video stream in a video display area on a touchscreen of the second-screen device, with the displayed video stream being associated with a video stream being displayed by a primary display with the two displayed video streams being associated with the same content and substantially synchronized. The application launching a Facebook application on the second-screen device and displaying at least one chat message associated with the launched Facebook application in the video display area on the touchscreen. The application receiving touch data corresponding to a gesture selecting a displayed chat message having an associated tagged program link. In response to the selection, displaying in the video display area on a touchscreen of the second-screen device, a video stream associated with a program corresponding to the associated tagged program link. The displayed video stream can be associated with a video stream being displayed by a primary display with the two displayed video streams being associated with the same content and substantially synchronized. The application rewinding the received video stream to a point at about when the chat message having the associated tagged program link was sent in response to receiving touch data associated with a rewind gesture; and displaying the received video stream from the point the rewinding was stopped.

The disclosed technology addresses the need in the art for a user to chat with Facebook friends and to invite others to watch a program they are watching. By using a cloud DVR, friends of the viewer can watch the program from the point or a predetermined amount before the viewer sent a chat message informing others to watch the program. As a result, friends of the viewer are able to easily change the media content they are watching and watch the same program that a friend is watching by selecting a chat message.

As used herein the term "configured" shall be considered to interchangeably be used to refer to configured and configurable, unless the term "configurable" is explicitly used to distinguish from "configured." As used herein the term "transceiver" can mean a single device comprising a transmitter and receiver or can mean a separate transmitter and a separate receiver. The proper understanding of the term will be apparent to persons of ordinary skill in the art in the context in which the term is used.

Referring to FIG. 1, a block diagram of a TV bridge system in accordance with an exemplary embodiment is illustrated. As shown, the TV bridge system 100 can include a set top box 102, a primary display 104 and a second-screen device 106. Although FIG. 1 only shows one instance of the second-screen device 106, the system 100 can include one or more second-screen devices 106. The set top box 102 can receive media content and can output first media content to the primary display 104 and second media content to the second-screen device 106. The first media content and the second media content can be the same media content or can be different media content. The media content, first media content and second media content can include one or more of a video stream, an audio stream and non-video content.

The primary display 104 can be a television, a smart television, or any other device that is capable of receiving and displaying media content. The primary display 104 can display the video stream and/or non-video content on a screen associated with the primary display 104. The primary display 104 can play the audio stream on one or more speakers associated with the primary display 104. The primary display 104 can include a first application 108 configured to receive and output the first media content. In some embodiments, the first application 108 can decode the received first media content. The first application 108 can be configured to output one or more of the video stream, audio stream and the non-video content. For example, a processor (not shown) in the primary display 104 can run the first application 108 and generate output for the primary display 104.

The second-screen device 106 can be a touchscreen device, such as a tablet, a smart phone, a laptop computer or any other device capable of receiving and displaying media content. The second-screen device 106 can display one or more of the video stream, video streams and non-video content on a touchscreen of the second-screen device 106. The second-screen device 106 can play the audio stream on one or more speakers associated with the second-screen device 106. In some embodiments, the second-screen device 106 can play a different audio stream compared to the audio stream played on the primary display 104. For example, the audio stream played on the second-screen device can be in a different language or can be an audio description, which can also be known as video description or visual description. The second-screen device 106 can receive inputs, such as navigational input, via the touchscreen. The second-screen device 106 can include a second application 110 configured to receive and output the second media content. In some embodiments, the second application 110 can decode the received second media content. The second application 110 can be configured to output one or more of the video stream, audio stream and the non-video content. For example, a processor (not shown) in the second-screen device 106 can run the second application and generate output for the second-screen device 106.

The primary display 104 and second-screen device 106 can be communicatively coupled to the set top box 102. For example, the primary display 104 can be communicatively coupled to the set top box 102 via a cable and/or wirelessly. For example, the second-screen device 106 can be communicatively coupled to the set top box 102 via a cable and/or wirelessly. The cable can be an HDMI cable or any other suitable coupler for providing media content between the two devices. The wireless connection can be Bluetooth, Wi-Fi, or any other suitable wireless communication means for providing media content between the two devices.

As shown, the set top box 102 can include an input media feed 112, a tuner 114, a transceiver 116, memory 118 and a processor 120. Although FIG. 1 only shows one instance of the input media feed 112, tuner 114, transceiver 116, memory 118 and processor 120, the set top box can include one or more input media feeds 112, one or more tuners 114, one or more transceivers 116, one or more memories 118 and/or one or more processors 122. The set top box 102 is shown as a standalone device but can comprise one or more devices and/or can be integral with one or more devices. For example, the set top box 102 can be integrated into a television, such as a smart television. The set top box 102 can be a standalone device, a computer, a smart television or any other device capable of receiving media content and outputting two or more media streams. The input media feed 112 can receive media content from a media source. The media source can be a cable provider, satellite provider, internet provider, cloud provider, website, and/or any other entity that can provide media content to the set top box 102. In some embodiments, the media source can be a product, such as a DVD, or a device, such as a DVD player. The tuner 114 can be tuned to receive media content associated with a specific channel. The transceiver 116 can transmit media content to the primary display 104 and the second-screen device 106, can transmit one or more commands to the primary display 104 and/or second-screen device 106 and/or can receive commands from the second-screen device 106. In some embodiments, a transceiver 116 can transmit the same media content to both the primary display 104 and the second-screen device 106. In some embodiments, one or more transceivers 116 can transmit first media content to the primary display 104 and one or more transceivers 116 can transmit second media content to the second-screen device 106, with the one or more transceivers 116 being the same transceivers or different transceivers. In some embodiments, the one or more transceivers 116 can transmit the first media content and second media content as separate feeds or as a combined feed. The first media content and the second media content can be the same or can be different. The media content received from the input media feed 112 can be stored in memory 118. The processor 120 can control the media input feed 112, tuner 114, transceiver 116 and memory 118. The processor 120 can cause media content to be sent to the primary display 104 and the second-screen device 106, with each of the primary display 104 and the second-screen device 106 displaying the media content. The processor 120 can substantially synchronize the media content displayed on the primary display 104 and the second-screen device 106.

Referring to FIG. 2A, a block diagram of a primary display and a second-screen device of a TV bridge system in accordance with an exemplary embodiment is illustrated. A screen 202 of a primary display 104 can display the received media content and a touchscreen 204 of a second-screen device 106 can display the received media content. The screen 202 can display a video stream of the first media content and/or non-video content of the first media content. More specifically, the first application can cause the video stream of the first media content and/or the non-video content of the first media content to be displayed on the screen 202. For example, the primary display 104 can be a television displaying the video stream of the first media content on a screen 202 of the television.

The touchscreen 204 can display a video stream of the second media content and/or non-video content of the second media stream. More specifically, the second application can cause the video stream of the second media content and/or the non-video content of the second media content to be displayed on the touchscreen 204. For example, the second-screen device 106 can be a tablet displaying part of the video stream of the second media content in a video display area 206 on the touchscreen 204 and/or can display the non-video content of the second media content in an active display area 208 on the touchscreen 204. As shown, the video display area 206 and the active display area 208 can each be limited in size, for example, less than full screen. The video display area 206 can display the video stream of the second media content and/or can display the non-video content of the media content. The active display area 208 can display non-video content of the second media content. The active display area 208 can display non-video content associated with the second media content or other media content. For example, the non-video content can be information associated with video stream, such as a listing of cast members of a television show being displayed on the primary display 104 and the second-screen device 106. In some embodiments, the other media content can be media content not associated with the second media content. For example, the other media content can be information associated with a television show not being displayed on the primary display 104 and the second-screen device 106. As shown, the video display area 206 can be displayed near the top of the touchscreen 204 and the active display area 208 can be displayed below the video display area 206. In some embodiments, the video display area 206 and active display area 208 can be located in other locations on the second-screen device 106, such as switched as shown in FIG. 2B or side by side as shown in FIG. 2C. In some embodiments, the user can adjust the size of the video display area 206 and/or the active display area 208.

The set top box can transmit the first media content to the primary display 104 and can transmit the second media content to the second-screen device 106. More specifically, one or more transceivers 116 can transmit the first media content to the primary display 104 and can transmit the second media content to the second-screen device 106. In some embodiments, one or more transceivers 116 can be dedicated to only transmit first media content to one or more primary displays 104 and one or more transceivers 116 can be dedicated to only transmit second media content to one or more second-screen devices 106. In some embodiments, one or more transceivers 116 can transmit first media content and second media content to one or more primary displays 104 and to one or more second-screen devices 106.

The video stream being displayed on the screen 202 and the video stream being displayed on the touchscreen 204 can be associated with the same content and can be substantially synchronized. Synchronization of the video stream being displayed on the screen 202 and the video stream being displayed on the touchscreen 204 can be accomplished using various known techniques or methodologies. In some embodiments, the processor 120 of the set top box 102 can synchronize the video stream for the primary display 104 and the video stream for the second-screen device 106. In such embodiments, the set top box 102 can act as a master and the primary display 104 and the second-screen device 106 can be slaves in a master-slave relationship. For example, the processor 120 can send, via one or more transceivers 116, the first media content and the second media content at the same time, so that the primary display 104 displays the video stream of the first media content and the second-screen device 106 displays the video stream of the second media content at about the same time, so the two video streams are substantially synchronized. In another example, the processor 120 can send, via one or more transceivers 116, time coded segments of the video streams in a coordinated manner. For example, the processor 120 can send, via one or more transceivers 116, a stream of video streams that are time coded in some ways, such as continuous streams (e.g., a broadcast) or fragmented streams (e.g., internet streamed content). In such embodiments, both the primary display 104 and the second-screen device 106 can have their playback position, such as the timecode of a given frame, coordinated such that both the primary display 104 and the second-screen device 106 are displaying the same video frames substantially at the same time. In such embodiments, the set-top box 102 can control the synchronization. In addition, the primary display 104 and the second-screen device 106 are able to maintain the temporal synchronization through normal playback and trick modes (such as skipping for playback at speeds other than normal playback).

In some embodiments, the primary display 104 and the second-screen device 106 can access the content directly from the internet, with the set top box 102 having little to no involvement. In embodiments having set-top box 102 involvement, the set top box 102 can act as a master and the primary display 104 and the second-screen device 106 can be slaves in a master-slave relationship. In embodiments having no set-top box 102 involvement, the primary display 104 can act as a master and the second-screen device 106 can act as a slave. In such arrangements, the media content provided by the primary display 104 to the second-screen device 106 can use simple and low latency encoding over a connection, such as WiFi with the video content can be temporally or spatially down sampled to minimize required bandwidth. As a result, the displayed video content on the second-screen device 106 can be substantially synchronized with the displayed video content on the primary display 104. In other embodiments having no set-top box 102 involvement, the second-screen device 106 can act as a master and the primary display 104 can act as a slave. In yet other embodiments, the functionalities described above with respect to the set-top box 102, can be performed by a different entity, such as cloud computing.

The video display area 206 can serve as a bridge between the primary display 104 and the second-screen device 106. The video display area 206 can be used to enter commands to control the video stream being displayed on the primary display 104. In response to the touchscreen 204 sensing a gesture, the second-screen device 106 can send a command to the set top box 102. In response to receiving the command, the set top box 102 can respond to the received command. For some commands, the set top box 102 can respond by sending a corresponding command to the primary display 104 causing the primary display 104 to execute the command thereby affecting the media content being displayed on the screen 202. For other commands, the set top box 102 can respond by changing and/or altering the media content being sent to the primary display 104 and/or the second-screen device 106. The active display area 208 can be used to enter commands to control the video stream being displayed on the second-screen device 106 as explained below.

Figure 3:
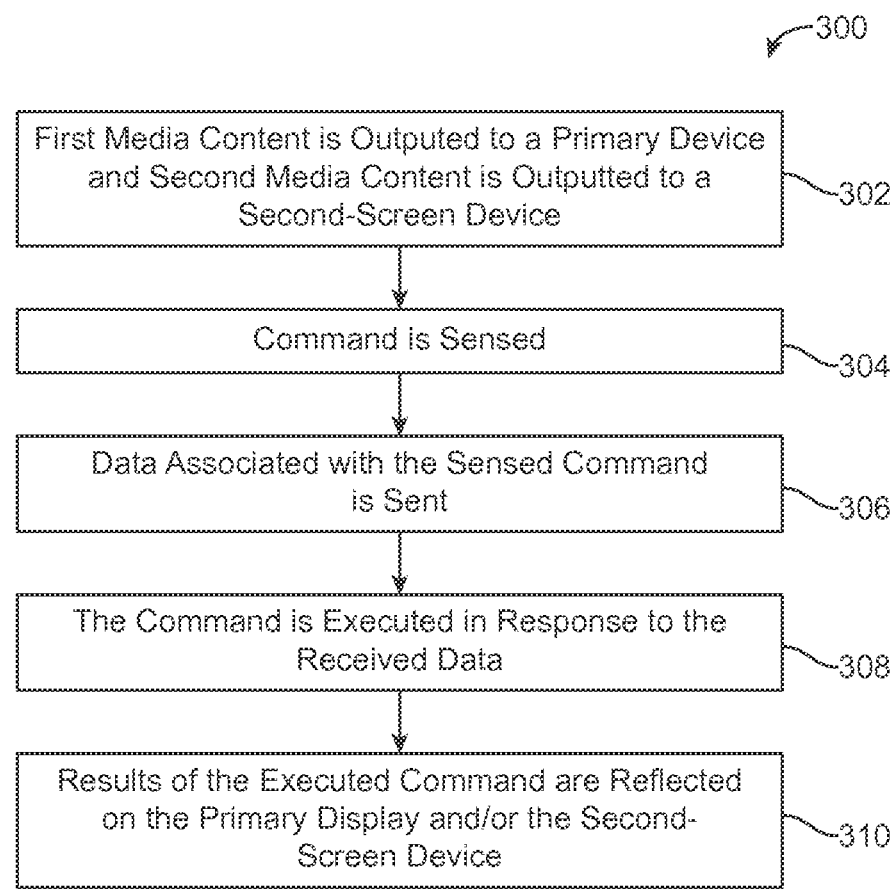
FIG. 3 illustrates a flowchart for executing a command in accordance with an exemplary embodiment.

Referring to FIG. 3, a flowchart for executing a command in accordance with an exemplary embodiment is illustrated. The exemplary method 300 is provided by way of example, as there are a variety of ways to carry out the method. The method 300 described below can be carried out using the configurations illustrated in FIGS. 1 and 2 by way of example, and various elements of these figures are referenced in explaining exemplary method 300. Each block shown in FIG. 3 represents one or more processes, methods or subroutines, carried out in the exemplary method 300. The exemplary method 300 can begin at block 302.

At block 302, first media content is outputted to a primary display and second media content is outputted to a second-screen device. For example, the set top box 102 outputs, via one or more transceivers 116, first media content to the primary display 104 and second media content to the second-screen device 106. A first application 108 on the primary display 104 causes a video stream associated with the received first media content to be displayed on the screen 202 of the primary display 104. A second application 110 on the second-screen device 106 causes a video stream associated with the received second media content to be displayed on the touchscreen 204 of the second-screen device 106. After outputting the first media content and the second media content, the method 300 can proceed to block 304.

Referring to FIG. 4, screenshots of a screen and touchscreen in accordance with an exemplary embodiment are illustrated. As shown, the video stream associated with the received first media content is displayed on the screen 202 of the primary display 104 and the video stream associated with the second media content is displayed on the touchscreen 204 of the second-screen device 106. More specifically, the second application 110 displays part of the video stream associated with the second media content in a video display area 206. The first video stream 214 displayed on the screen 202 and the partial video stream 216 displayed on the touchscreen 204 can be associated with the same video content and can be substantially synchronized. As shown, the video stream displayed on the primary display 104 and the partial video stream displayed on the second-screen device 106 are associated with the same video content and are substantially synchronized. More specifically, the displayed video streams are for a soccer game with the primary display 104 displaying the soccer game full screen on the display 202 and the second-screen device 106 displaying part of the soccer game, for example, the bottom part, in the video display area 206 of the touchscreen 204. As shown, icons for launching applications can be displayed in the active display area 208 of the touchscreen 204.

Returning to FIG. 3, at block 304, a command is sensed. For example, the touchscreen 204 can sense one or more gestures for a command entered by a user. In some embodiments, the touchscreen 204 can sense one or more gestures entered by the user in the video display area 206 and/or the active display area 208. In some embodiments, the command can be sensed when the touchscreen 204 is displaying the video stream in full screen mode. The commands can include, but are not limited to, a peek command (such as an up peek command or a down peek command), a change channel command (such as channel up command or a channel down command), a pause command, a resume command, an adjustment command (such as a fast forward command or a rewind command), full screen command or tear to unlock command.

After a gesture for a command is sensed, the method 300 can proceed to block 306.

At block 306, data associated with the sensed command is sent. For example, the second-screen device 106 can send, via a transceiver, data associated with a partial or full command to the set top box 102. In some embodiments, the data associated with the sensed command can be the touch data. The touch data can be the data associated with the gesture. For example, the data associated with the command gesture can include one or more of the following: coordinates of the original touch, coordinates of the last touch, the time from the original touch to the last touch, and whether the touch is maintained or released. The touch data can be sent in one or more messages. The data associated with the sensed command can include time data, such as how long the gesture was made. After the data associated with the sensed command is sent, the method 300 can proceed to block 308.

At block 308, the command is executed in response to the received data associated with the sensed command. For example, the processor 120 of the set top box 102 can receive, via a transceiver 116, the data associated with the sensed command and can execute the sensed command. In response to receiving the data associated with the sensed command, the processor 120 can determine the sensed command based on the received data and can execute the sensed command. After executing the command in response to the received data, the method 300 can proceed to block 310.

At block 310, the results of the executed command can be reflected on the primary display and/or on the second-screen device. For example, the processor 120 can change the first media content being sent to the primary display 104 and/or the second media content being sent to the second-screen device 106. Below, each of the commands are described in further detail and one or more of the blocks of method 300 are described with more detail.

Regarding a peek up command, the sensed gesture at block 304 can comprise an upward gesture starting in the video display area 206, continuing vertically upward in the video display area 206 and maintaining the touch in the video display area 206 as shown in FIG. 5. For a peek down command, the sensed gesture at block 304 can comprise a downward gesture starting in the video display area 206, continuing vertically downward in the video display area 206 and maintaining the touch in the video display area 206. As a result of the sensed gesture, the data associated with the sensed gesture can be sent at block 306. In response to the receiving the data associated with the sensed command, the set top box 102 can execute the command at block 308. For a peek up command or peek down command, the processor 120 of the set top box 102 can execute the command by causing a tuner 114 to tune to the desired channel, such as the next available channel up from the current tuned channel for a peek up command or the next available channel down for a peek down command from the current tuned channel. In some embodiments, for a peek down command, the tuner 114 can tune to the immediate previously viewed channel. After tuning to the desired channel, the processor 120 can send the media content associated with the new tuned channel to the primary display 104 for display and to the second-screen device 106 for display at block 308. More specifically, the processor 120 can send the media content for the current channel and the media content for the desired channel, such as the next channel up from the current channel, the next channel down from the current channel or the immediate previously viewed channel. The results of the executed peek up or peek down command can be reflected on the primary display 104 and/or on the second-screen device 106 at block 208.

For a peek up command, the video stream displayed on top can be the tuned channel and the video stream displayed on bottom can be the newly tuned channel and for a peek down command, the video stream displayed on top can be the newly tuned channel and the video stream displayed on bottom can the tuned channel. In other embodiments, the two video streams can be displayed in other manners, for example, vice versa or side by side. The percentage of each video stream being displayed can be in accordance with the distance from the original touch to the last touch. In response to the user moving the user's finger in the opposite direction, the percentage of each video stream being displayed can be reflected accordingly. For example, the two video streams can be scrolled up and down with the percentages of each changing accordingly. In some embodiments, a peek distance threshold can be used to set the percentage of each displayed video stream at fifty-fifty (50%/50%). For example, the processor 120 can compare the distance traveled from the first touch to the last sensed touch to a peek distance threshold and in the event the distance traveled is not less than the peek distance threshold, the percentage of each displayed video stream can be set to fifty-fifty (50%/50%). For distances below the threshold, the percentage can be in accordance with the traveled distance. For example, if the distanced traveled is ten percent (10%) of the peek distance threshold, the percentages can be ten percent and ninety percent (10%/90%), if the distanced traveled is twenty percent (20%) of the peek distance threshold, the percentages can be twenty percent and eighty percent (20%/80%), etc. The percentages can change in response to the user moving the user's finger up or down with the percentages corresponding to the distance traveled from the original touch.

In response to the user releasing the user's touch on the touchscreen 204 prior to reaching the change channel distance threshold (discussed below), the peek up command or peek down command can end. As a result of the peek up or peek down command ending, the results can be reflected on the primary display 104 and/or on the second-screen device 106 at block 208 with the percentage of the video stream of the media content associated with the tuned channel increasing and the video steam of the media content associated with the newly tuned channel decreasing until the video stream associated with the tuned channel reaches one hundred percent (100%) of the screen 202 of the primary display 104 and of the video display area 208 of the second-screen device 106. In some embodiments, the percentages of the displayed video streams can change quicker in response to an end peek up or end peek down command compared to how the percentages of the displayed video streams change in response to a peek up command or peek down command. By changing the percentages of the displayed video streams quickly, the video stream of the media content associated with the tuned channel can appear to slam or push the video stream of the media content associated with the newly tuned channel.

Referring to FIG. 6, screenshots of the primary display and the second-screen device for a peek command that is less than 50%/50% in accordance with an exemplary embodiment are illustrated. As shown, the primary display 104 and the second-screen device 106 display the video stream associated with the current channel and the video stream associated with the newly tuned channel. For example, for a peek up command, the video stream displayed on top is the video stream of the tuned channel and the video stream displayed below is the video stream of the newly tuned channel and for a peek down command the video streams can be the opposite. More specifically, the video stream displayed on top is for a soccer game and the video stream on bottom is for the Finding Nemo movie. The displayed streams are for a distance that is below the peek distance threshold.

Referring to FIG. 7, screenshots of the primary display and the second-screen device for a peek command that is 50%/50% in accordance with an exemplary embodiment are illustrated. As shown, the primary display 104 and the second-screen device 106 display the video stream associated with the current channel and the video stream associated with the newly tuned channel. For example, for a peek up command, the video stream displayed on top is the video stream of the tuned channel and the video stream displayed below is the video stream of the newly tuned channel and for a peek down command the video streams can be the opposite. More specifically, the video stream displayed on top is for a soccer game and the video stream on bottom is for the Finding Nemo movie. The displayed streams are for a distance that is not less than the peek distance threshold.

Regarding a channel up command, the sensed gesture at block 304 can comprise an upward gesture starting in the video display area 206, continuing vertically upward in the video display area 206 and being released in the video display area 206 as shown in FIG. 8. For a channel down command, the sensed gesture at block 304 can comprise a downward gesture starting in the video display area 206, continuing vertically downward in the video display area 206 and being released in the video display area 206. As a result of the sensed gesture, the data associated with the sensed gesture can be sent at block 306. In response to the receiving the data, the set top box 102 can execute the command at block 308. For a channel up command or channel down command, the processor 120 of the set top box 102 can execute the partial or full command by causing a tuner 114 to tune to the desired channel, such as the next available channel up from the current tuned channel for a channel up command or the next available channel down for a channel down command from the current tuned channel and can send the media content associated with the new tuned channel to the primary display 104 for display and to the second-screen device 106 for display at block 308. In some embodiments, for a channel down command, the tuner 114 can tune to the immediate previously viewed channel. The processor 120 can send the media content for the current channel and the media content for the desired channel, the next channel up from the current channel, the next channel down from the current channel or the immediate previously viewed channel. The results of the executed channel up or peek channel command can be reflected on the primary display 104 and/or on the second-screen device 106 at block 208.

For a channel up command, the video stream displayed on top can be the tuned channel and the video stream displayed on bottom can be the newly tuned channel with the video stream of the newly tuned channel moving up until it replaces the tuned or previously tuned channel. For a channel down command, the video stream displayed on the bottom can be the tuned channel and video stream displayed on top can be the newly tuned channel with the video stream of the newly tuned channel moving down until it replaces the tuned or previously tuned channel. In other embodiments, the two video streams can be displayed in other manners, for example, vice versa or side by side.

In some embodiments, a change channel distance threshold can be used. The change channel distance threshold can be different from the peek distance threshold. For example, the processor 120 can compare the distance traveled from the first touch to the last sensed touch with the change channel distance threshold. In the event the distance traveled is less than the change channel distance threshold, the sensed gesture percentage of each displayed video stream can be in accordance with the traveled distance. This can be the same as for the peak commands. For example, if the distanced traveled is ten percent (10%) of the change channel distance threshold, the percentages can be ten percent and ninety percent (10%/90%), if the distanced traveled is twenty percent (20%) of the change channel distance threshold, the percentages can be twenty percent and eighty percent (20%/80%), etc. However, in the event the traveled distance is not less than the change channel distance threshold and the user releases the user's touch on the touchscreen 204, the video stream from the newly tuned channel can continue to increase compared to the tuned channel or previously tuned channel until the video stream of the newly tuned channel is one hundred percent (100%) of the available display area of the screen 202 of the primary display 104 and (100%) of the available display area of the video display area 206 of the second-screen device 106.

Referring to FIGS. 5-9, screenshots of the primary display and the second-screen device displaying video streams with different percentages of video streams for a currently tuned channel and a newly tuned channel in accordance with exemplary embodiments are illustrated. As shown in FIG. 5, a user is watching a currently tuned channel and enters an up channel command in the video display area 206. As shown in FIGS. 5 and 6, the percentages of the newly tuned channel increases with the video stream of the tuned channel decreasing in a similar manner as described above with respect to FIGS. 5 and 6 and the peek command. As shown in FIG. 8, the up channel command is completed. Once the change channel command is completed: the user releasing their touch from the touchscreen 204, the percentage of the display of the newly tuned channel can continue to increase until the video stream of the newly tuned channel is one hundred percent (100%) of the available display area of the screen 202 of the primary display 104 and (100%) of the available display area of the video display area 206 of the second-screen device 106 as shown in FIG. 9.

Figure 10:
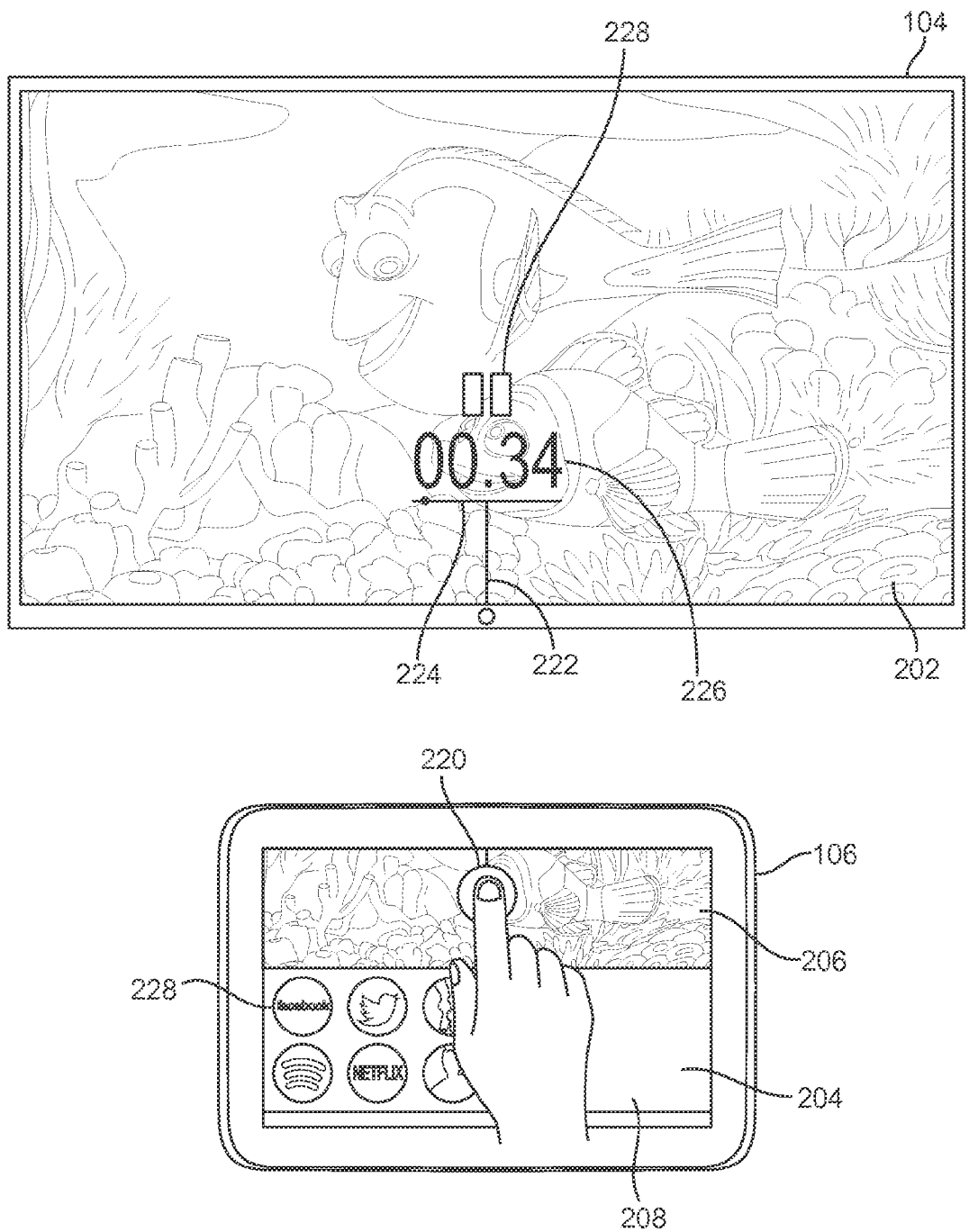
FIG. 10 illustrates screenshots of the primary display and the second-screen device for a pause command gesture in accordance with an exemplary embodiment.

Regarding a pause command, the sensed gesture at block 304 can comprise a tap in the video display area 206 of the second-screen device 106 as shown in FIG. 10. As a result of the sensed gesture, the data associated with the sensed gesture can be sent at block 306. For example, the data associated with the sensed gesture can include the location or coordinates of the tap. In response to the receiving the sensed gesture, the set top box 102 can execute the pause command at block 308. For example, the processor 120 can stop sending the media content to the primary display 104 and the second-screen device. The results of the executed pause command can be reflected on the primary display 104 and/or on the second-screen device 106 at block 310. For example, the last displayed frame can be maintained until another gesture is sensed. FIG. 10 shows the executed pause command with a pause icon 228 displayed on the primary display 104. A touch indicator 220 can be displayed on the second-screen device 106 where the user has touched the touchscreen 204. A line 222 can be shown on the touch indicator 220 on the second-screen device 106 and extending to the display 202 on the primary display 104. The primary display 104 can display a time scale 224 and a time stamp 226 showing where the pause command occurred with respect to the full video.

Figure 11:
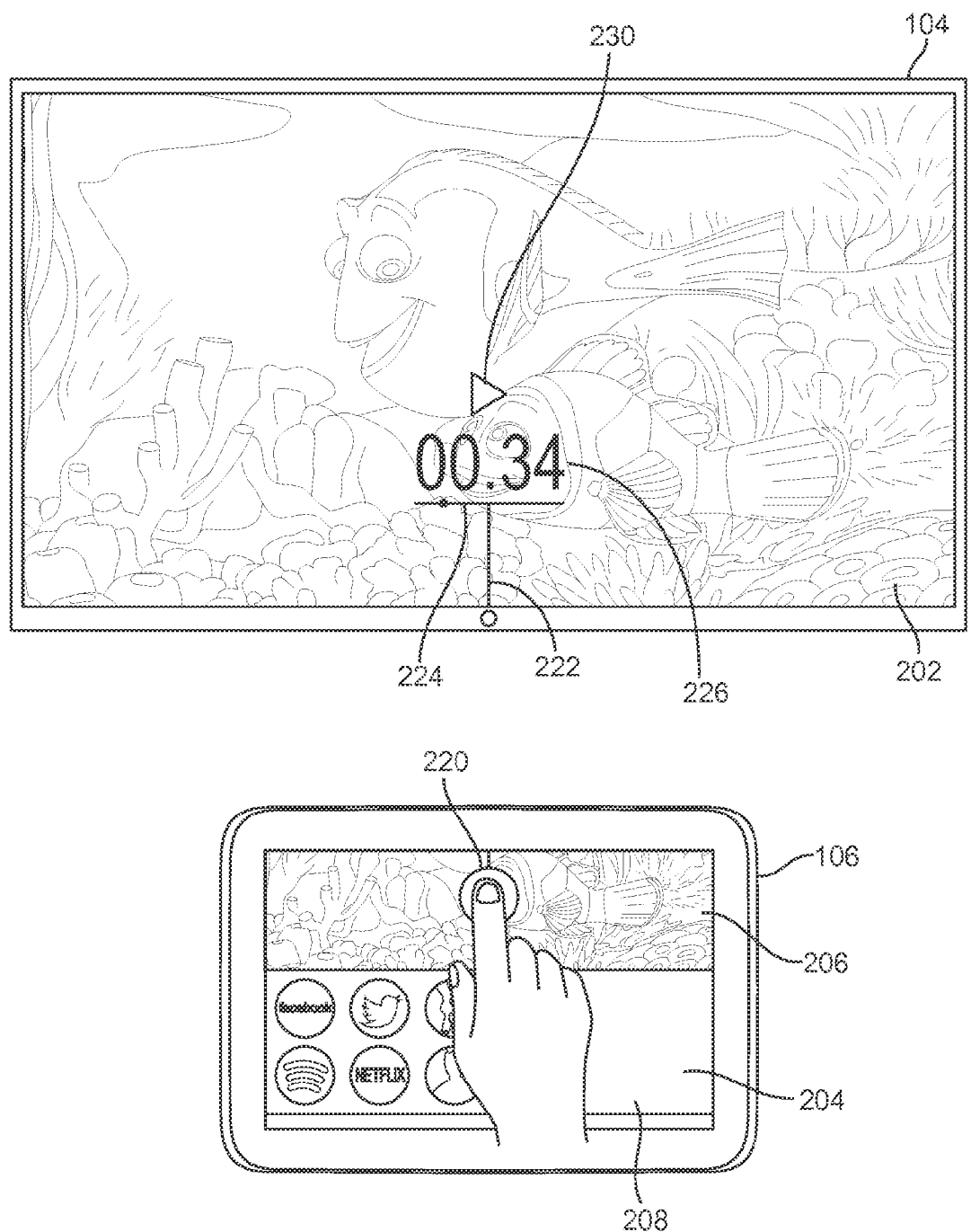
FIG. 11 illustrates screenshots of the primary display and the second-screen device for a resume command gesture in accordance with an exemplary embodiment.

Regarding a resume command, the sensed gesture at block 304 can comprise a tap in the video display area 206 of the second-screen device 106 as shown in FIG. 11. The tap would be a second tap to the pause command. As a result of the sensed gesture, the data associated with the sensed gesture can be sent at block 306. For example, the data associated with the sensed gesture can include the location or coordinates of the tap. In response to the receiving the sensed gesture, the set top box 102 can execute the resume command at block 308. For example, the processor 120 can resume sending the media content to the primary display 104 and the second-screen device. The results of the executed channel up or peek channel command can be reflected on the primary display 104 and/or on the second-screen device 106 at block 310. For example, the video streams associated with the received media streams can be displayed on the screen 202 of the primary display 104 and/or on the touchscreen 204 of the second-screen device 106. FIG. 11 shows the executed resume command with a resume icon 230 displayed on the primary display 104. The primary display 104 can display a time scale 224 and a time stamp 226 showing where the resume command occurred with respect to the full video.

Figure 12:
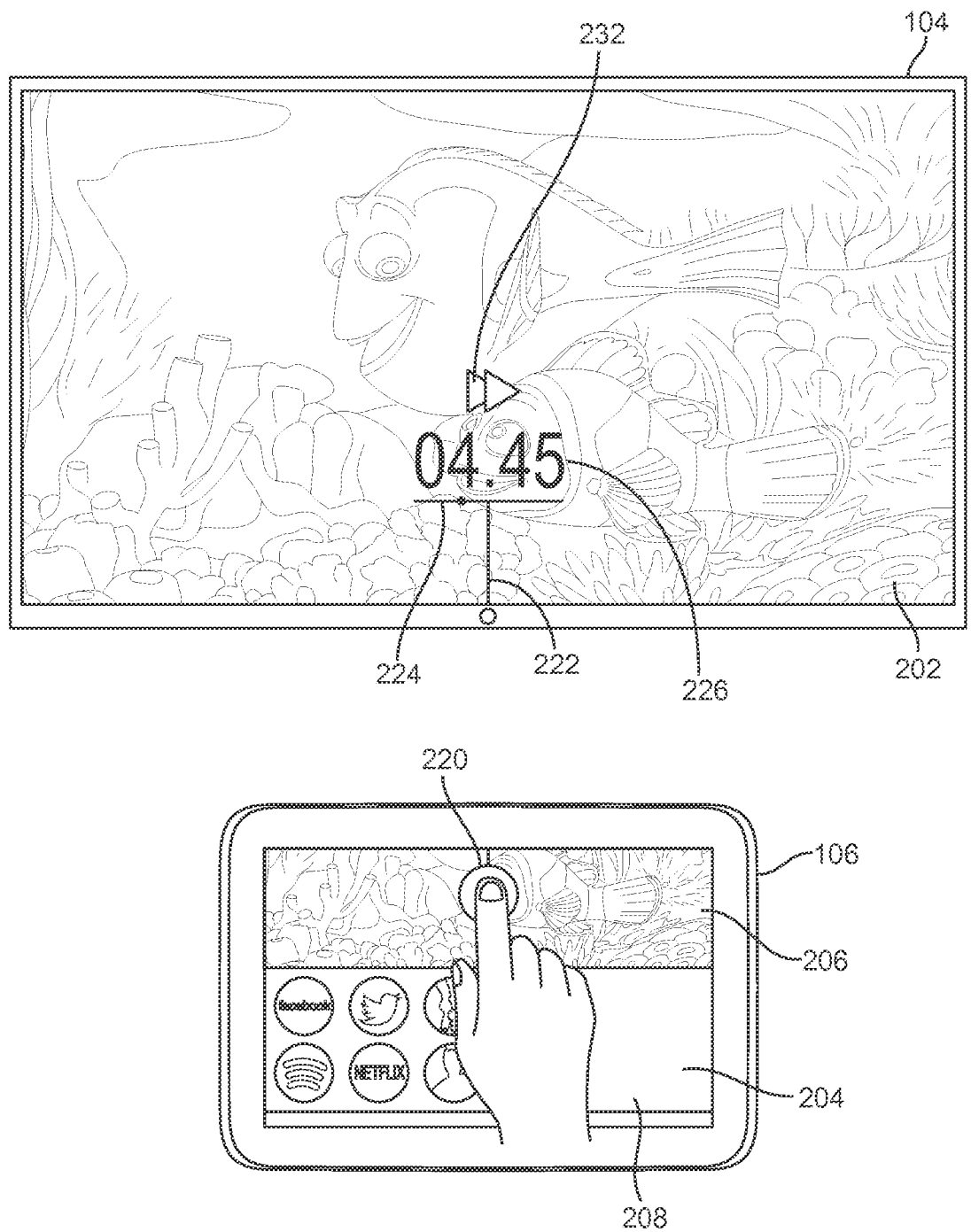
FIG. 12 illustrates screenshots of the primary display and the second-screen device for a fast forward command gesture in accordance with an exemplary embodiment.
Figure 13:
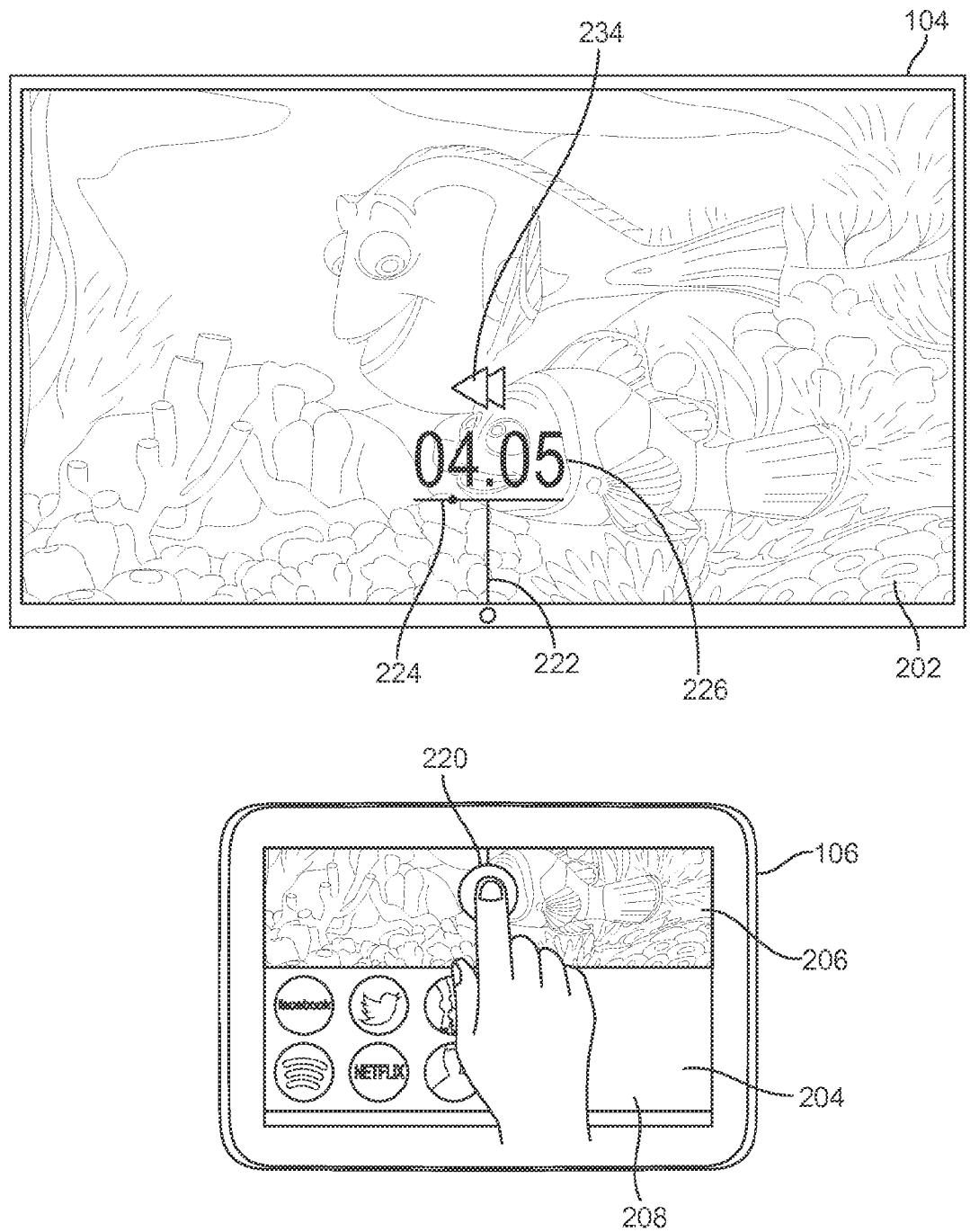
FIG. 13 illustrates screenshots of the primary display and the second-screen device for a rewind command gesture in accordance with an exemplary embodiment.

Regarding adjustment commands, such as a fast forward command or a rewind command, the processor 120 can execute the command by adjusting the video stream of the first media content and the video stream second media content being displayed by a time factor for as long as the user's touch on the screen is maintained. A fast forward command can be a touch in the video display area 206, continuing laterally to the right for a predetermined distance of the video display area 206 and being maintained in the video display area 206 as shown in FIG. 12. A rewind command can be a touch in the video display area 206, continuing laterally to the left for a predetermined distance of the video display area 206 and being maintained in the video display area 206 as shown in FIG. 13. The distance between the original touch and the end touch can adjust the video streams of the media content by a time factor accordingly. For example, a distance of ten percent (10%) of the screen width can result in a 1× fast forward, a distance of twenty percent (20%) of the screen width can result in a 2× fast forward, etc. The adjustment command can be sensed in block 304. As a result of the sensed gesture, the data associated with the sensed gesture can be sent at block 306. In response to the receiving the sensed gesture, the set top box 102 can execute the command at block 308. For example, the processor 120 can adjust the displayed video streams of the media content in accordance with the time factor and send the adjusted video streams of the media content to the primary display 104 for display and to the second-screen device 106 for display at block 308. The media content can be sent in various ways as discussed in further detail below. The results of the executed adjustment command can be reflected on the primary display 104 and/or on the second-screen device 106 at block 208. FIG. 12 shows the executed fast forward command with a fast forward icon 232 displayed on the primary display 104. The primary display 104 can display a time scale 224 and a time stamp 226 showing where the location of the video content is with respect to the full video. FIG. 13 shows the executed rewind command with a rewind icon 234 displayed on the primary display 104. The primary display 104 can display a time scale 224 and a time stamp 226 showing where the location of the video content is with respect to the full video.

In the event the received command is a fast forward command and the memory 118 does not contain stored media content, then the transmitted media content is not incremented by the time factor. In the event, the time factor is not beyond the stored media content in memory 118, the transmitted media content can be incremented by the time factor providing the time factor is not beyond the stored media content. In the event, the time factor is beyond the stored media content in memory 118, then the transmitted media content can be the media content received from the input media feed 112.

In the event the received command is a rewind command and the memory 128 does not contain stored media content, then the transmitted media content is not changed. In the event, the time factor is not beyond the stored media content in memory 128, the transmitted media content can be decremented by the time factor providing the time factor is not beyond the stored media content. In the event, the time factor is beyond the stored media content in memory 128, then the transmitted media content can be the media content stored in the memory 128 starting at the beginning of the stored media content.

Regarding a full screen command, the processor 120 can execute the command by causing the displaying the video stream on the second-screen device 106 full screen, for example, not only in the video display area 206. For example, a full screen command can be a touch in the video display area 206, continuing to the vertically downward beyond the video display area 206 and ending in the active display area 208. The full screen command can be sensed in block 304 as shown in FIG. 14. As a result of the sensed gesture, the data associated with the sensed gesture can be sent at block 306. In response to the receiving the sensed gesture, the set top box 102 can execute the command at block 308. For example, the processor 120 can cause the display of the displayed video stream of the media content on the second-screen device 106 to be full screen at block 308. The media content can be sent in various ways as discussed in further detail below. The results of the executed adjustment command can be reflected on the second-screen device 106 at block 310.

Figure 15:
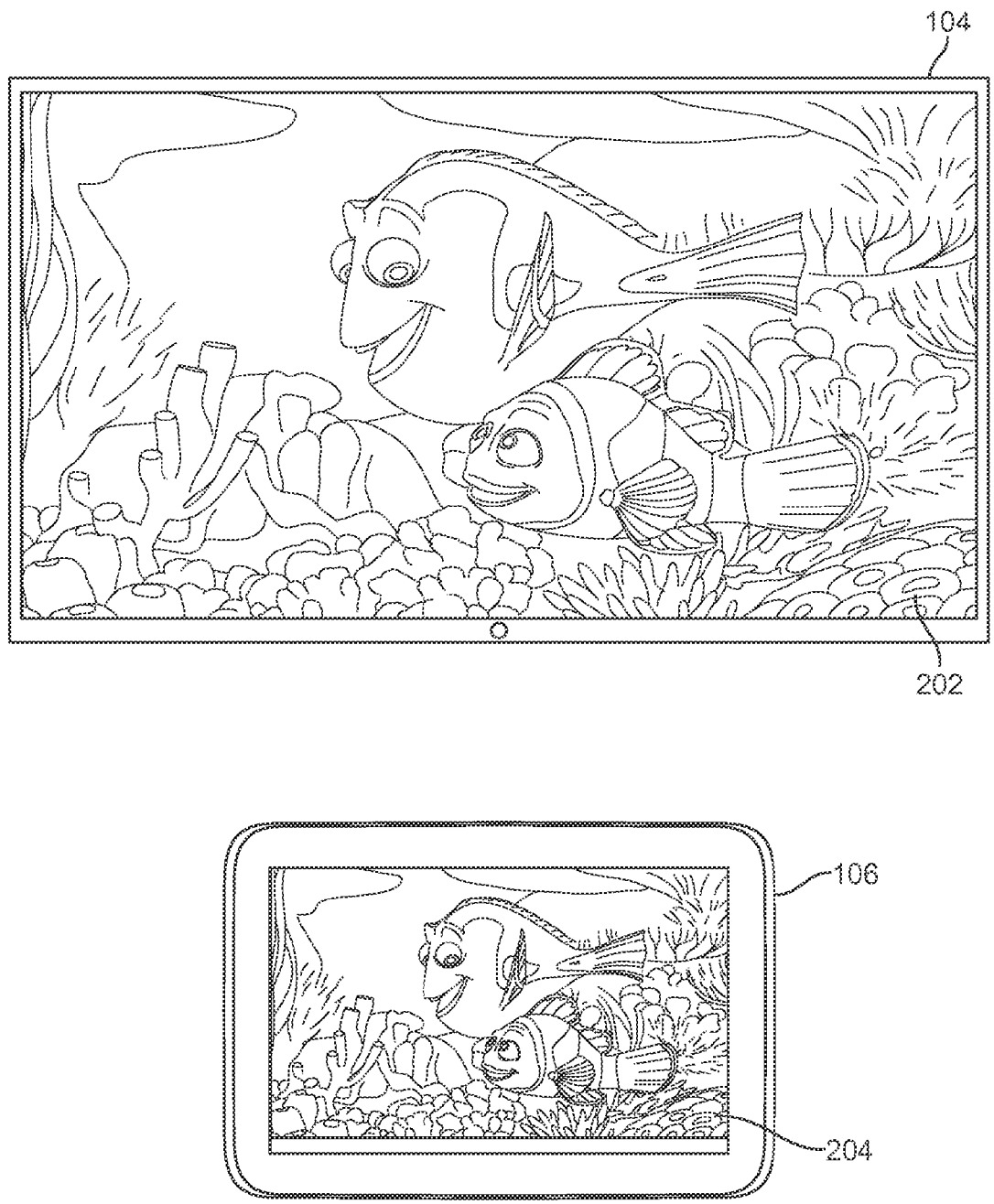
FIG. 15 illustrates screenshots of the primary display displaying a video stream and the second-screen device displaying a video stream in full screen in accordance with an exemplary embodiment.

Referring to FIG. 15, screenshots of the primary display displaying a video stream and the second-screen device displaying a video stream in full screen in accordance with an exemplary embodiment are illustrated. As shown, the video stream associated with the media content displayed on the screen 202 of the primary display 104 is shown full screen and the video stream associated with the media content displayed on the touchscreen 204 of the second-device device 310 is shown full screen.

Regarding the tear to unlock command, the processor 120 can execute the command by no longer requiring the video stream of the first media content and the video stream of the second media content to be substantially synchronized. A tear to unlock gesture command can be a touch to the left of the video display area 206, continuing to the right into the video display area 206 and ending in the video display area 206 as shown in FIG. 16. The tear to unlock command can be sensed in block 304. As a result of the sensed gesture, the data associated with the sensed gesture can be sent at block 306. In response to the receiving the sensed gesture, the set top box 102 can execute the command at block 308. For example, the processor 120 can cause the display of the displayed video stream of the media content on the second-screen device 106 to be full screen at block 310 as shown in FIG. 8. As a result of the tear to unlock command being executed, the video stream of the media content displayed on the screen 202 of the primary display 104 is displayed full screen and the video stream associated with the media content displayed on the touchscreen 204 of the second-screen device 106 is displayed full screen with the video streams no longer being required to synchronized.

The above described method 300 and commands are directed to embodiments where the second-screen device 106 is a "dumb" device which sends touch data. In some embodiments, the second screen device 106 can be a "smart" device and can interpret the sensed commands and send the "sensed command" to the set top box 102 which can execute the sensed command. For example, the second application 110 on the second-screen device 106 can sense a pause command on the touchscreen 204 and can send the sensed command to the set top box 102 which can execute the pause command. In some embodiments, the set top box 102 can receive the touch data or a sensed command and can execute the command by sending commands to the primary display 104 and/or second-screen device 106 with the first application 108 and/or the second application 110 executing the commands. In some embodiments, the second application 110 can determine the sensed command and can execute the command on the second-screen device 106. In such embodiments, the second-screen device 106 can send the touch data or the sensed command to the set top box 102 which can execute the command and have the results displayed on the primary display 104. Regardless of how the commands are executed, the user is able to enter commands via gestures on the second-screen device 106 with the set top box 102 causing the effects of the command on the primary display 104.

The processor 120 can send, via one or more transceivers 116, media content to the primary display 104 and the second-screen device 106. This can be done in various ways. In some embodiments, the processor 120 can send the same media content to both the primary display 104 and the second-screen device 106. In some embodiments, first media content can be sent to the primary display 104 and second media content can be sent to the second-screen device 106. In such embodiments, the first media content can comprise one or more video streams and one or more associated audio streams and the second media content can comprise one or more video streams, one or more associated audio streams and non-video content. The non-video content can include information associated with the one or more video stream. In other embodiments, the media content sent to the primary display 104 and/or the second-screen device 106 can include a single video stream comprising the video stream associated with the tuned channel and the video stream associated with a newly tuned channel in accordance with the command. For example, for a peek command, the single video stream can have ninety percent (90%) of the tuned channel and ten percent (10%) of the newly tuned channel with the percentage of each changing in accordance with the sensed gesture. In yet other embodiments, the media content can contain the video stream associated with the tuned channel and the video stream associated with the newly tuned channel along with instructions on how to display the video streams in accordance with the sensed gesture. For example, the media content can comprise both video streams with instructions for each application, the first application 108 and the second application 110, to display ninety percent (90%) of the tuned channel and ten percent (10%) of the newly tuned channel with the percentage of each changing in accordance with the sensed gesture. In yet another embodiment, one or more transceivers 116 can send media content comprising a video stream associated with the tuned channel, one or more transceivers can send media content comprising a video stream associated with the newly tuned channel, along with instructions on how to display the video streams in accordance with the sensed gesture. Regardless of how the media content is sent to the primary display 104 and the second-screen device 106, the primary display 104 and the second-screen device 106 display the video stream or video streams in accordance with the sensed gesture.

In some embodiments, graphic items, such as a touch indicator 220, line 222, time scale 224, time stamp 226 and an icon 228, 230, 232, 234, are displayed on the second-screen device 106 for an executed command that affects the location of the video content being displayed. These commands can include pause, resume, fast forward and rewind commands. In such embodiments, more, less and/or different graphic items can be displayed. For example, the time stamp 226 may not be displayed on the primary display 104 in response to an executed command. In other embodiments, one or more graphic items can be displayed for other executed commands, such as a peek command.

Figure 17:
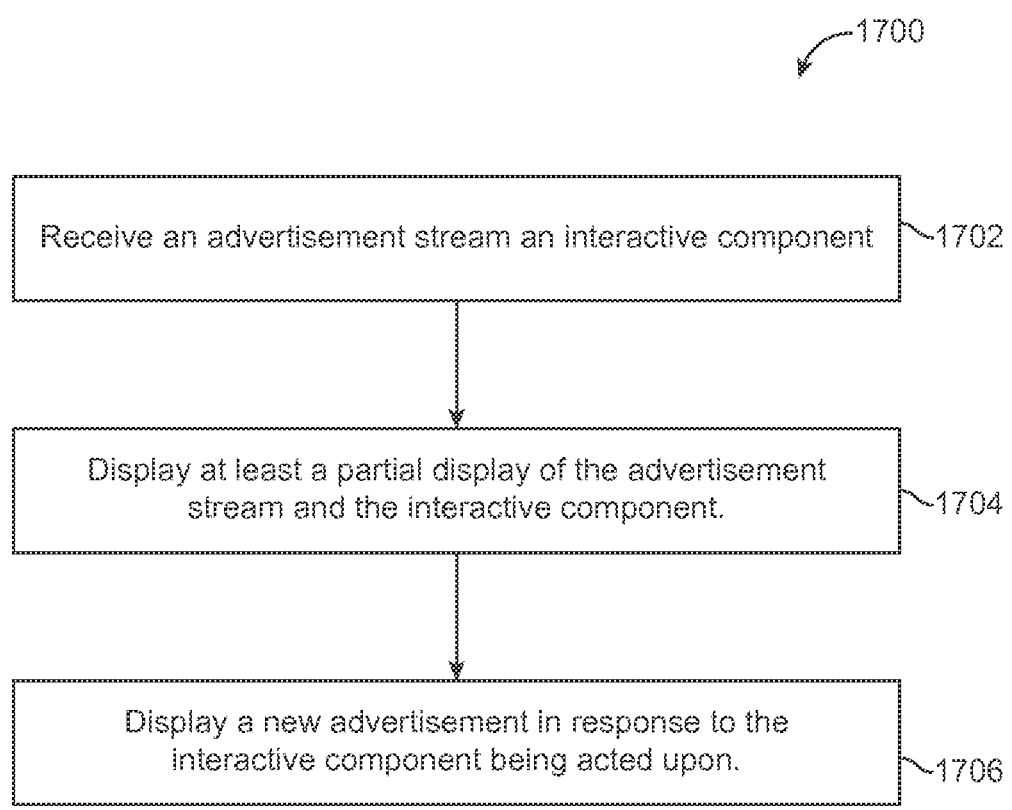
FIG. 17 illustrates a flowchart for displaying a graphical user interface and an interactive advertisement in accordance with an exemplary embodiment.

Referring to FIG. 17, a flowchart for displaying a graphical user interface and an interactive advertisement in accordance with an exemplary embodiment is illustrated. The exemplary method 1700 is provided by way of example, as there are a variety of ways to carry out the method. The method 1700 described below can be carried out using the configurations illustrated in FIGS. 1 and 2 by way of example, and various elements of these figures are referenced in explaining exemplary method 1700. Each block shown in FIG. 17 represents one or more processes, methods or subroutines, carried out in the exemplary method 1700. The exemplary method 1700 can begin at block 1702.

At block 1702, receive an advertisement stream and an interactive component. For example, the second application 110 can receive an advertisement stream and an interactive component for display on the touchscreen 204 of the second-screen device 106. The advertisement stream and the interactive component can be part of the second media content that the second-screen device 106. The advertisement stream can be a commercial. The advertisement stream and the interactive component can be from the same source or different sources. For example, the advertisement stream and the interactive component can be from a media stream source, advertisement server, cloud digital video recorder (DVR) and/or any other media source. The advertisement stream and the interactive component can be from one of the set top box 102, the previous listed sources and/or one of the previous listed sources via the set top box 102. The advertisement stream and/or interactive component can be part of the video stream. The interactive component can be part of the advertisement stream. The interactive component is discussed in further detail below. After receiving the advertisement stream and the interactive component, the method 1700 can proceed to block 1704.

Figure 18:
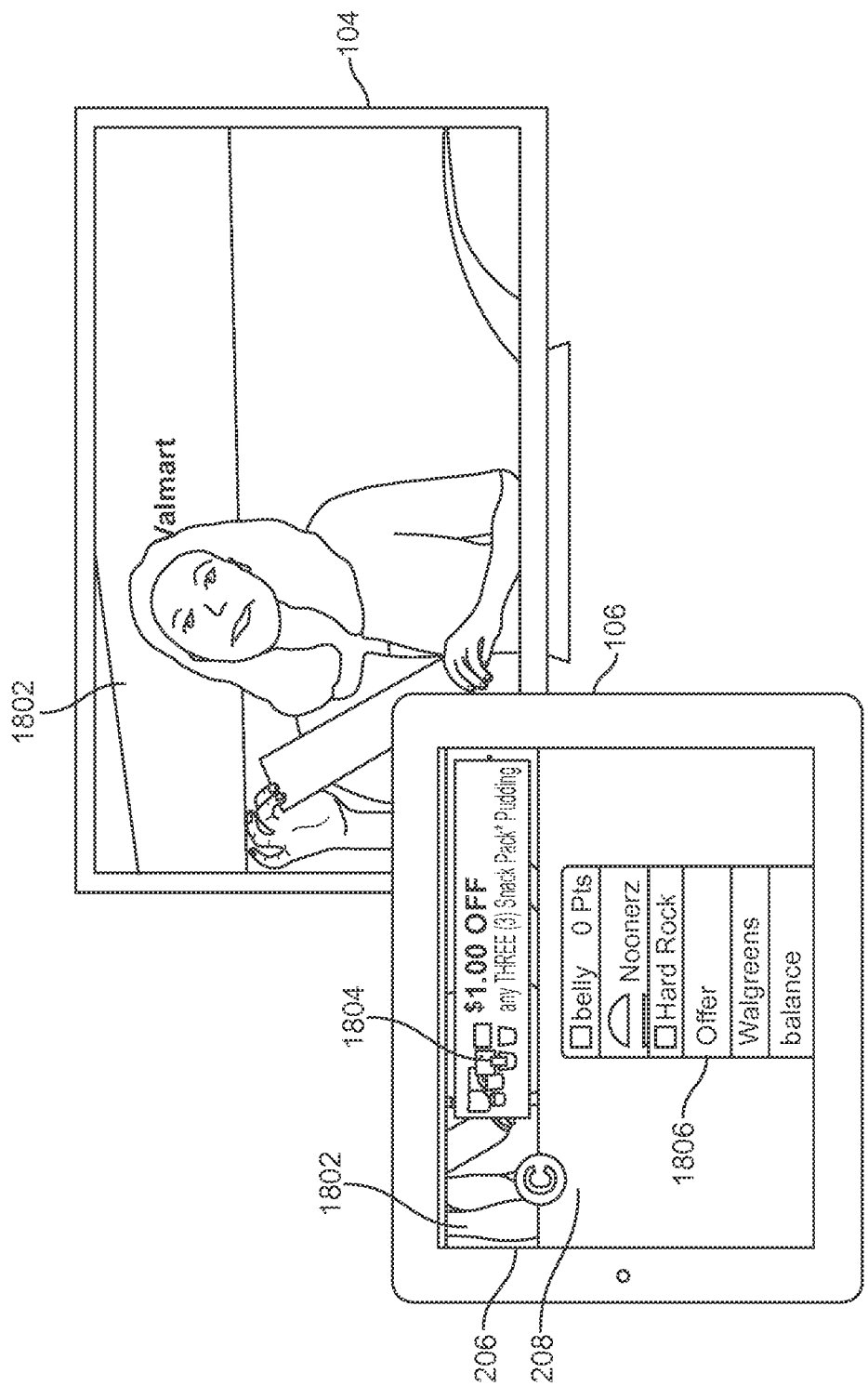
FIG. 18 illustrates screenshots of a screen and a touchscreen for an advertisement having a coupon interactive component in accordance with an exemplary embodiment.

At block 1704, display at least a partial display of the advertisement stream and the interactive component on the second-screen device. For example, the second application 110 can display at least a partial display of the advertisement stream and the interactive component in the video display area 206 on the touchscreen 204 of the second-screen device 106. The displayed advertisement stream can be associated with an advertisement stream displayed by the first application 108 on the screen 202 of the primary display 104. The displayed advertisement stream displayed on the screen 202 and the partial displayed advertisement displayed on the touchscreen 204 can be associated with the same advertisement content and can be substantially synchronized. FIG. 18 shows a displayed advertisement on the screen 202 and a displayed advertisement on the touchscreen 204 with the displayed advertisements being directed at the same content and being substantially synchronized. After displaying the advertisement stream and the interactive component, the method 1700 can proceed to block 1706.

At block 1706, display a new advertisement in response to the interactive component being acted upon. For example, in response to the interactive component being acted upon, the second application 110 on the second-screen device 106 can display the new advertisement on the touchscreen 204 of the second-screen device 106. The new advertisement can be associated with the previously displayed advertisement. The first application 108 on the primary display 104 can continue to display the previous advertisement on the screen 202 of the primary display 104 or can display a new advertisement on the screen 202. The new advertisement can be the same, associated with or different than the new advertisement displayed on the second-screen device.

Referring to FIG. 18, screen shots of a screen and a touchscreen for an advertisement having a coupon interactive component in accordance with an exemplary embodiment are illustrated. As shown, an advertisement 1802 for Walmart can be displayed on the screen 202 of the primary display 104 and the advertisement 1802 can be partially displayed in the video display area 206 on the touchscreen 204 of the second-screen device 106. An interactive component 1804 can be displayed in the video display area 206. The interactive component 1804 can be displayed at any time during the displaying of the advertisement 1802. For example, the interactive component 1804 can be displayed when the advertisement 1802 is initially displayed or can be displayed near the conclusion of the advertisement 1802. In this exemplary embodiment, the interactive component 1804 is a downloadable coupon. As shown, the downloadable coupon is for a dollar off on Snack Pack® Puddings. The downloadable coupon can be considered a new advertisement. In another example, the downloadable coupon can be save five dollars when you spend more than fifty dollars at Walmart. In such an example, the downloadable coupon can be a new advertisement even though the downloadable coupon is associated with Walmart. In some embodiments, the advertisement 1802 can be for a national advertisement campaign and the downloadable coupon can be directed for local redemption (for example, at a specific local store or a plurality of local stores). In other embodiments, the downloadable coupon can be based on a user profile or location associated with the second-screen device 106. The downloadable coupon can be the interactive component with the user using a gesture to download the coupon into a coupon wallet 1806 for redemption at a later time. The coupon wallet 1806 can be associated with the second-screen device 106. The gesture to download the coupon can be a touch on the displayed coupon in the video display area 206 to select the coupon and a downward motion to drag the selected coupon into the coupon wallet in the active display area 208. The second application 110 can cause the downloadable coupon to be associated with the coupon wallet 1806. In some embodiments, the user can use a different gesture to have the downloadable coupon displayed on the primary display 104. For example, the user can touch the rendered coupon to select the coupon and an upward motion to drag the selected upward where the coupon is displayed on the primary display 104. By displaying the coupon on the primary display 104, the coupon can be displayed larger in comparison to the coupon displayed on the second-screen device 106. As shown, the coupon wallet 1806 can include images of one or more coupons stored in the coupon wallet 1806. The advertisement 1802 illustrated in FIG. 18 can offer a direct response for the user and can assist in building a one-to-one relationship with the user.

Figure 19:
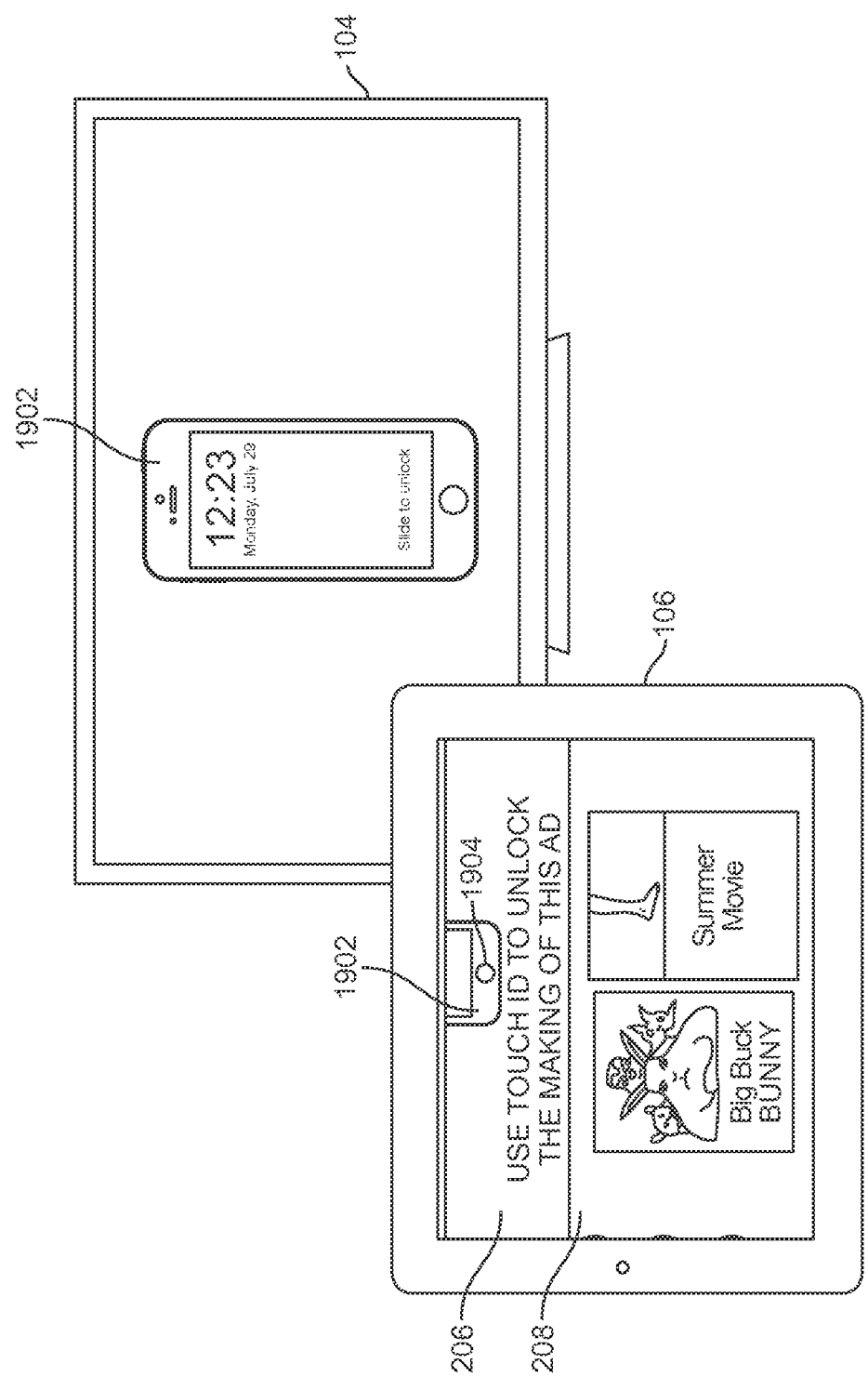
FIG. 19 illustrates screenshots of a screen and a touchscreen for an advertisement having a touch screen interactive component in accordance with an exemplary embodiment.

Referring to FIG. 19, screenshots of a screen and a touchscreen for an advertisement having a touch screen interactive component in accordance with an exemplary embodiment are illustrated. As shown, an advertisement 1902 for an iPhone can be displayed on the screen 202 of the primary display 104 and the advertisement 1902 can be partially displayed on the touchscreen 204 of the second-screen device 106. An interactive component 1904 is displayed in the video display area 206 on the touchscreen 204 of the second-screen device. By acting upon the interactive component 1902 a new advertisement can be displayed. In this exemplary embodiment, the interactive component 1804 can be for launching a video. As shown, by touching the enter button 1904 on the displayed iPhone, a video can be displayed. In addition, instructions can be overlaid over the advertisement 1902 displayed on the touch screen 204 of the second-screen device 106. In this embodiment, the instructions recite "USE TOUCH ID TO UNLOCK THE MAKING OF THIS AD." In response to receiving a gesture, e.g., a touch, on the touchscreen 204 at about the enter button 1904, a video showing the making of the advertisement 1902 can be rendered. For example, the video can be displayed on the screen 202 of the primary display 104, the touch screen 204 of the second-screen device 106, or both. The video displayed on the second-screen device 106 can be a partial display or a full-screen display. The advertisement illustrated in FIG. 19 is for an interactive advertisement which uses special interaction. Such interaction can be more inviting and engaging with the viewer which can increase the memorability of the user compared to a conventional non-interactive advertisement.

Figure 20A:
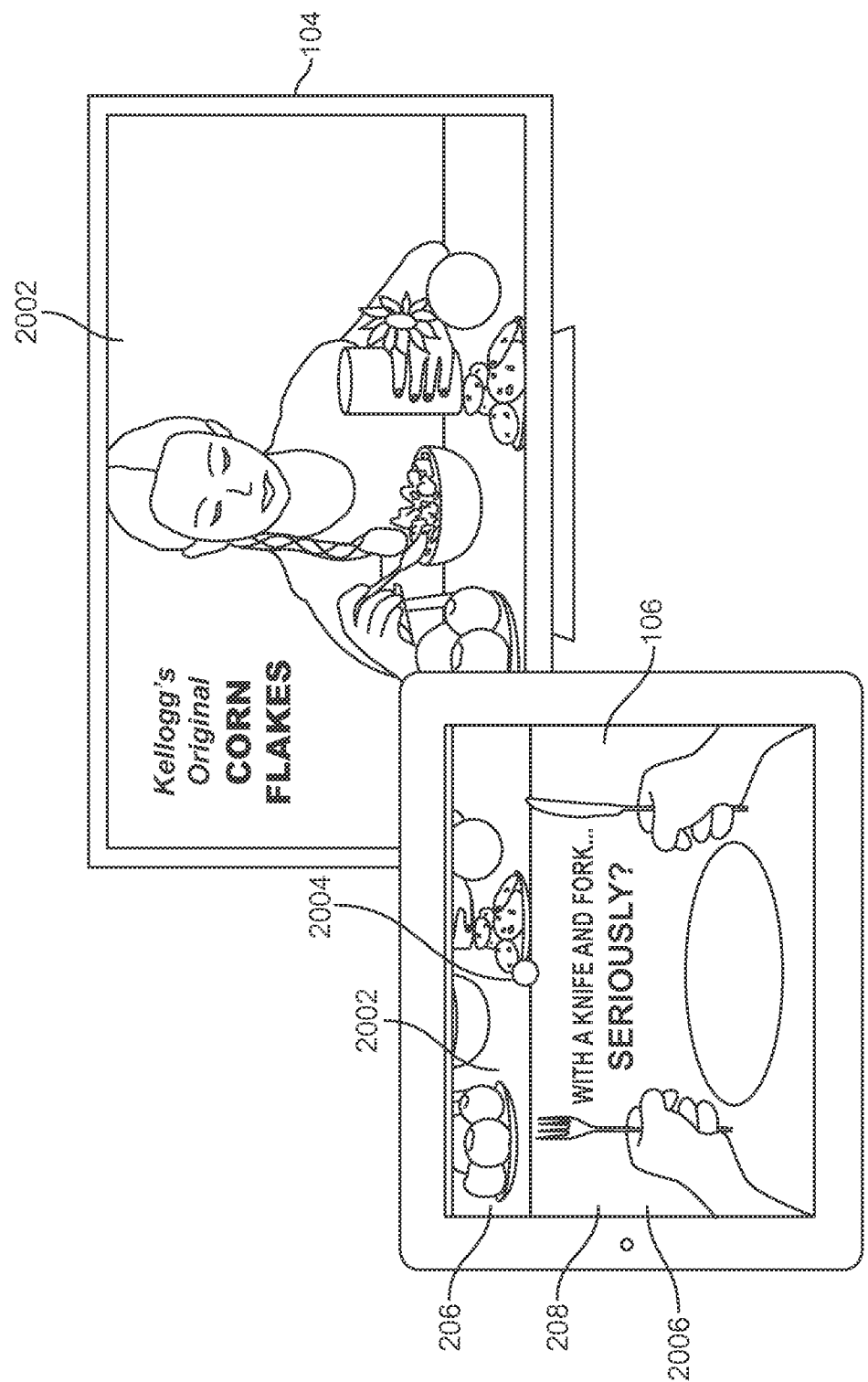
FIG. 20A illustrates screenshots of a screen and a touchscreen for a dual screen advertisement having an interactive component in accordance with an exemplary embodiment.
Figure 20B:
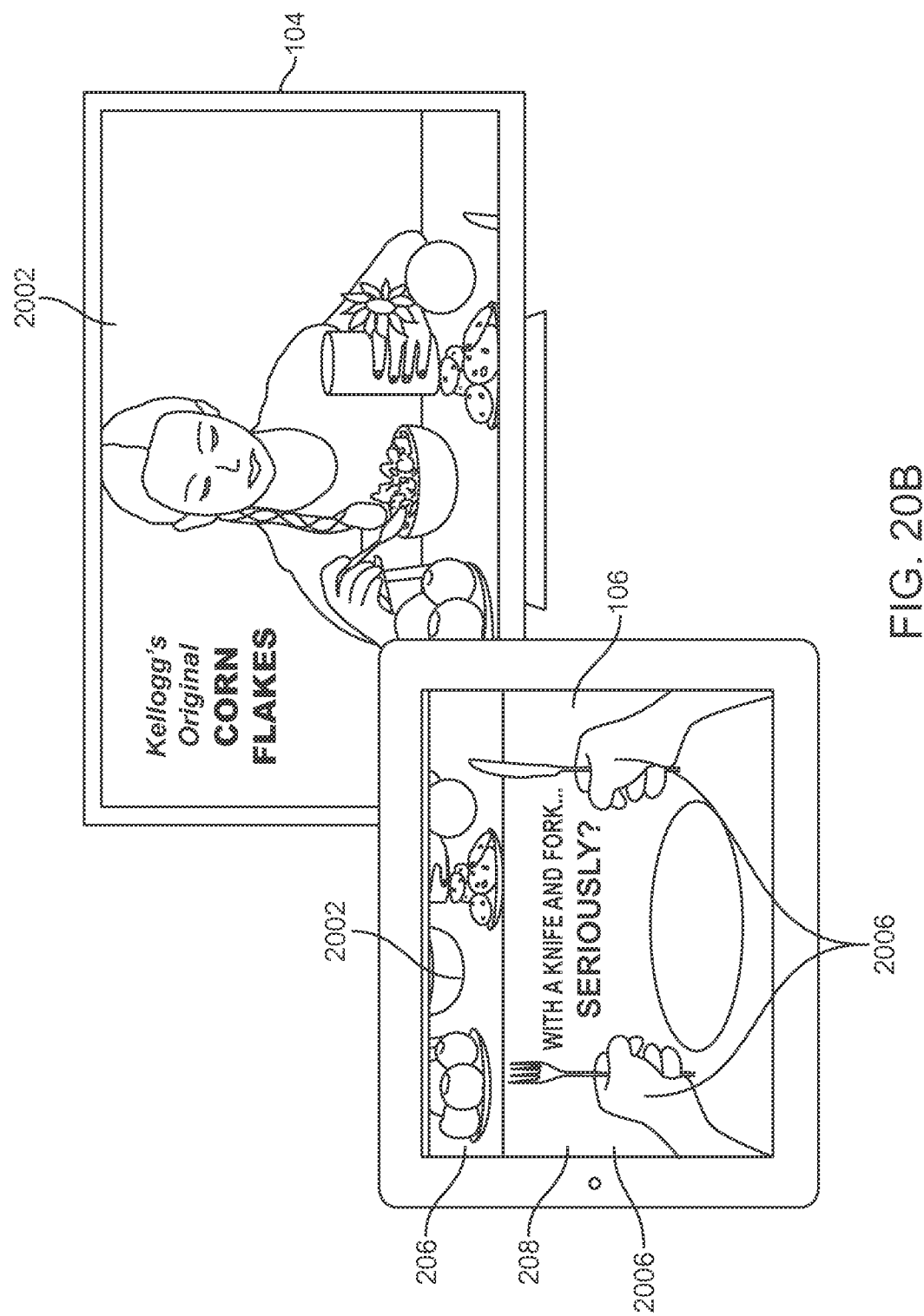
FIG. 20B illustrates screenshots of a screen and a touchscreen for a dual screen advertisement having an interactive component extending across the two screens in accordance with exemplary embodiment.

Referring to FIGS. 20A and 20B, screenshots of a screen and a touchscreen for a dual screen advertisement having an interactive component in accordance with exemplary embodiments are illustrated. As shown in FIG. 20A, an advertisement 2002 for Kellogg's Original Corn Flakes can be displayed on the screen 202 of the primary display 104 and the advertisement 2002 can be partially displayed on the touchscreen 204 of the second-screen device 106. An interactive component 2004 can be displayed in the video display area 206 on the touchscreen 204 of the second-screen device. In this exemplary embodiment, the interactive component 2004 is a button on the cereal bowl displayed in the video display area 206. By touching the button 2004, an interactive panel 2006 can be displayed as shown in FIG. 20B. In some embodiments, displaying the advertisement 2002 in FIG. 20A can be skipped and the advertisement 2002 in FIG. 20B can be displayed. As shown in FIG. 20B, the advertisement 2002 can be partially displayed on the touchscreen 204 of the second-screen device 106 and an interactive panel 2006 can be displayed in the active display area 208. The interactive panel 2006 can be an image having one or more active components. The interactive panel 2006 can be a new advertisement. The image can appear to be seamless with the displayed advertisement 2002—an extension of the displayed advertisement 2002. For example, the one or more interactive components can be the each of the hands. In response to gestures on the touchscreen 204 of the second-screen device 106, the second application 110 can alter the display on the screen 202 on the primary display 104 by the first application 108. For example, by moving the left hand on the touchscreen 204 upwardly, a fork can be displayed on the screen 202 with the movements corresponding to the movements on the touchscreen 204. Similarly, by moving the right hand on the touchscreen 204 upwardly, a knife can be displayed on the screen 202 with the movements corresponding to the movements on the touchscreen 204. The second application 110 can send instructions to alter the display on the screen 202 by the first application 108 directly and/or via the set top box 102. The advertisements 2002 illustrated in FIGS. 20A and 20B, can be for an interactive advertisement which uses special interaction. Such interaction can be more inviting and engaging with the viewer which can increase the memorability of the user compared to a non-interactive advertisement.

Figure 21:
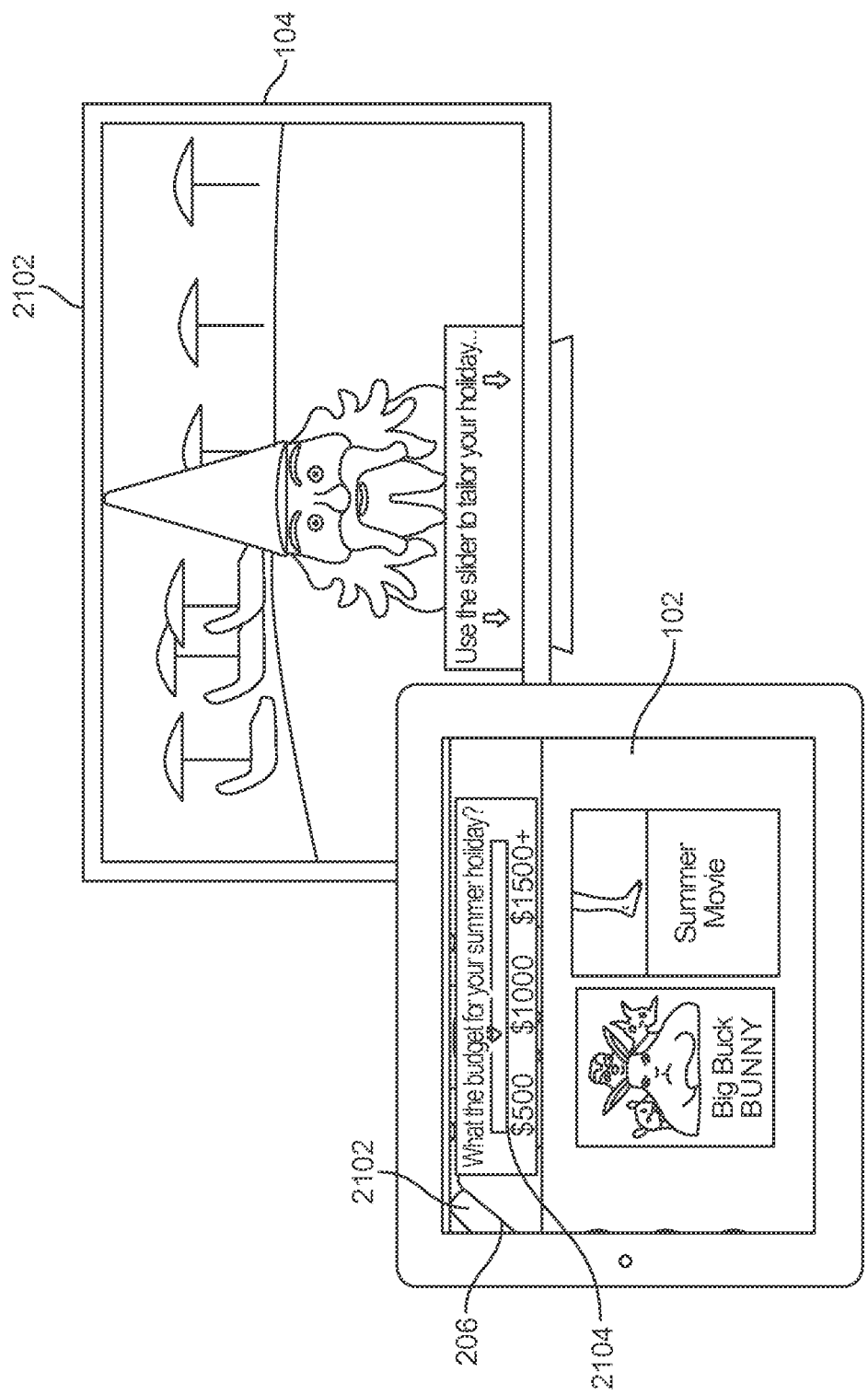
FIG. 21 illustrates screenshots of a screen and a touchscreen for an advertisement having an interactive component for selecting a more suitable advertisement in accordance with an exemplary embodiment.

Referring to FIG. 21, screenshots of a screen and a touchscreen for an advertisement having an interactive component for selecting a more suitable advertisement for the viewer in accordance with an exemplary embodiment are illustrated. As shown, an advertisement 2102 for Travelocity can be displayed on the screen 202 of the primary display 104 and an advertisement 2102 is partially displayed on the touchscreen 204 of the second-screen device 106. An interactive component 2104 can be displayed in the video display area 206 on the touchscreen 204 of the second-screen device and using the interactive component 2104 can result in a new advertisement in accordance with interactive component 2104 can be displayed. In this exemplary embodiment, the interactive component 2104 is a slide bar to enter a budget. In other embodiments, the interactive component 2104 can be buttons to enter a budget. As shown, instructions 2006 are displayed on screen 202 of the primary display 104. In other embodiments, the instructions 2006 can be displayed on the touchscreen 204 of the second-screen device 106. By using the interactive component 2104, a new advertisement can be displayed in accordance with the selected interactive component 2104. In this exemplary embodiment, using the slide bar and selecting a budget of $500 or less, a first new advertisement can be displayed, by selecting a budget between $500 and $1000, a second new advertisement can be displayed and by selecting a budget above $1000, a third new advertisement can be displayed with each new advertisement directed at the corresponding budget. In other embodiments, buttons can be used to select a corresponding advertisement. For example, a first button to select a $500 budget, a second button to select a $1000 budget and a third button to select a $1500 budget. The second application 110 can cause the corresponding new advertisement to be displayed on the screen 202 of the primary display 104 and the new advertisement to be partially displayed on the touchscreen 204 of the second-screen device 106. The different advertisements can be obtained in a variety of ways with the new advertisement being provided to the first application 108 and the second application 110 for display. For example, all the potential advertisements can be downloaded and the second application 110 can select the advertisement to be displayed based on the interaction component that was acted upon. In other examples, the second application 110 can cause the download of the selected advertisement from an advertisement source, such as a cloud digital video recorder (cDVR) or advertisement server, and cause the selected advertisement to be displayed. For example, the second application 110 can cause the selected advertisement to be downloaded from the cDVR or the advertisement server by sending a request for an advertisement associated with the selected criteria (budget). The advertisement 2102 illustrated in FIG. 21 can be more tailored to the user compared to a conventional advertisement in which the user is not able to select an appropriate advertisement.

Figure 22:
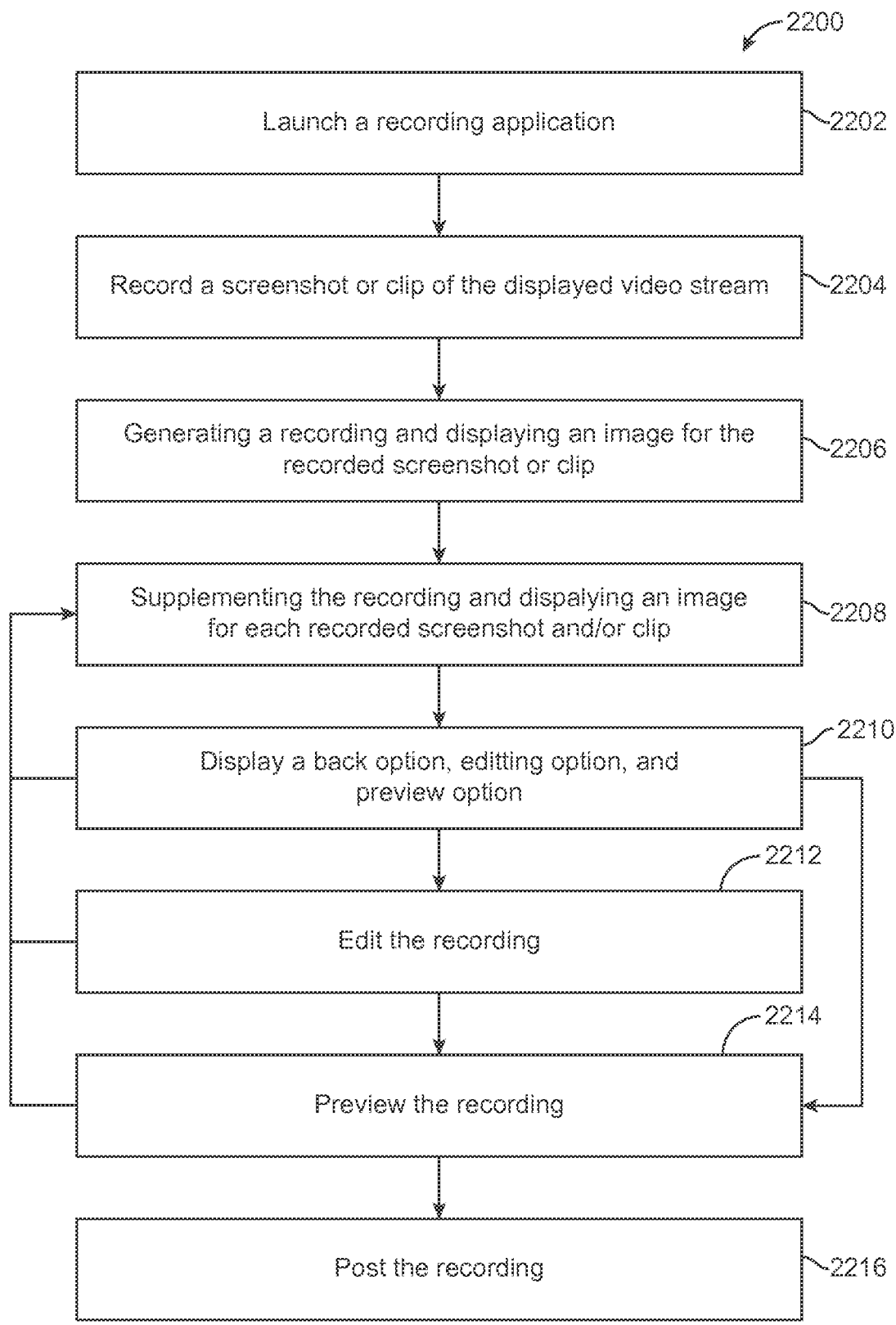
FIG. 22 illustrates a flowchart for displaying a graphical user interface for a recording application in accordance with an exemplary embodiment.

Referring to FIG. 22, a flowchart for displaying a graphical user interface for a recording application in accordance with an exemplary embodiment is illustrated. The exemplary method 2200 is provided by way of example, as there are a variety of ways to carry out the method. The method 2200 described below can be carried out using the configurations illustrated in FIGS. 1 and 2 by way of example, and various elements of these figures are referenced in explaining exemplary method 2200. Each block shown in FIG. 22 represents one or more processes, methods or subroutines, carried out in the exemplary method 2200. The exemplary method 2200 can begin at block 2202.

At block 2202, launch a recording application. For example, the second application 110 can display the recording application on the touchscreen 204 of the second-screen device 106. The recording application can allow a user to record screenshots and/or clips of one or more video streams being displayed on the screen 202 of the primary display 104 and partially displayed on the touchscreen 204 of the second-screen device 106. In some embodiments, the recording application can be launched in response to the recording application being selected from an application menu. Referring to FIG. 5, an application menu is displayed in the active display area 208 on the touchscreen 204 of the second-screen device 106. A user can navigate the application menu and select an icon for the recording application by touching the displayed icon. In response to the recording application being launched, the first application 108 can continue to display the first video stream 214 on the screen 202 and the second application 110 can continue to display the partial video stream 216 in the video display area 206 on the touchscreen 204 with the two video streams 214, 216 being associated with the same video content and being substantially synchronized. In addition, the second application 110 can display an interactive component 2202, such as a button, in the video display area 206. The interactive component 2202 can be used to record a screenshot and/or a clip of one or more video streams being displayed on the screen 202 of the primary display 104. After launching the recording application, the method 2200 can proceed to block 2204.

Figure 23:
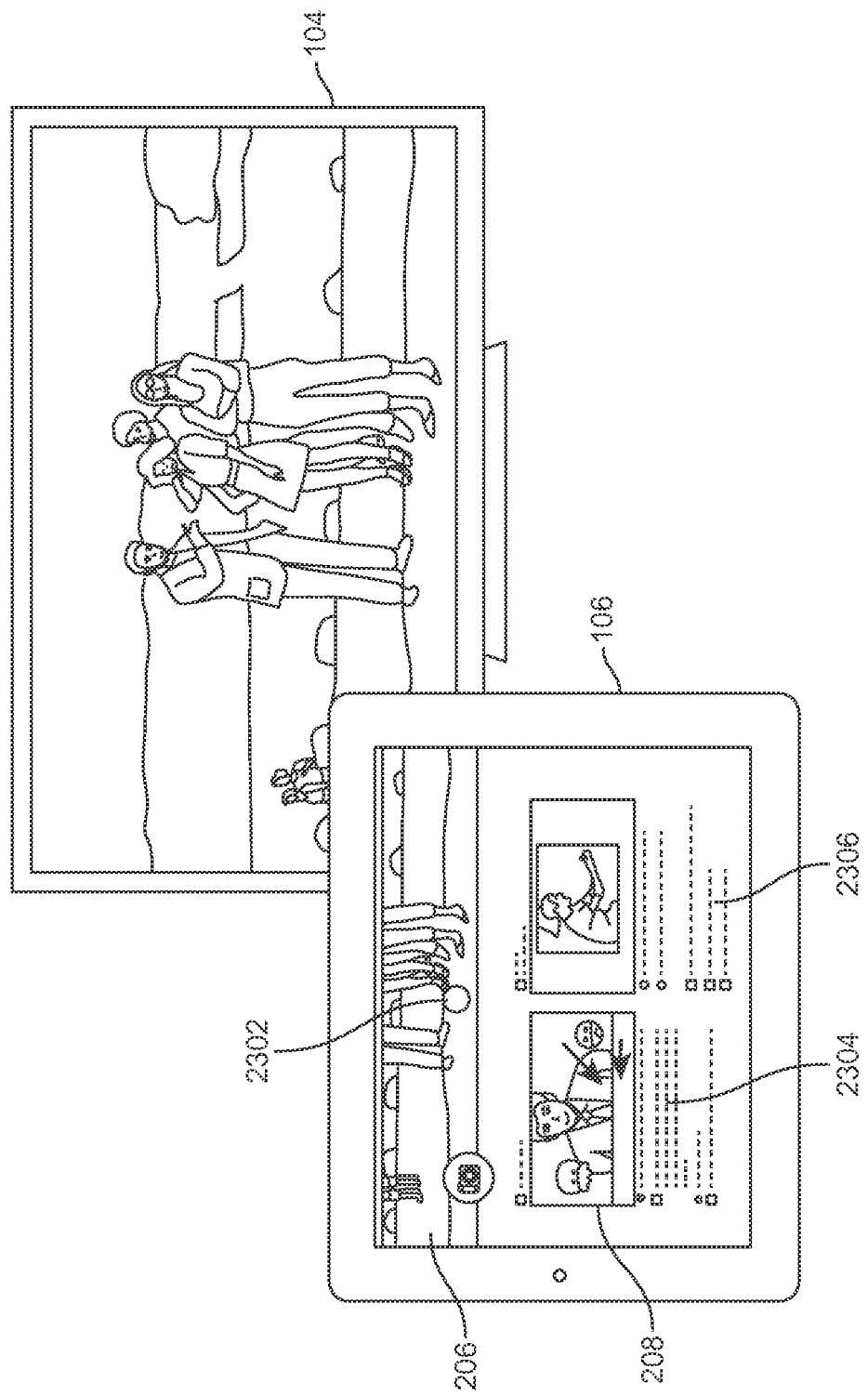
FIG. 23 illustrates screenshots of a screen and touchscreen for a recording application in accordance with an exemplary embodiment.

Referring to FIG. 23, screenshots of a screen and touchscreen for the recording application in accordance with an exemplary embodiment are illustrated. As shown, the video stream associated with the received first media content can be displayed on the screen 202 of the primary display 104 and the video stream associated with the second media content can be displayed on the touchscreen 204 of the second-screen device 106. More specifically, the second application 110 can display part of the video stream associated with the second media content in a video display area 206. The first video stream 214 displayed on the screen 202 and the partial video stream 216 displayed on the touchscreen 204 can be associated with the same video content and can be substantially synchronized. In this exemplary embodiment, the displayed video streams are for a movie with the primary display 104 displaying the movie full screen on the display 202 and the second-screen device 106 displaying part of the movie, for example, the bottom part, in the video display area 206 of the touchscreen 204. In addition, the second application 110 can display an interactive component 2302, such as a button, in the video display area 206. The second application 110 can also display previous recordings 2304, 2306 in the active display area 208. The previous recordings 2304, 2306 can be made by the user and/or by others. The displayed recordings 2304, 2306 can be from others that are associated with the viewer, for example, Facebook friends. In response to the user selecting one of the displayed recordings 2304, 2306, the second application 110 can display the selected recording 2304, 2306. Using the touchscreen 204, a user can also navigate the recordings displayed in the active display area 208.

Returning to FIG. 22, at block 2204, record a screenshot or clip of the displayed video stream. For example, the second application 110 can record a screenshot or can record a clip of the media stream that is being displayed on the primary display 104 and partially displayed on the second-screen device 106. In response to a touching of the interactive component 2102, the second application 110 can record a screenshot of the displayed video stream. In response to a touching of the interactive component 2102, maintaining of the touch and removal of the touch on the interactive component 2102, the second application 110 can record a clip of the displayed video stream which is approximately equal to the length of the touch. After recording the screenshot or clip, the method 2200 can proceed to block 2206.

Figure 24:
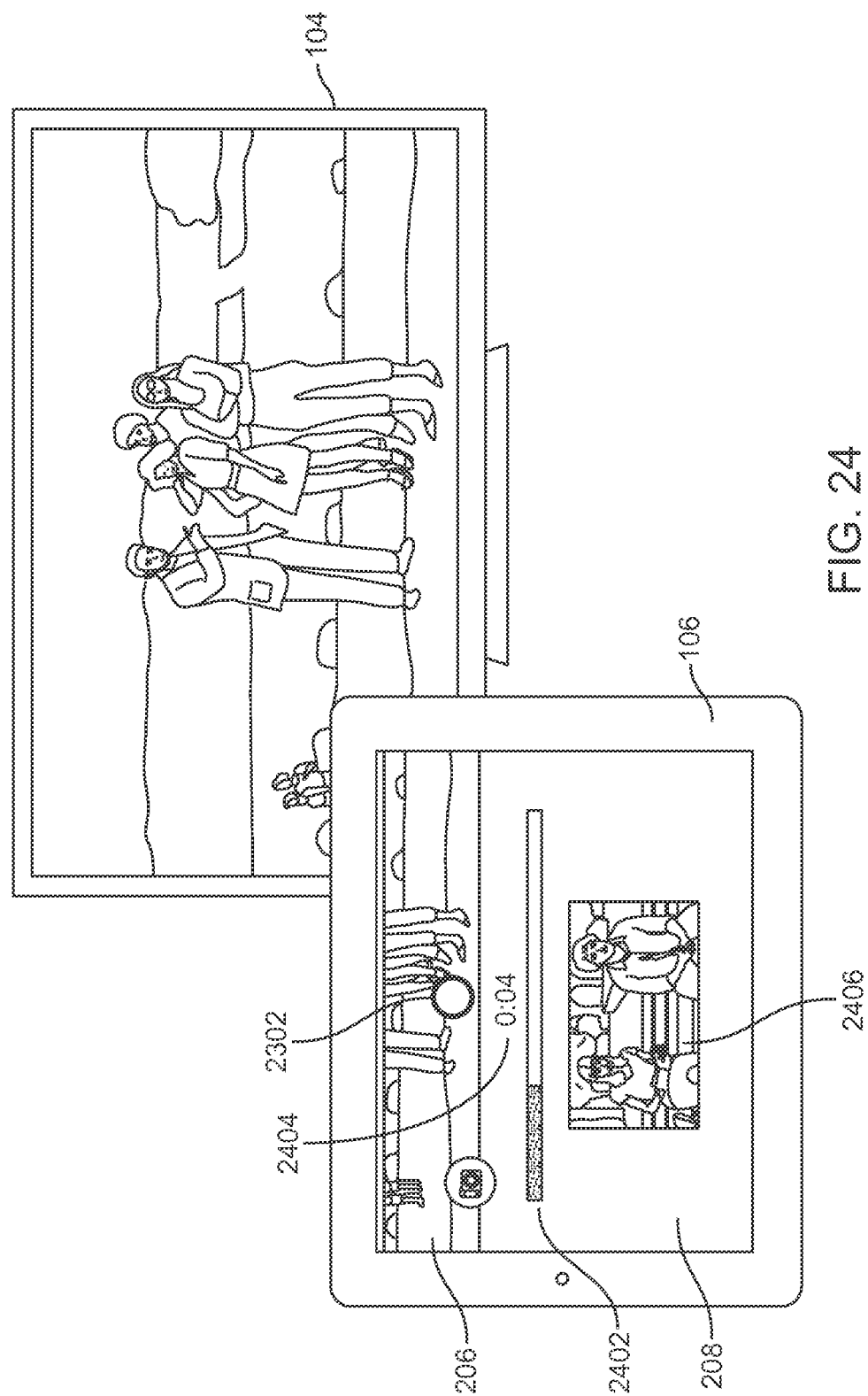
FIG. 24 illustrates screenshots of a screen and a touchscreen having a timeline for the recording application in accordance with an exemplary embodiment.

At block 2206, generating a recording and displaying an image for the recorded screenshot or clip. For example, the second application 110 can generate a recording and can display an image associated with the recording in a displayed timeline. Referring to FIG. 24, screenshots of a screen and a touchscreen having a timeline for the recording application in accordance with an exemplary embodiment are illustrated. As shown, the video stream associated with the received first media content is displayed on the screen 202 of the primary display 104 and the video stream associated with the second media content is displayed on the touchscreen 204 of the second-screen device 106. In addition, the second application 110 can display a timeline 2402 in the active display area 208 on the second-screen device 106. The timeline 2402 can provide an indication of the duration of a recording and the location of the displayed video with respect to the recording. The second application 110 can display a clock 2404 showing the duration of recording. In this example, the recording is four seconds. The second application 110 can display an image of the recorded screenshot or clip in the active display area 208. The second application 110 can allow the user to enter gestures in the video display area 206 to change channels or trick modes as discussed earlier. After displaying the recording and timeline, the method 2200 can proceed to block 2208.

Figure 25:
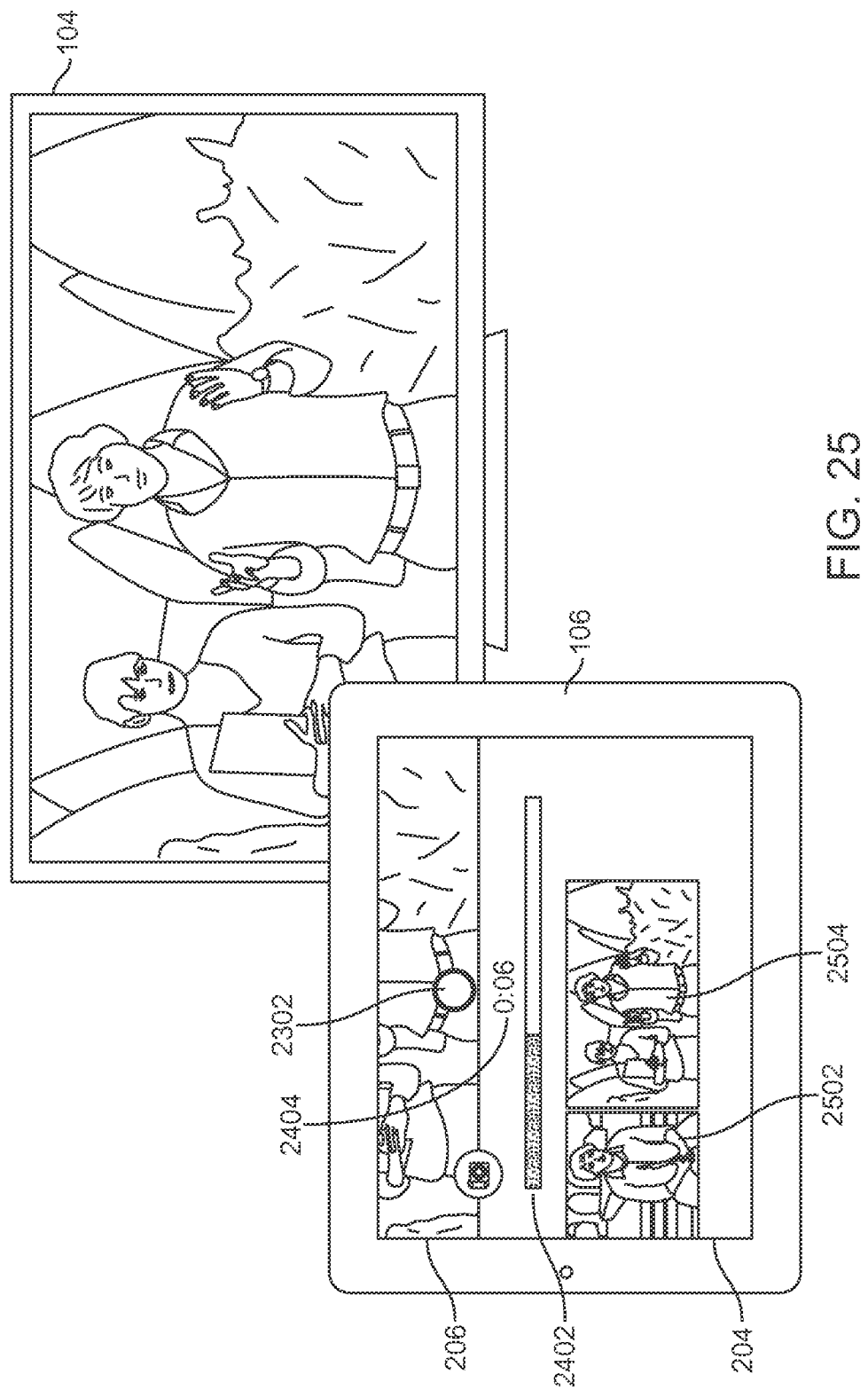
FIG. 25 illustrates screenshots of a screen and a touchscreen having multiple recordings in a timeline in accordance with an exemplary embodiment.

At block 2208, supplementing the recording and displaying an image for each recorded screenshot and/or clip. For example, the second application 110 can display images of each screenshot and/or clip in the recording. As shown in FIG. 25, a video stream associated with the received first media content can be displayed on the screen 202 of the primary display 104 and a video stream associated with the second media content can be displayed on the touchscreen 204 of the second-screen device 106. The second application 110 can display a timeline 2402 and a clock 2404 in the active display area 208 on the second-screen device 106. The second application 110 can display an image of each screenshot and/or clip in the recording in the active display area 208. For example, the current recording includes a first clip 2502 and a second clip 2504. After displaying an image for each recorded screenshot and/or clip is displayed, the method 2200 can proceed to block 2210.

Figure 26:
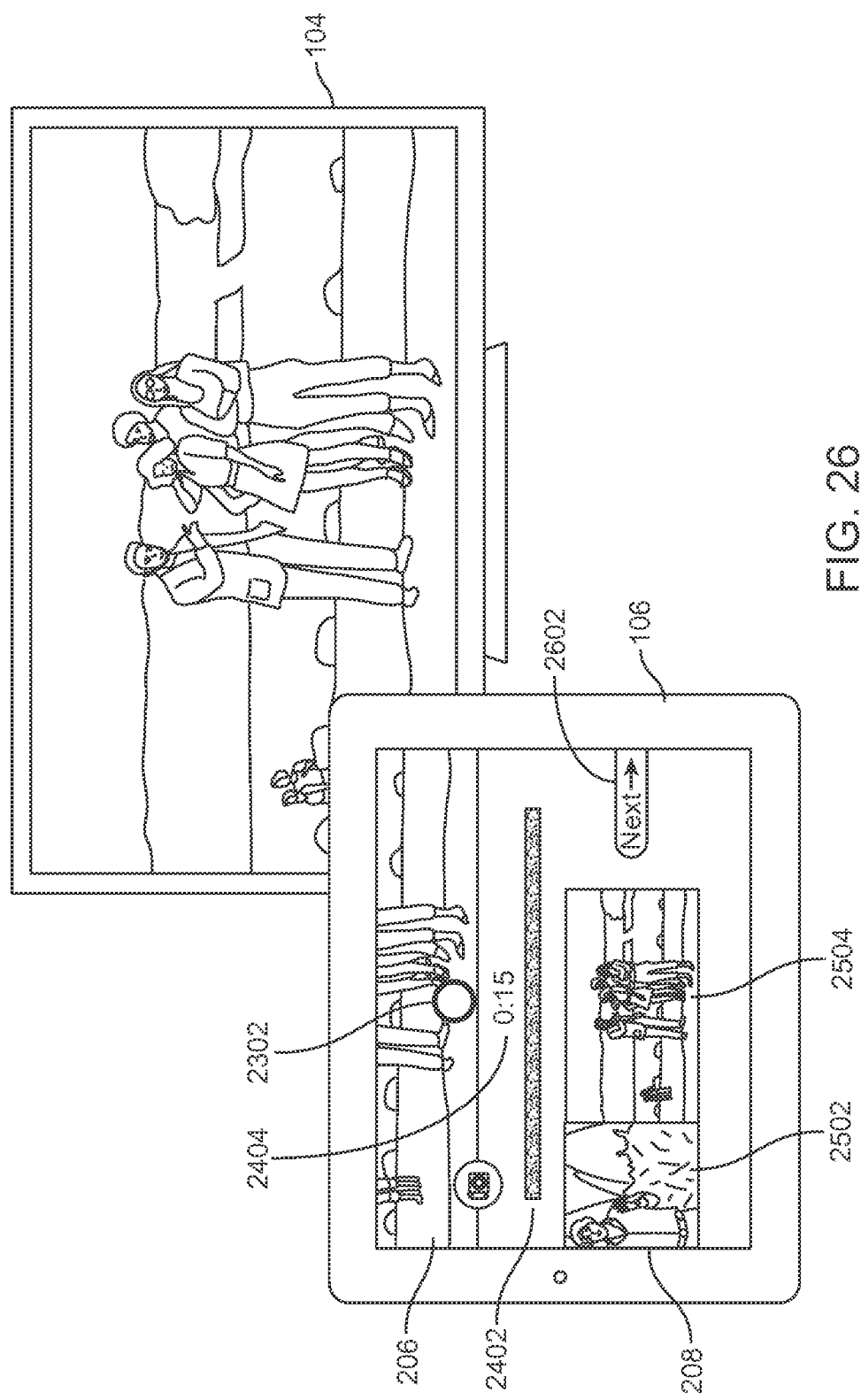
FIG. 26 illustrates screenshots of a screen and a touchscreen prompting an editing option in accordance with an exemplary embodiment.

At block 2210, display a prompt for an editing option. For example, the second application 110 can display a prompt for an editing option. As shown in FIG. 26, the second application 110 can display a prompt for an editing option 2602 to allow the user to edit the recordings. The editing option 2602 or prompt can be displayed in the active display area 208 on the touchscreen 204. In some embodiments, the editing icon 2602 can be displayed after a predetermined amount of time has elapsed. In other embodiments, an editing icon can be displayed. In response to the editing option 2602 being selected, the method 2200 can proceed to block 2212.

Figure 27:
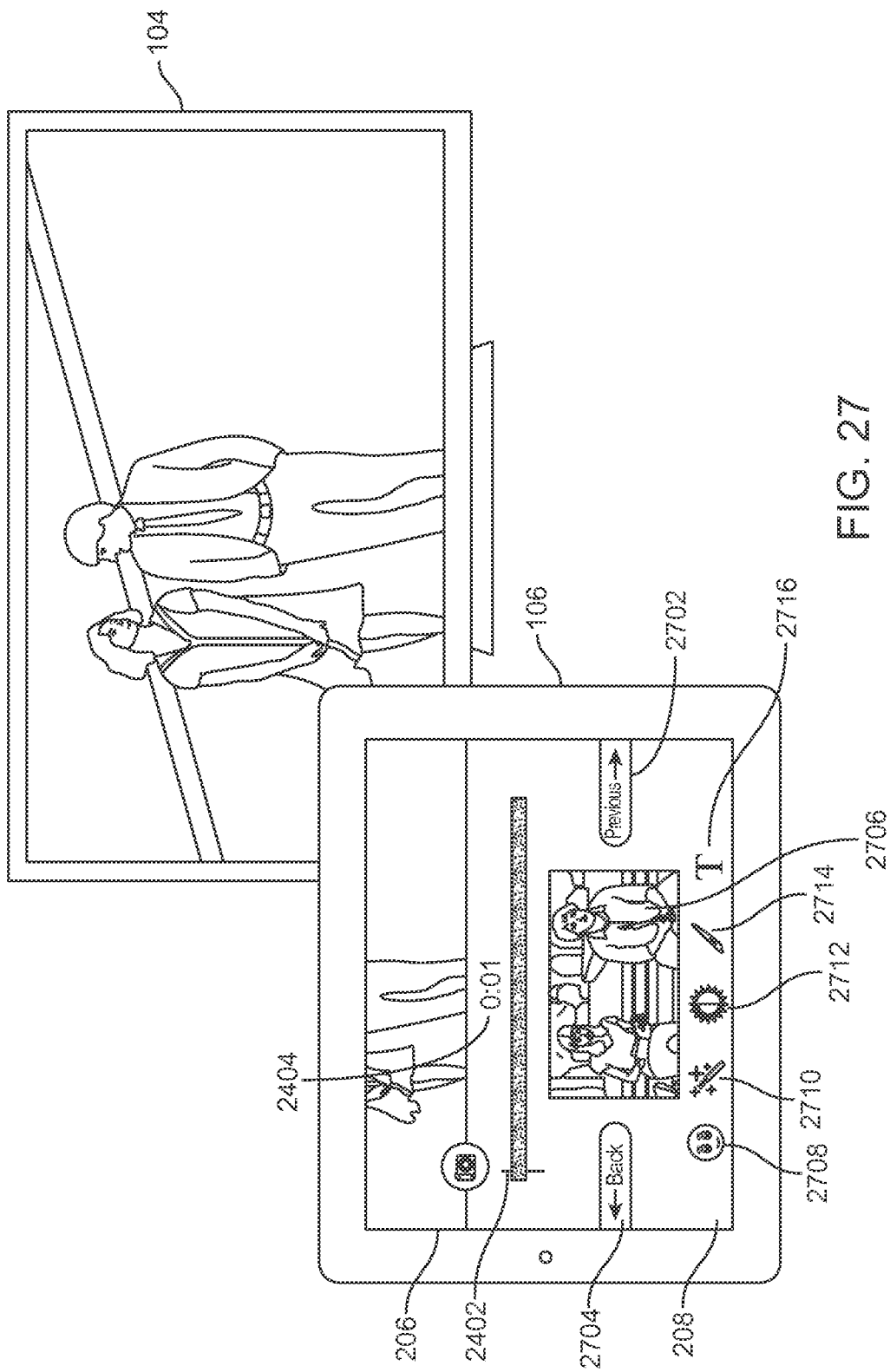
FIG. 27 illustrates screenshots of a screen and a touchscreen for editing a recording in accordance with an exemplary embodiment.
Figure 28:
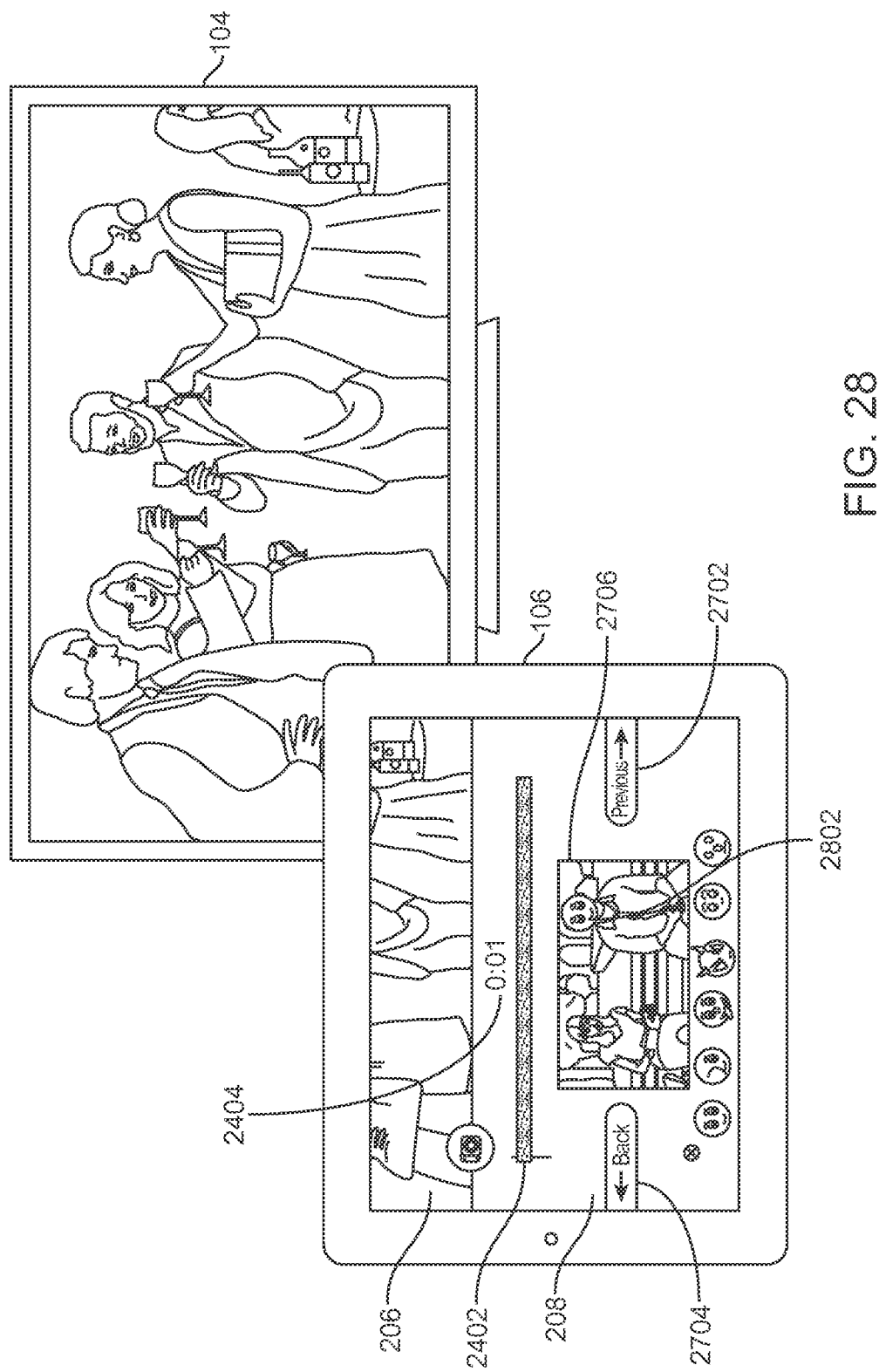
FIG. 28 illustrates screenshots of a screen and a touchscreen for a recording having an emoticon in accordance with an exemplary embodiment.
Figure 29:
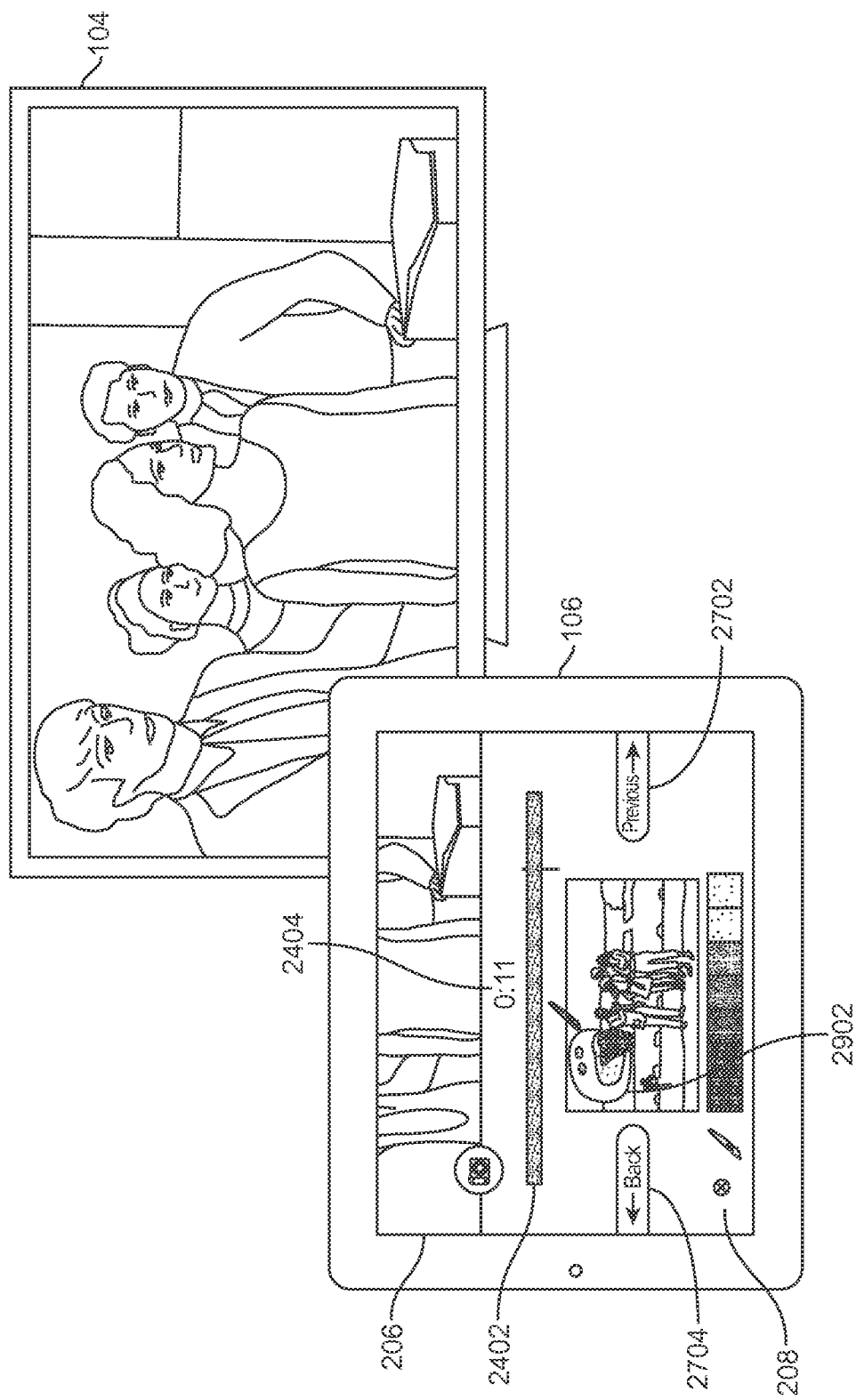
FIG. 29 illustrates screenshots of a screen and a touchscreen for a recording having an painting in accordance with an exemplary embodiment.

At block 2212, edit the recording. For example, the second application 110 can display a timeline 2402 allowing the user to select part of the recording to be edited. As shown in FIG. 27, the second application 110 can allow a user to use gestures to select part of the recording to be edited by using the timeline 2402 or by previewing the recording by touching a displayed option, such as the preview option 2702. The user can go back to recording the media stream by touching a displayed option, such as the back option 2704. The second application 110 can display the clip 2706 corresponding to the location of the recording on the timeline 2402. The clock 2404 can show the location of the displayed clip 2706. The second application 110 can display one or more editing commands, including but not limited to, emoticons 2708, video effects 2710, saturation 2712, paint 2714 and type 2716. The emoticon option 2708 can allow a user to add an emoticon to the recording as shown in FIG. 28. As shown in FIG. 28, an emoticon 2802 replaces the face of an actor as shown in the displayed clip 2706. The video effects option 2712 can allow a user to add video effects to the recording, such as the video effects allowed by Instagram. The saturation option 2712 can allow a user to add saturation effects to the recording, such as the saturation effects allowed by Instagram. As shown in FIG. 29, a painted face 2902 is added to the displayed clip 2706. The type option 2716 can allow a user to add test to a displayed clip. As shown in FIGS. 28 and 29, a preview option 2702 and a back option 2704 are displayed. When the preview option 2702 is selected, the method 2200 can proceed to block 2214. When the back option 2704 is selected, the method 2200 can proceed to block 2212 with the user being able to select the menu options shown in FIG. 27.

Figure 30:
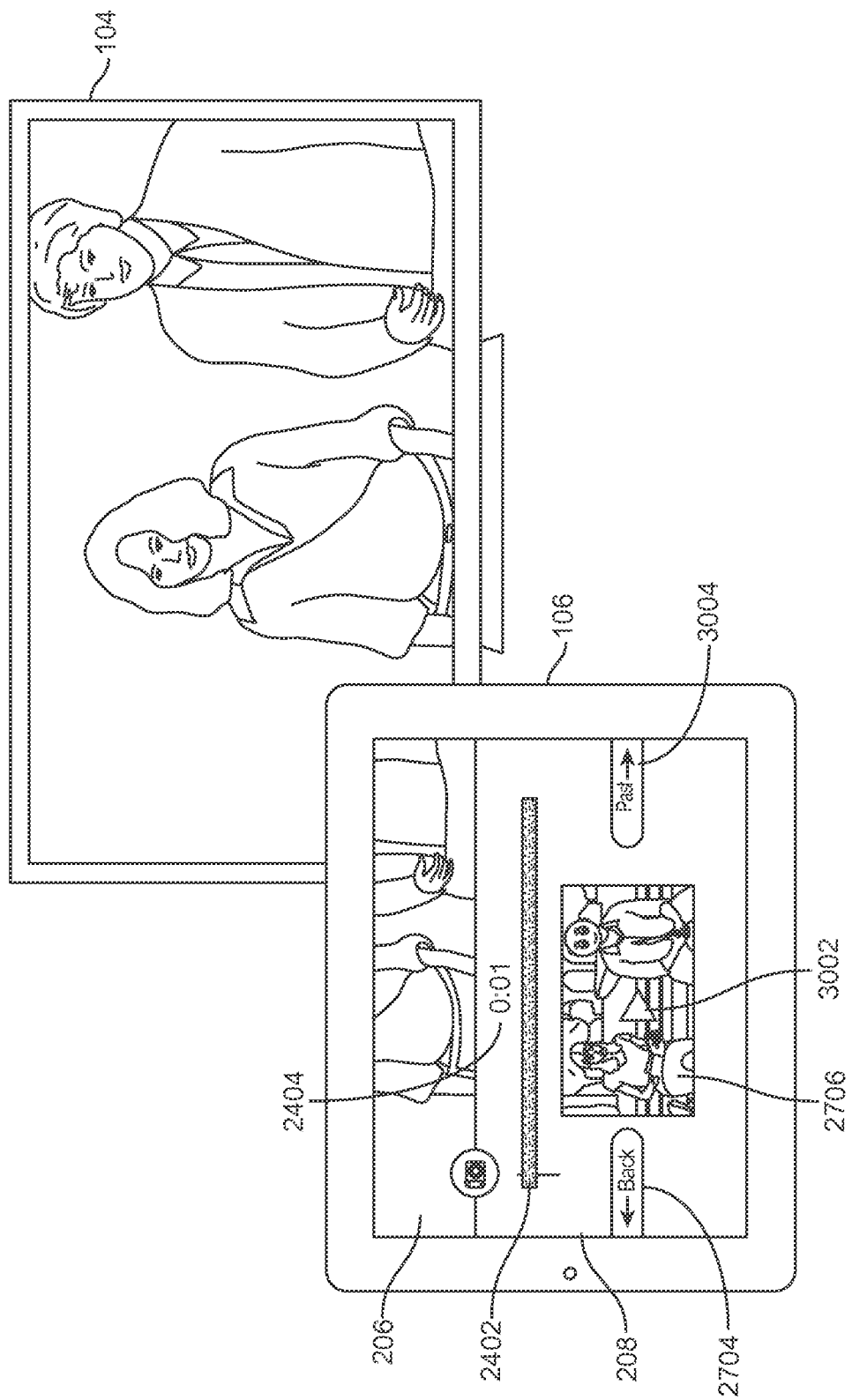
FIG. 30 illustrates screenshots of a screen and a touchscreen for a back option and a posting option in accordance with an exemplary embodiment.

At block 2214, preview the recording. For example, the second application 110 can display options including a back option, a play or preview option or a post option. As shown in FIG. 30, the second application 110 can display a back option 2704 to allow a user to edit the recording, a play or preview option 3002 to allow the user to play the recording and a post option 3004 to allow the user to post the recording such as on social media. In response to the back option 2704 being selected, the method 2200 can return to block 2212 to allow the user to edit the recording. In response to the preview option 3002 being selected, the recording can be played. In response to the post option 2004 being selected, the method 2200 can proceed to block 2216.

Figure 31:
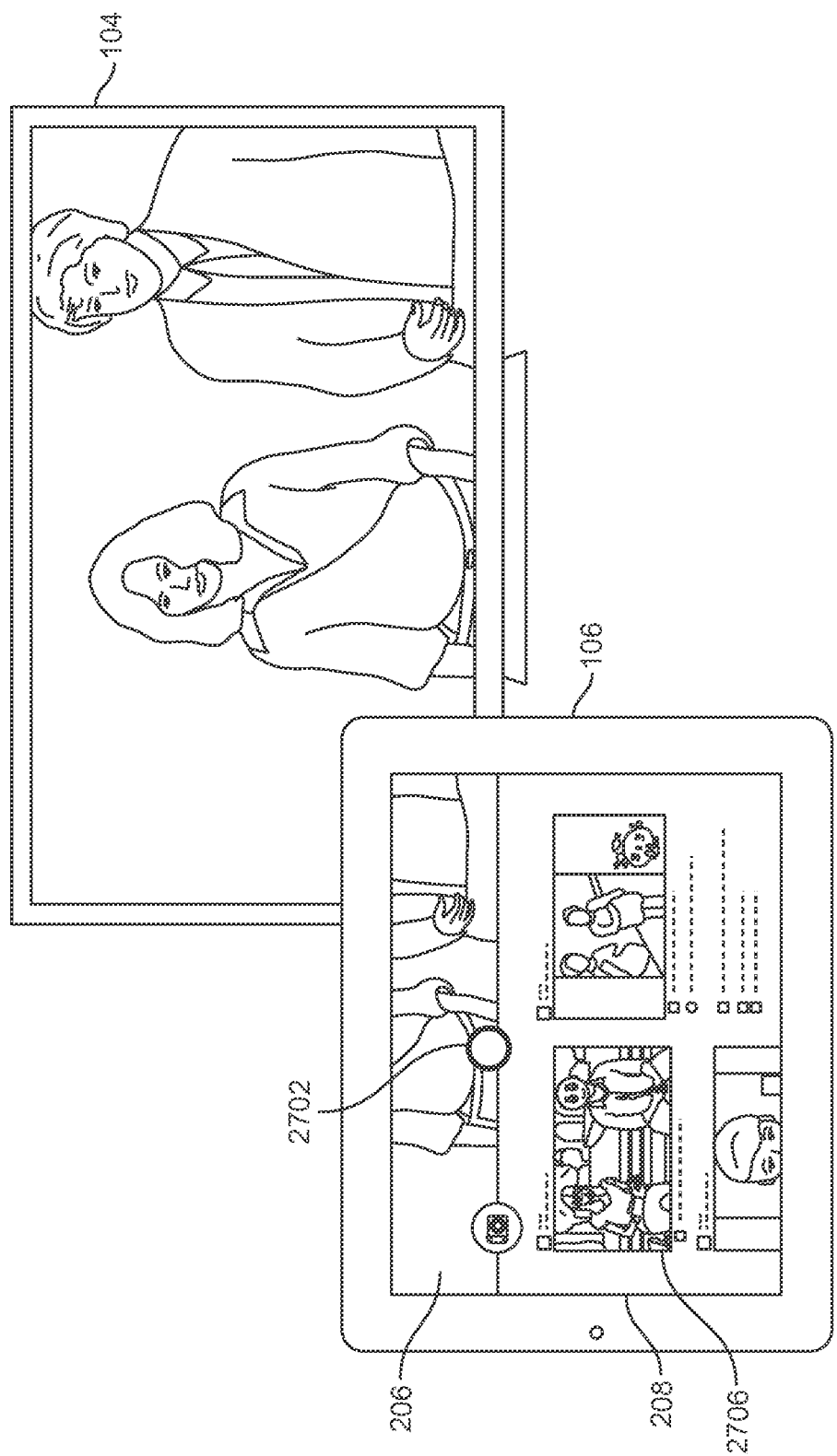
FIG. 31 illustrates screenshots of a screen and a touchscreen for a posted recording in accordance with an exemplary embodiment.

At block 2216, post the recording. For example, the second application can allow the user to port the recording to a social media platform. For example, the user can post the recording to a social media platform including, but not limited to, Instagram, Vine, WhatsApp?, Snapchat, and Facebook. After posting the recording the recording, the recording can be displayed in the active display area 208 as shown in FIG. 31. The posted recording 2706 can be displayed by touching the displayed image of the posted recording 2706.

Figure 32:
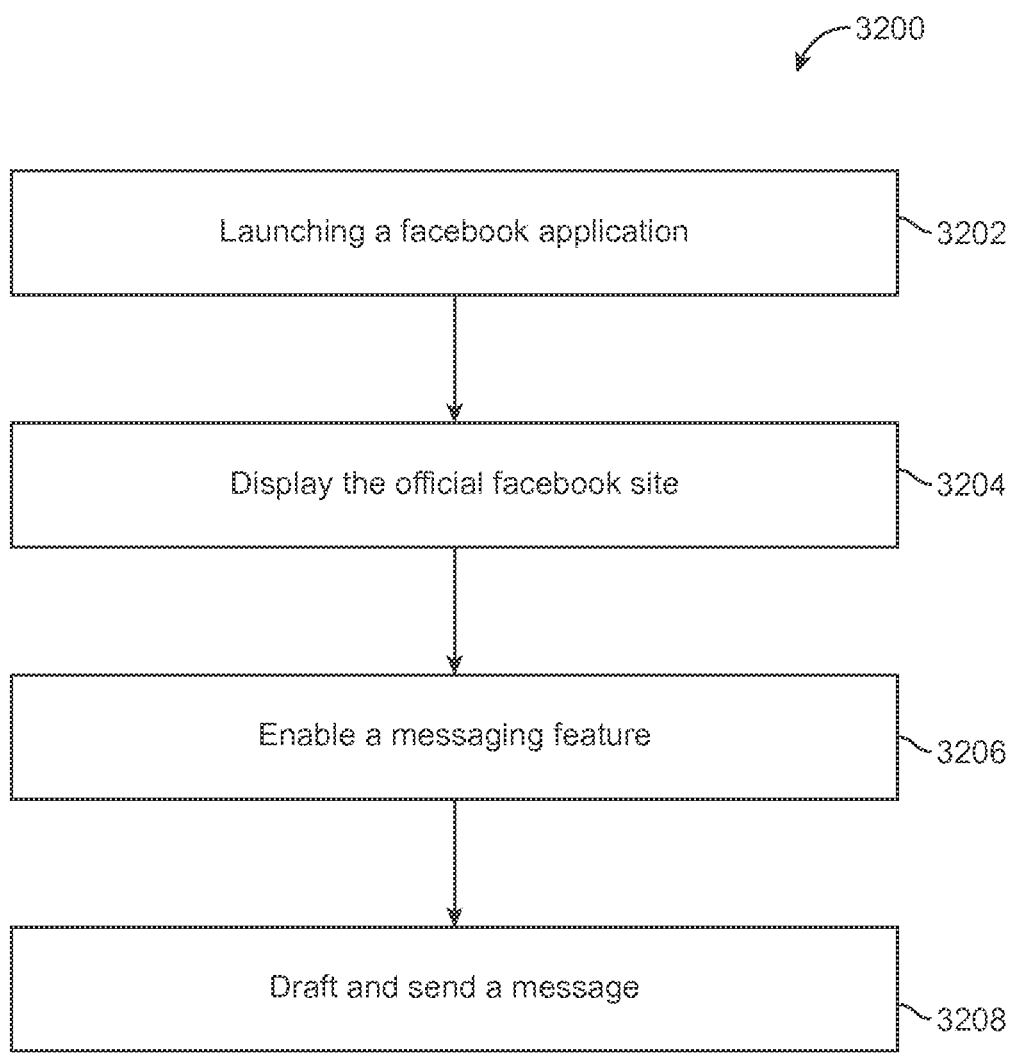
FIG. 32 illustrates a flowchart for displaying a graphical user interface for a Facebook application in accordance with an exemplary embodiment.

Referring to FIG. 32, a flowchart for displaying a graphical user interface for a Facebook application in accordance with an exemplary embodiment is illustrated. The exemplary method 3200 is provided by way of example, as there are a variety of ways to carry out the method. The method 3200 described below can be carried out using the configurations illustrated in FIGS. 1 and 2 by way of example, and various elements of these figures are referenced in explaining exemplary method 3200. Each block shown in FIG. 32 represents one or more processes, methods or subroutines, carried out in the exemplary method 3200. The exemplary method 3200 can begin at block 3202.

At block 3202, launch a Facebook application. For example, the second application 110 can launch the Facebook application for display on the touchscreen 204 of the second-screen device 106. The launching of the Facebook application can be done manually or automatically. For a manual launch, a user can launch the Facebook application by selecting the Facebook application from an application menu. Referring to FIG. 5, an application menu is displayed in the active display area 208 on the touchscreen 204 of the second-screen device 106. A user can navigate the application menu and select an icon for the Facebook application by touching the displayed icon. For an automatic launch, the second application 110 can automatically launch the Facebook application in response to the program being displayed. In some embodiments, second application 110 can determine what program is being watched and can automatically use a web browser associated with the second-screen device 106 to access an official Facebook site. The web browser can reside on the second-screen device 106, on the set-top box 102 and/or both. The second application 110 can determine what program is being displayed based on metadata associated with the second media content. After determining the program being displayed, the second application 110 can access the official Facebook site using a pre-stored list that identifies the corresponding site based on the determined and/or can request the official Facebook site from a communicatively coupled server. For example, the second application 110 can send the server information associated with the determined program and the server can respond with the address of the official Facebook site. The interaction between the second application 110 and the communicatively coupled server can be done through the set-top box 102 or without going through the set-top box 102. After launching the Facebook application, the method 3200 can proceed to block 3204.

Figure 33:
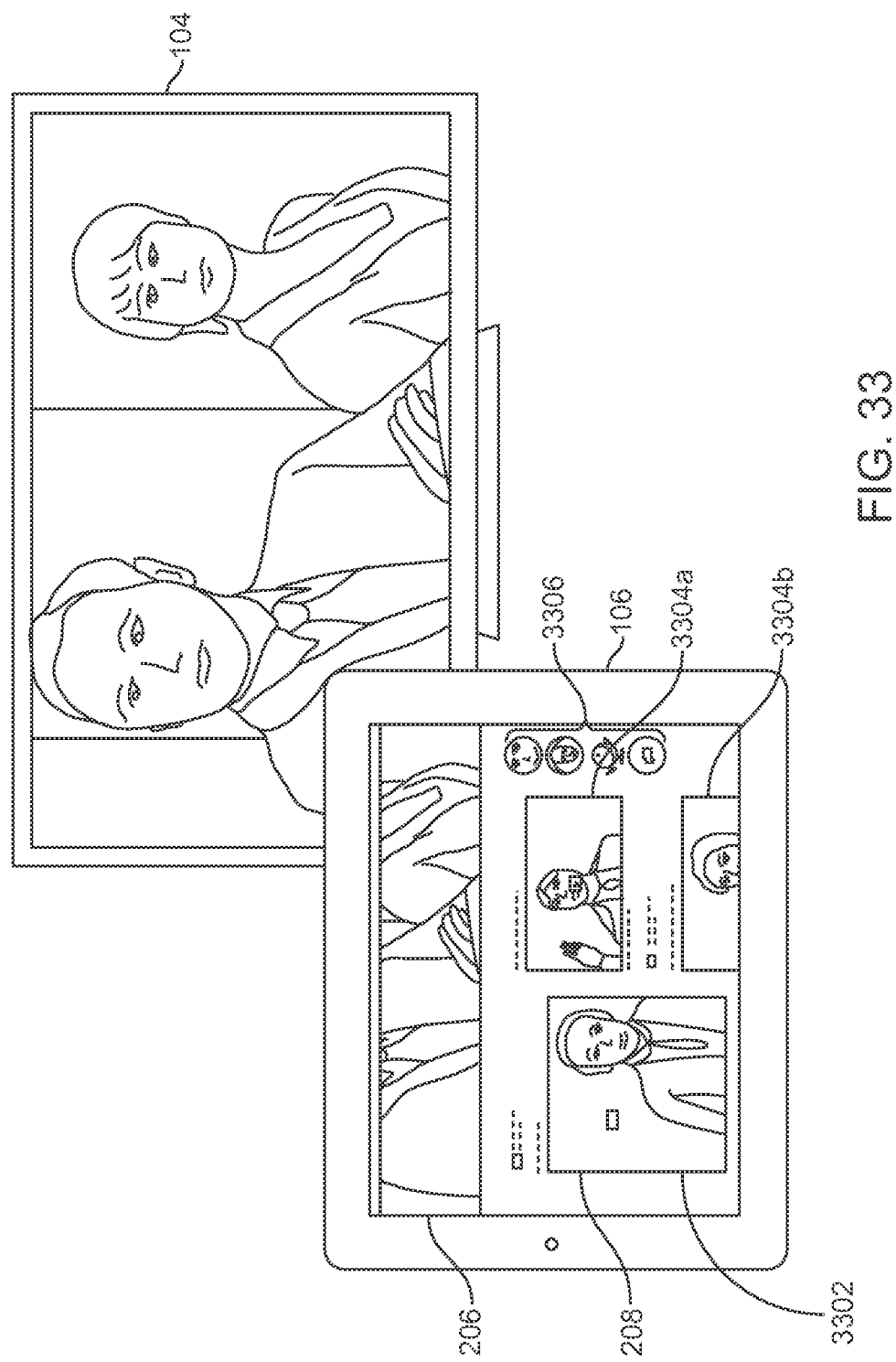
FIG. 33 illustrates screenshots of a screen and a touchscreen for a Facebook application in accordance with an exemplary embodiment.

At block 3204, the official Facebook site is displayed. For example, the second application 110 can cause the official Facebook site to be displayed in the active display area 208 on the touchscreen 204 of the second-screen device 106. The second application 110 can display information associated with displayed program. As shown in FIG. 33, an image 3302 for the official Facebook site associated with the media stream being displayed can be displayed in the active display area 208. One or more postings 3304 associated with the official Facebook site can be displayed. As shown, a first posting 3304a and a second posting 3304b are displayed. In this exemplary embodiment, the first posting 3304a and second posting 3304b are for trailers associated with the displayed program. The second application 110 can also display one or more friends that are on-line with Facebook. For example, one or more icons 3306 of friends that are on-line with Facebook can be displayed. In this exemplary embodiment, four friends of the viewer are on-line. After displaying the official Facebook site, the method 3200 can proceed to block 3206.

Figure 34:
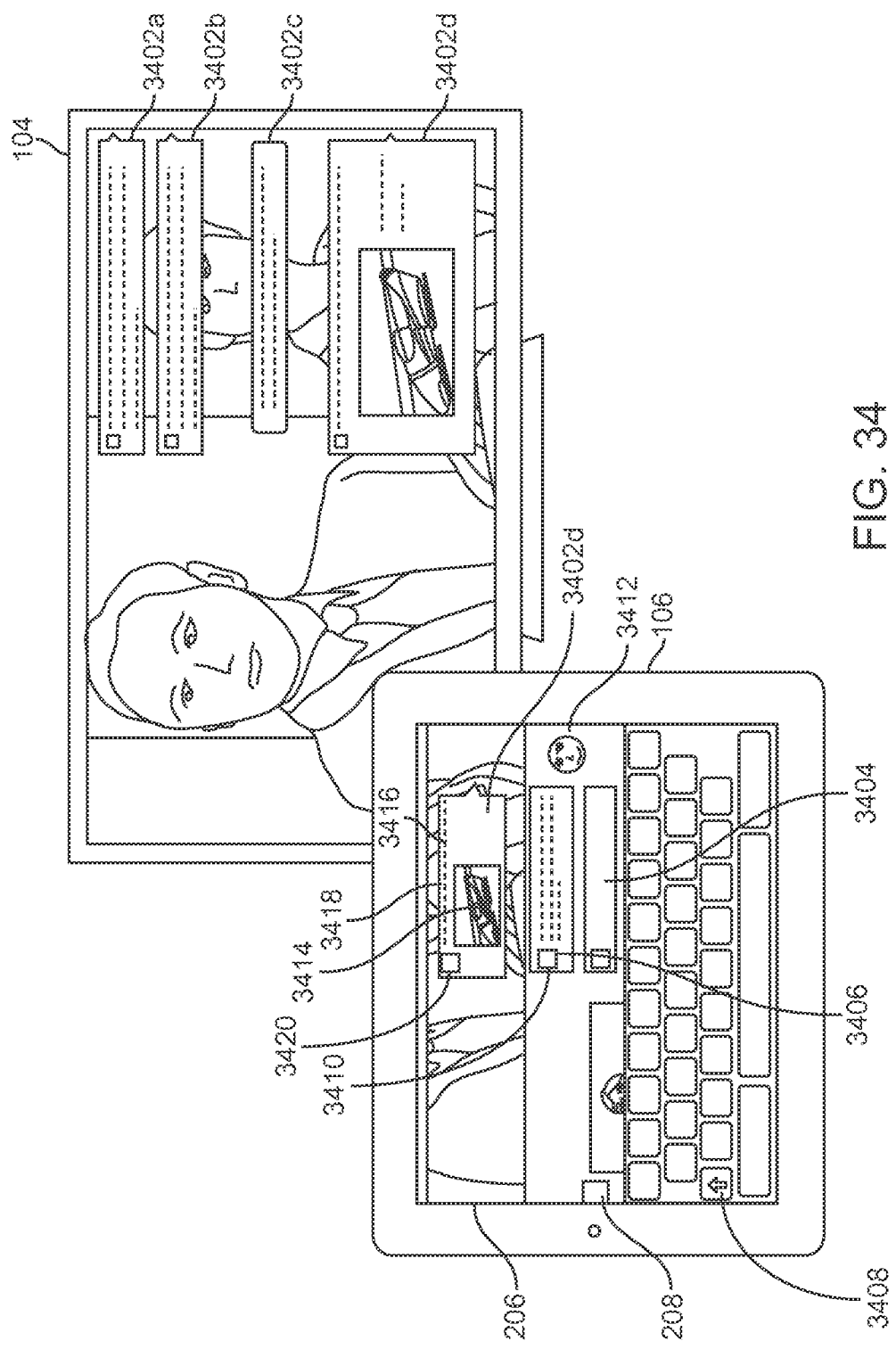
FIG. 34 illustrates screenshots of a screen and a touchscreen for a Facebook application with messages in accordance with an exemplary embodiment.

At block 3206, enable a messaging feature. For example, the second application 110 can enable a messaging feature in response to a received gesture and/or in response to a posted message. In some embodiments, the messaging feature can be Facebook Messenger. In other embodiments, the messaging feature can be a messaging application outside of the Facebook Messenger application. The messaging feature can be enabled in response to a gesture, such as the user tapping the active display area 208 on the touchscreen 204 of the second-screen device 106 where there is no postings and/or in response to the user tapping an icon 2706 for a friend in the active display area 208. One or more other dedicated gestures can be used to enable the messaging feature. The messaging feature can be enabled in response to receiving a message from one of the viewer's on-line friends. For example, if one of the viewer's on-line friends posts a message, the messaging feature can be enabled to allow the viewer to respond using the messaging feature. As shown in FIG. 34, messages can be displayed on the primary display 104 and the second-screen device 106. The first application 108 can cause messages to be displayed on the screen 202 of the primary display 104. The messages can be received from a server running the messaging application, e.g., a Facebook application server. The messages can be received directly from the messaging application by the primary display 104, from the second-screen device 106 (via the second application 110) or from the set top box 104 depending on the configuration of the devices (set top box 102, primary display 104 and second-screen device 106). As shown, there are four messages 3402a-d displayed on the screen 202. The second application 110 can display various items in the video display area 206 and active display area 208. For example, the last displayed message 3402d can be displayed in the video display area 206 and an entry box 3404, a post option 3406, a keyboard 3408, a last post by the user 3410 and a thumbnail image 3412 of the user can be displayed in the active display area 208. The entry box 3404 can allow a user to enter a message and can be posted in response to the user touching the post option 3406. The user can type the message using the displayed keyboard 3408. The user's last posted message 3410 can be displayed along with a thumbnail image 3412 of the user. After enabling the messaging application is enabled, the method 3200 can proceed to block 3208.

At block 3208, draft and send a message. For example, the second application 110 can allow a user to draft and send a message to Facebook friends. The user can use the keyboard 2408 to type a message, such as a chat message, and can hit the send option 3410 to have the message posted to one or more friends addressed in the message. For such messages, the second application 110 can send the message to a Facebook server via the web browser associated with the second-screen device 106, with the Facebook server forwarding the message to each addressed friend identified with the message. In some embodiments, the message can have a program tag associated with the sent message.

Figure 35:
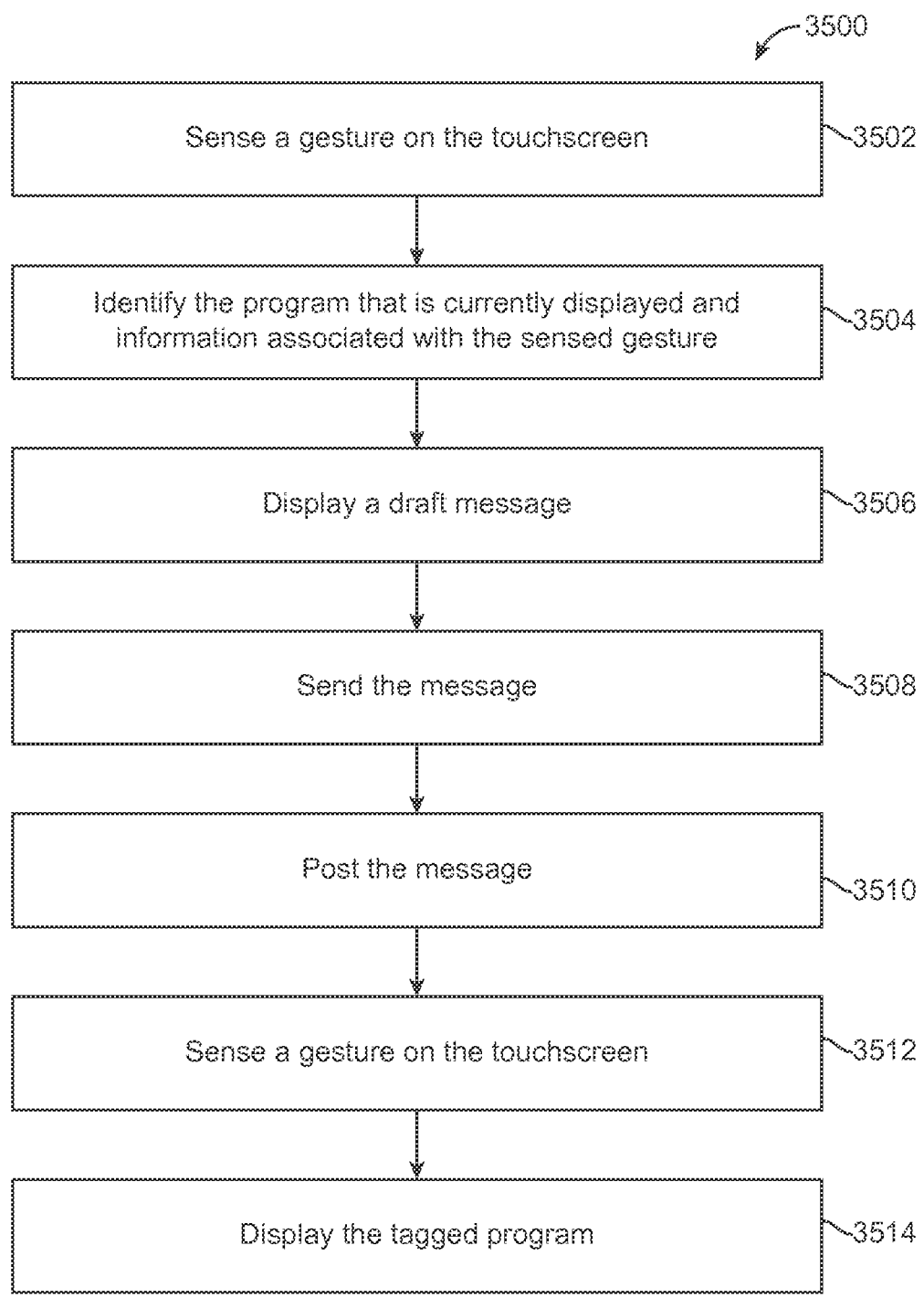
FIG. 35 illustrates a flowchart for tagging a program in a message in accordance with an exemplary embodiment.

Referring to FIG. 35, a flowchart for tagging a program in a message in accordance with an exemplary embodiment is illustrated. The exemplary method 3500 is provided by way of example, as there are a variety of ways to carry out the method. The method 3500 described below can be carried out using the configurations illustrated in FIGS. 1 and 2 by way of example, and various elements of these figures are referenced in explaining exemplary method 3500. Each block shown in FIG. 35 represents one or more processes, methods or subroutines, carried out in the exemplary method 3500. The exemplary method 3500 can begin at block 3502.

At block 3502, sense a gesture on the touchscreen. For example, the second application 110 can sense a downward gesture starting in the video display area 206, continuing vertically downward in the video display area 206 and being released in the video display area 206. After sensing the gesture, the method 3500 can proceed to block 3502.

At block 3504, identify the program that is currently displayed and information associated with the sensed gesture. For example, the second application 110 can identify the program currently being displayed on the screen 202 of the primary display 104 and at least partially displayed in the video display area 206 on the touchscreen 204 of the second-screen device 106. The program can be identified using one of know means, for example, the second application 110 can use meta data associated with the media content that is being displayed to identify the program. The second application 110 can also identify information associated with the sensed gesture. For example, the information can be the time of the sensed gesture or the corresponding elapsed time of where the currently displayed program is when the gesture was sensed. After identifying the program and information associated with the sensed gesture, the method 3500 can proceed to block 3506.

At block 3506, display a draft message. For example, the second application 110 can display a generated message. The generated message can be in response to the sense gesture and can identify the program that is being displayed and information associated with the program. Using the keyboard 3408, an optional comment can be added to the draft message. After the message is displayed, the method 3500 can proceed to block 3508.

At block 3508, send the message in response to the send option being acted upon. For example, the second application 110 can cause the message to be posted to one or more friends that are on-line in response to the send option 3406 being touched. The message can be sent via the web browser associated with the second-screen device 106 to a server and then forwarded to one or more friends that are identified as being on-line. After sending the message, the method 3500 can proceed to block 3510.

At block 3510, post the message. For example, the second application 110 can cause the message to be posted or displayed. The second application 110 can cause the message to be displayed on the video display area 206 on the touchscreen 204 of the second-screen device 106. In some embodiments, the second application 110 can provide the message to the first application 108 for display on the screen 202 of the primary display 104. In other embodiments, the set-top box 102 can receive the message and can provide the message to the first application 108 for display on the primary display 104 and/or to the second application 110 for display on the second-screen device 106. As shown in FIG. 34, the message 2402d can be displayed on the screen 202 and the touchscreen 204. The exemplary message 2402d can contain an image of the tagged program 3414, a comment 3416, a timestamp 3418 and an image of the sender 3420. In this example, the program is the Olympics, the comment is "You have to check this out-" and was sent five seconds ago. After posting the message, the method 3500 can proceed to block 3512.

At block 3512, sense a gesture on the touchscreen. For example, the second application 110 for a user receiving the posted message, can sense a gesture, such as a tap on the displayed message in the video display area 206, on a touchscreen 204 of a second-screen device 106. In this example, the block is described for a second user receiving a posted message with a tagged program but it can a first user receiving a posted message with a tagged program. After sensing the gesture, the method 3500 can proceed to block 3514.

At block 3514, display the tagged program. For example, the first application 108 can cause the display of the tagged program on the screen 202 of the primary display 104 and the second application 110 can cause the display of the tagged program in the video display area 206 on the touchscreen 204 of the second-screen device 106. In some embodiments, the set-top box 102 can tune to the channel associated with the tagged program and provide the media content to the first application 108 and second application 110 for display. In other embodiments, the tagged program can be displayed starting at about the time the first gesture was sensed or a predetermined time before the first gesture was sensed. In such embodiments, the tagged program can be obtained from a cDVR with a starting point based on the information associated with the gesture. The user can use navigation commands to watch the tagged program, such as pause, resume play, rewind and fast forward. As a result, a viewer who acted upon the posted message with the tagged program gets to see what the displayed content at about the part the viewer who tagged the program wanted to share the content. In this example, the first viewer tagged a bobsled race and the second viewer was able to see the race that inspired the first viewer to share it.

Figure 36:
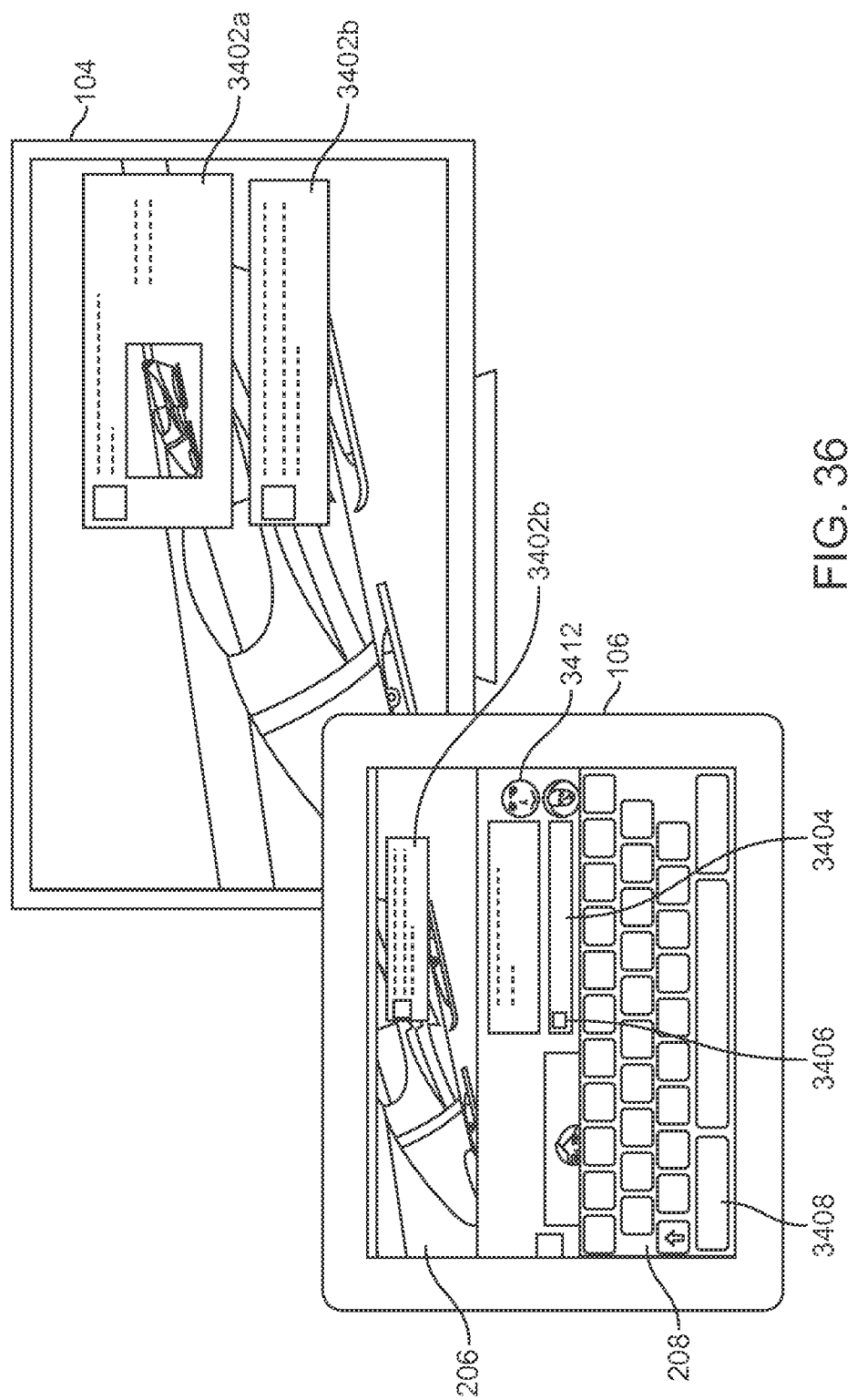
FIG. 36 illustrates screenshots of a screen and a touchscreen for a tagged program in accordance with an exemplary embodiment.

Referring to FIG. 36, screenshots of a screen and a touchscreen for the tagged program in accordance with an exemplary embodiment are illustrated. As shown, the first application 108 causes the display of the tagged program on the screen 202 of the primary display 104 and the second application 110 causes the display of the tagged program in the video display area 206 on the touchscreen 204 of the second-screen device 106. More specifically, the message for the tagged program 3402a and a new message 3402b are displayed on the screen 202 and the new messages 3402b is displayed on the touchscreen 304. The new message 3402b recites, "I'm planning on getting a bobsled for the crosstown commute. If we get 2 more guys we'll have a team :D." The tagged program feature allows users to use the feature as a chat DVR.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method for providing a coordinated graphical user interface on a second-screen device comprising:
   analyzing an advertisement stream in order to generate an interactive media content associated with the advertisement stream;
   wirelessly outputting, to a primary display, the advertisement stream;
   wirelessly outputting, to the second-screen device, the advertisement stream and the interactive media content associated with the advertisement stream;
   displaying the advertisement stream on the primary display;
   displaying at least a partial display of the advertisement stream in a video display area on the second-screen device such that the display of the advertisement stream is substantially synchronized in time between the primary display and the second-screen device; and
   displaying the interactive media content in an active display area of the second-screen device, wherein the active display area and the video display area are distinct and non-overlapping.

2. The method of claim 1 wherein the interactive media content is wirelessly outputted from one of a cloud digital video recorder (cDVR) and an advertisement server.

3. The method of claim 2 wherein the displayed advertisement stream in the video display area on the second-screen device is a first advertisement and in response to receiving a touch on a touchscreen of the second-screen device at about the displayed interactive media content, displaying at least a partial display of a second advertisement in the video display area on the second-screen device, with the displayed second advertisement being associated with a second advertisement being displayed by the primary display with the two displayed second advertisements being associated with the same content, substantially synchronized and associated with the first advertisement.

4. The method of claim 2 wherein the displayed video stream in the video display area on the second-screen device is an advertisement and in response to receiving a touch on a touchscreen of the second-screen device at about the displayed interactive media content, displaying an interactive panel in an active display area on the second-screen device with the active display area being below the video display area and the interactive panel, the interactive panel comprising a non-video image and at least one interactive media content, with the non-video image visually appearing as an extension of the partial display of the video stream.

5. The method of claim 2 wherein the displayed video stream in the video display area on the second-screen device is a first advertisement and in response to receiving a gesture on a touchscreen of the second-screen device at about the rendered interactive media content, displaying a video stream of a new advertisement in the video display area on the second-screen device with the rendered new advertisement corresponding to a location of the gesture and being associated with a video stream being displayed by a primary display with the two video streams being associated with the same content and substantially synchronized and the new advertisement corresponding to an area associated with the gesture.

6. The method of claim 5 wherein the interactive media content comprises a plurality of buttons and the gesture is a selection of one of the plurality of buttons, with each of the buttons having a corresponding advertisement for display.

7. The method of clam 5 wherein the interactive media content comprises a slide bar having spaced areas and the gesture comprises removing a touch of a slide of the slide bar at about a spaced area, with each location having a corresponding advertisement for display.

8. The method of claim 1 wherein the video display area on the second-screen device is less than a full screen display.

9. The method of claim 8 wherein displaying of the interactive media content includes displaying a coupon associated with the displayed advertisement stream.

10. The method of claim 9 further comprising downloading the displayed coupon into a coupon wallet associated with the second-screen device in response to a gesture on a touchscreen of the second-screen device.

11. The method of claim 10 wherein the gesture comprises a downward gesture starting in the video display area, continuing downward and ending in an active display area with the active display area being below the video display area.

* * * * *